United States Patent [19]
Bodner et al.

[11] 3,972,023
[45] July 27, 1976

[54] I/O DATA TRANSFER CONTROL SYSTEM

[75] Inventors: Ronald E. Bodner; Mario N. Cianciosi; Thomas L. Crooks, all of Rochester, Minn.; Israel B. Magrisso, Coral Springs, Fla.; Keith K. Slack, Rochester, Minn.; Richard S. Smith, Boca Raton, Fla.

[73] Assignee: International Business Machines Corporation, Armonk, N.Y.

[22] Filed: Dec. 30, 1974

[21] Appl. No.: 537,471

[52] U.S. Cl. .............................. 340/172.5
[51] Int. Cl.² .............................. G06F 3/00
[58] Field of Search .................. 340/172.5

[56] References Cited
UNITED STATES PATENTS

| | | | |
|---|---|---|---|
| 3,303,476 | 2/1967 | Moyer et al. | 340/172.5 |
| 3,336,582 | 8/1967 | Beausoleil et al. | 340/172.5 |
| 3,377,619 | 4/1968 | Marsh et al. | 340/172.5 |
| 3,406,380 | 10/1968 | Bradley et al. | 340/172.5 |
| 3,588,831 | 6/1971 | Figueroa et al. | 340/172.5 |
| 3,710,328 | 1/1973 | Hunter et al. | 340/172.5 |
| 3,771,135 | 11/1973 | Huettner et al. | 340/172.5 |
| 3,810,105 | 5/1974 | England | 340/172.5 |
| 3,833,888 | 9/1974 | Stafford et al. | 340/172.5 |

*Primary Examiner*—Gareth D. Shaw
*Assistant Examiner*—Melvin B. Chapnick
*Attorney, Agent, or Firm*—Donald F. Voss

[57] ABSTRACT

Data transfers between input/output (I/O) devices and a central processing unit (CPU) take place under instruction or base cycle steal control a byte at a time where the I/O device attachments connect to ports and the ports connect to the CPU. Data transfer can be synchronous or asynchronous. The port involved in the data transfer sends out a device address and command information simultaneously on port data bus out and command bus out, respectively, to the I/O attachments. The addressed I/O device can respond any time within a predetermined time interval. If an I/O device does not respond within the time interval, a blast condition generated by the port causes the I/O attachments to clear the busses between it and the port. During execution of an I/O instruction, the CPU clock is first held in a particular time state while phase clocks and port clocks continue to run and synchronization between the port and I/O attachment is taking place. Upon completion of the synchronization sequence, the port generates an advance time signal to the CPU to advance the CPU clock. The CPU clock runs and the storage clock can be activated depending upon the type of I/O instruction being executed, the CPU clock runs until it reaches a second particular time state and then remains at that particular time state until the port again generates an advance time signal to the CPU. The activity taking place as the CPU clock is advancing depends upon the type of I/O instruction, but generally a data transfer occurs, and the data is entered into or transferred from local storage registers or main or control storage. The extended second particular time state is used for a de-synchronization sequence between the port and I/O attachment.

71 Claims, 39 Drawing Figures

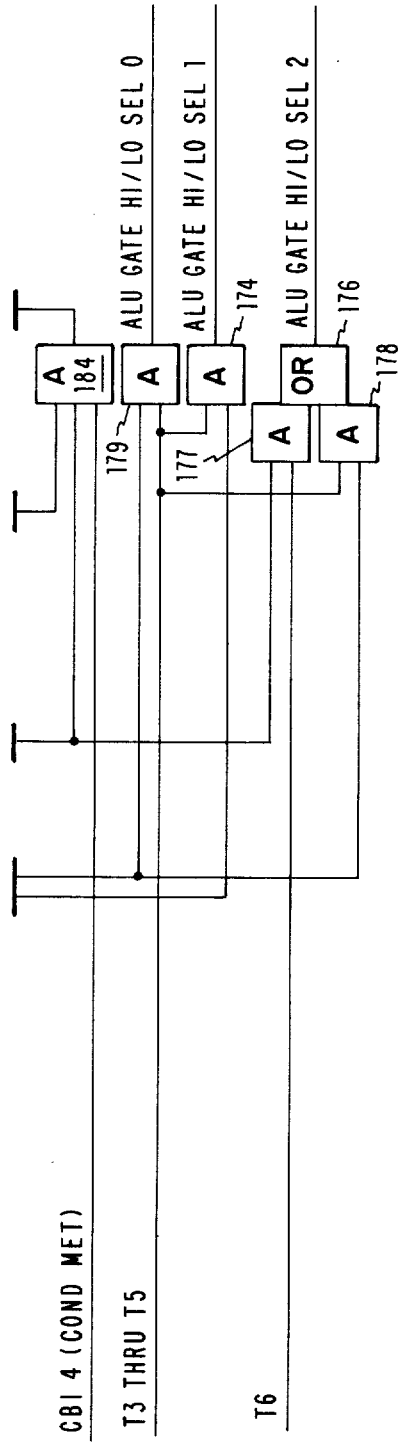
FIG. 5b
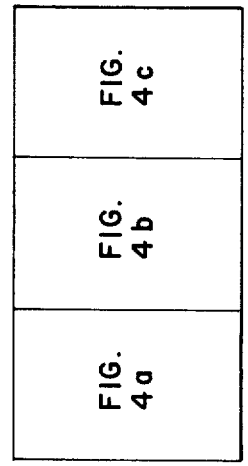
FIG. 4
FIG. 16

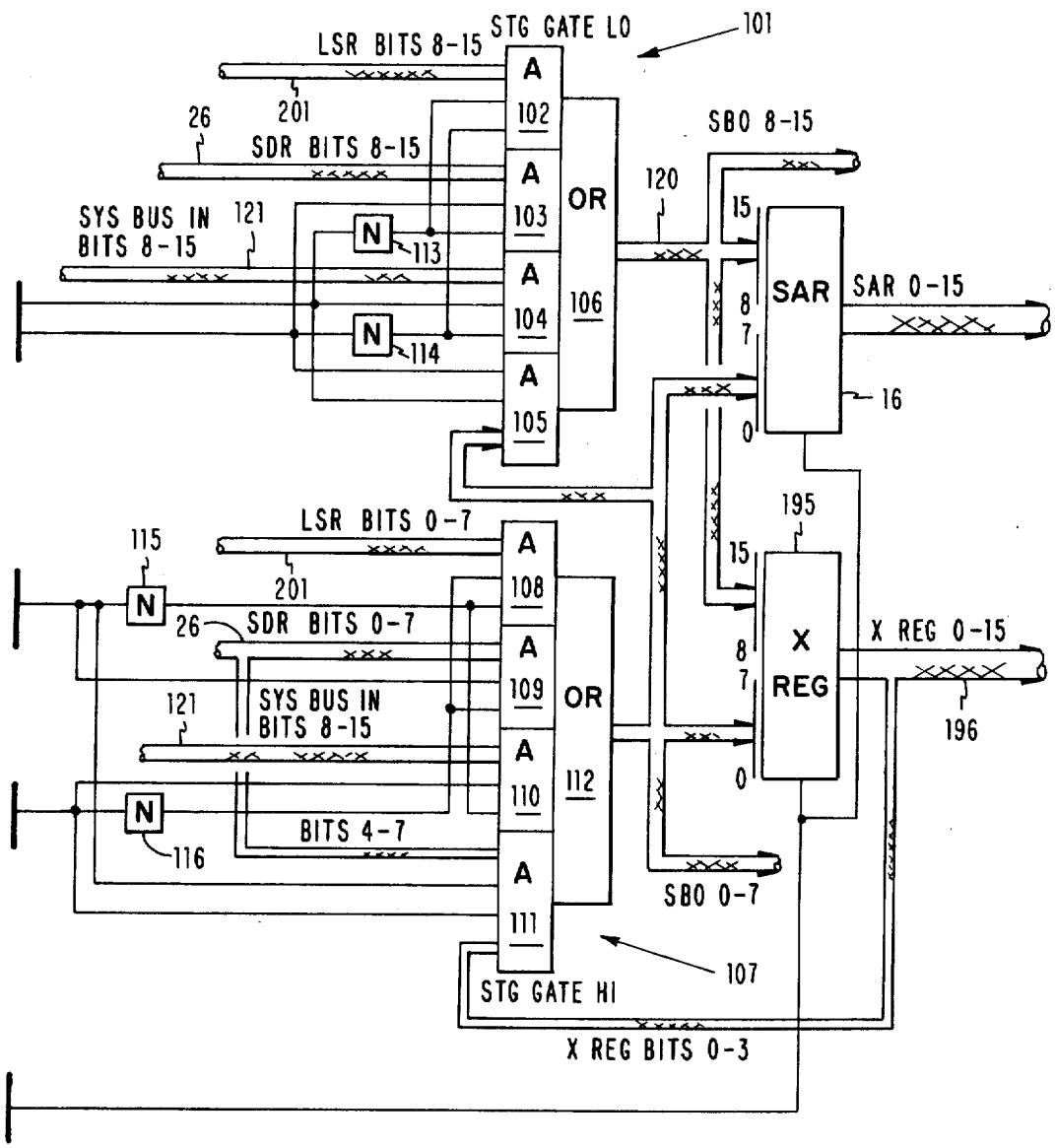
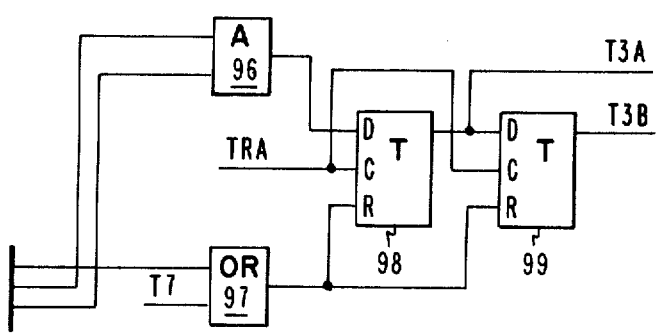
FIG. 4c

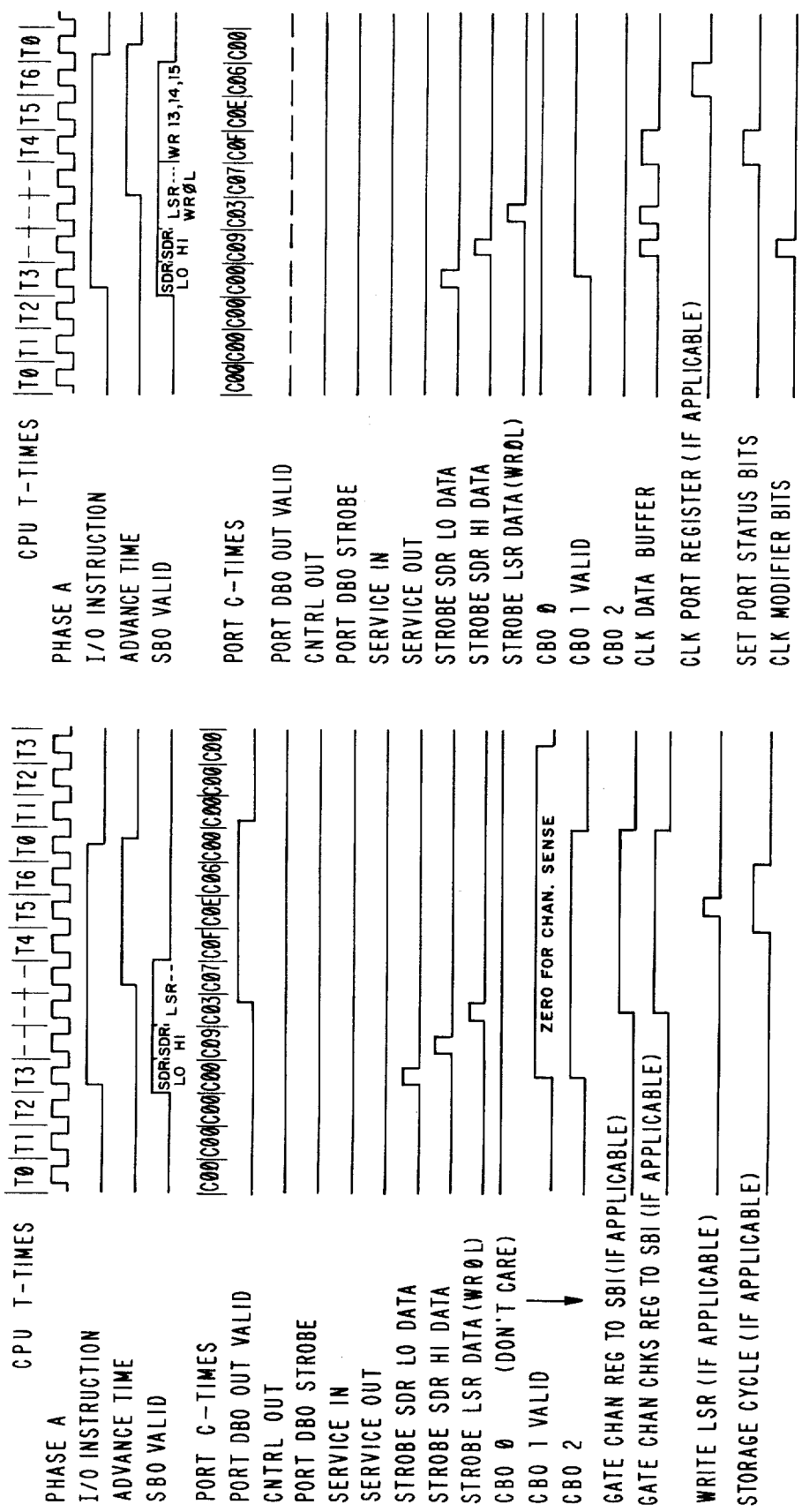

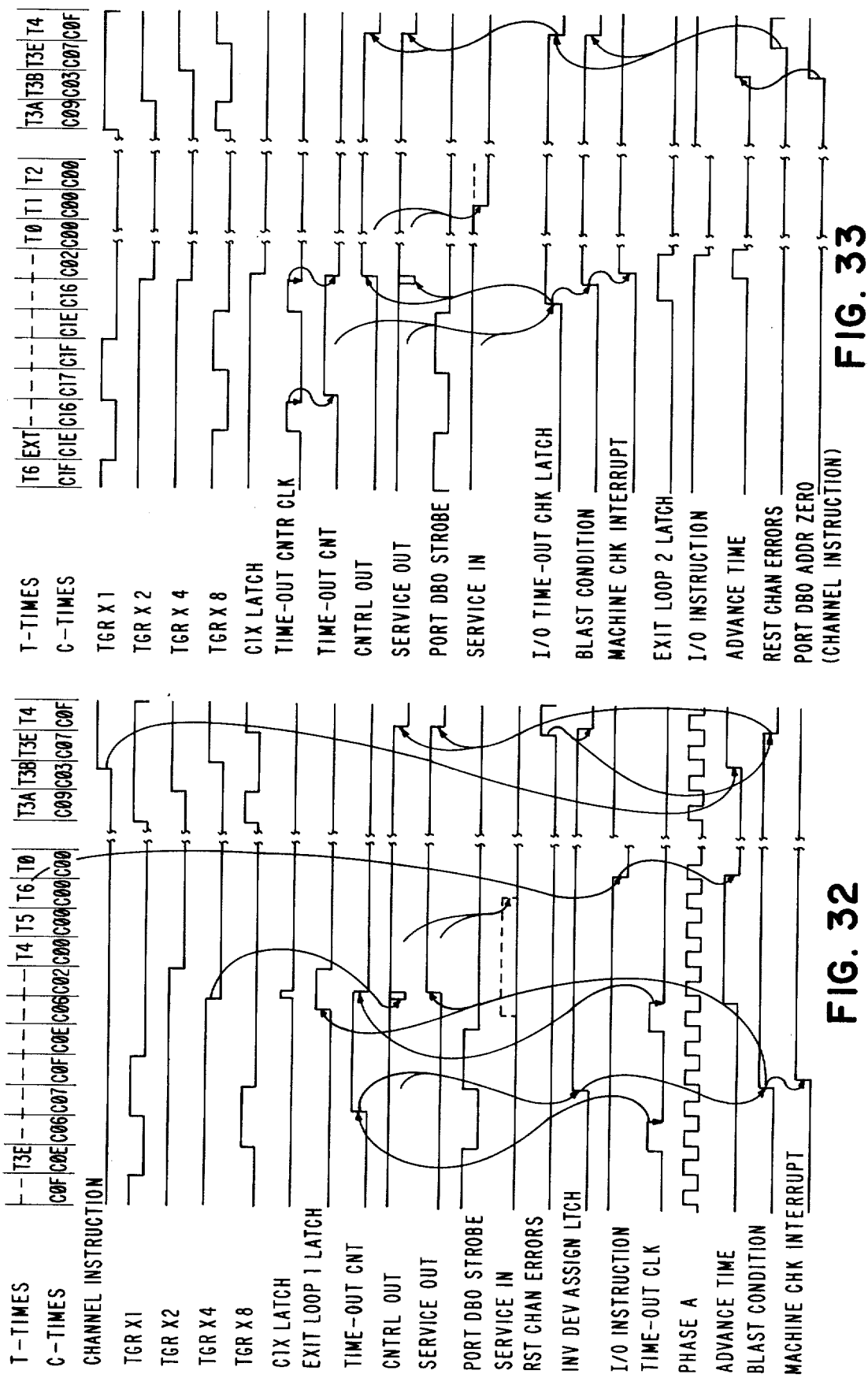

I/O DATA TRANSFER CONTROL SYSTEM

BACKGROUND OF THE INVENTION

1. Field of the Invention

This invention relates to stored program digital computer systems and more particularly to data transfer control apparatus for controlling the transfer of data between I/O devices and the CPU.

The invention finds particular utility in stored program computer systems where the data transfers are to take place asynchronously. Asynchronous data transfers generally simplify the complexity of the I/O attachment logic but place a heavier burden on the port or channel for synchronization and de-synchronization of the I/O devices for data transfer operations.

The present invention simplifies the synchronization and de-synchronization control apparatus by using fewer interlock lines and provides flexibility to accommodate the different timing requirements of the I/O devices and to accommodate multi-device responses. Constant polling requirements are eliminated because devices requesting service switch the hardware into a predefined state and while in that state, the port can by way of an I/O instruction (Multidevice Command) transfer the service request state of devices into the CPU for analysis.

2. Description of the Prior Art

In the past it was not uncommon to require an I/O device to respond at a precise time rather than at any time during a predetermined time interval as in the present invention. In those systems where data transfers take place asynchronously, the I/O device address would be sent out and the CPU would require a response before sending out the I/O command. Such an arrangement is more time consuming and complex than in the present invention where the I/O address and command are sent out simultaneously to the I/O attachment. U.S. Pat. Nos. 3,336,582 for "Interlocked Communication System" dated Aug. 15, 1967, and 3,377,619 for "Data Multiplexing System" dated Apr. 9, 1968, are representative of such prior art.

SUMMARY OF THE INVENTION

The principal objects of the invention are to provide improved data transfer control apparatus which:

a. enables both synchronous and asynchronous data transfers,
b. facilitates asynchronous data transfers with a minimum number of interlock lines;
c. accommodates multi I/O device responses;
d. permits extended execution time for I/O commands; and
e. has program controlled time out for providing different duration time out intervals during which I/O devices are required to respond.

The foregoing objects are achieved by controlling the CPU clock during the execution of an I/O instruction whereby the CPU clock remains in a first particular time state while three bytes of data are successively transferred to a port. The addressed port forms both I/O attachment address and command information from the three transferred bytes and simultaneously transmits this information to the addressed I/O device attachment.

The port control logic is responsive to an I/O instruction control signal generated by the CPU upon decoding an I/O instruction to start the port clock. The port clock advances through sequential time states and also enters into a first loop. While the port clock is in the first loop, port clock decode logic generates a control out signal. Either the addressed I/O device attachment responds to the control out signal by generating a service in signal or a time out condition occurs. If the time out occurs before the addressed I/O device generates service in, the port clock exits the loop and enters a reset state. Port check logic generates a blast signal for clearing the busses interfacing to the I/O attachments.

If the addressed I/O device attachment generates the service in signal before the time out occurs, the port clock exits the first loop and advances through some sequential time states. Port control logic during certain of these sequential time states sends an advance time signal to the CPU clock to enable it to advance. Data is transferred between the CPU and port during certain of the sequential time states just mentioned and the port clock then enters into a second loop. Port clock decode logic then generates a service out signal. Either a time out occurs or the I/O attachment de-activates the service in signal.

If the time out occurs before the I/O device attachment de-activates the service in signal, the port check logic generates a blast signal which clears the busses interfacing to the I/O attachments. If the I/O attachment de-activates service in prior to the time out, the port clock exits the second loop and advances through a final time state. This final time state enables the port control logic to generate an advance time signal to the CPU clock to enable the same to advance to its next time state. Also, during this final time state, the port check logic checks the busses interfacing to the I/O attachment to determine if they have been properly de-activated.

DESCRIPTIONS OF THE DRAWINGS

Figure 1:
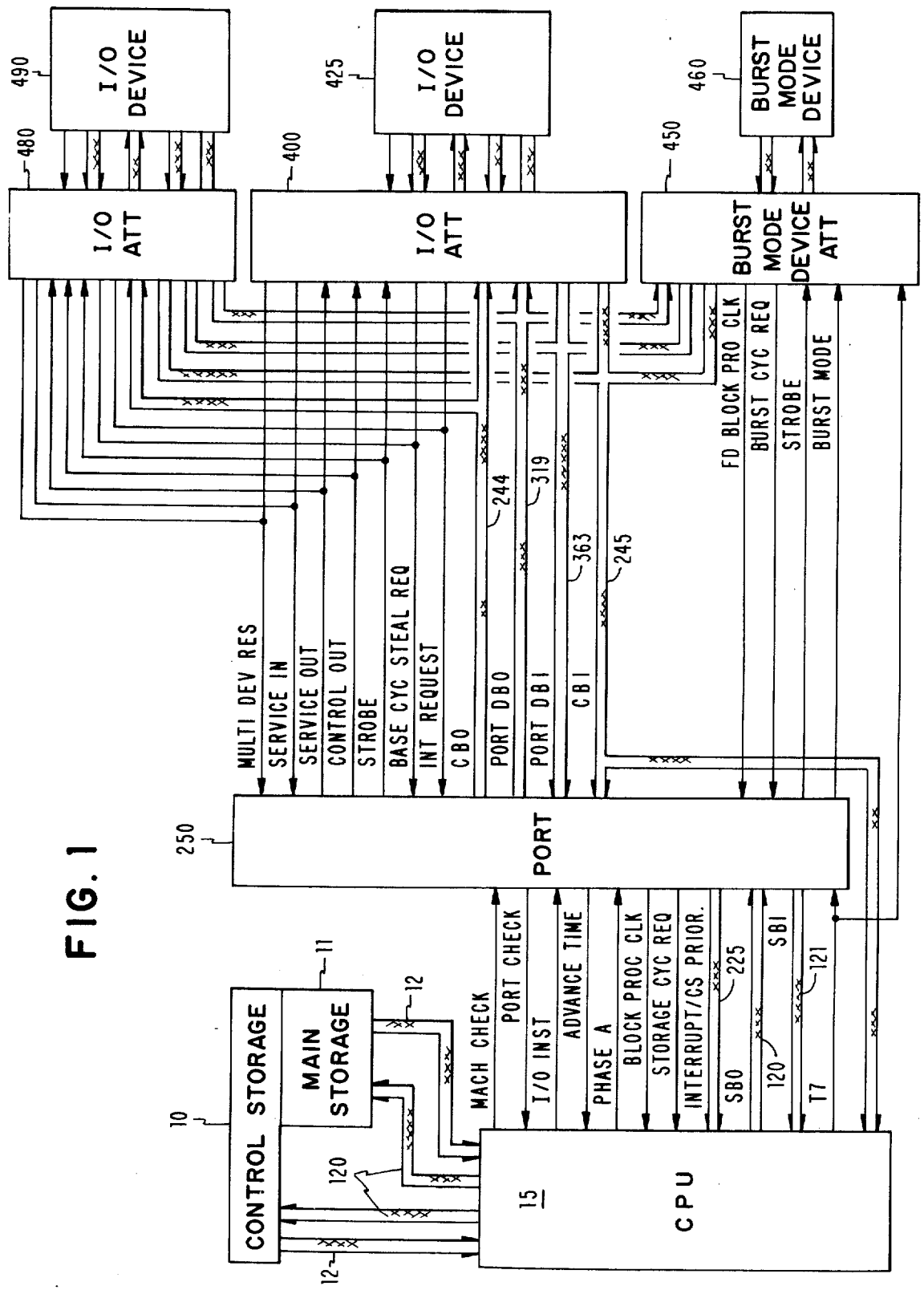
FIG. 1 is a block diagram of a computer system incorporating the present invention.
Figure 4A:
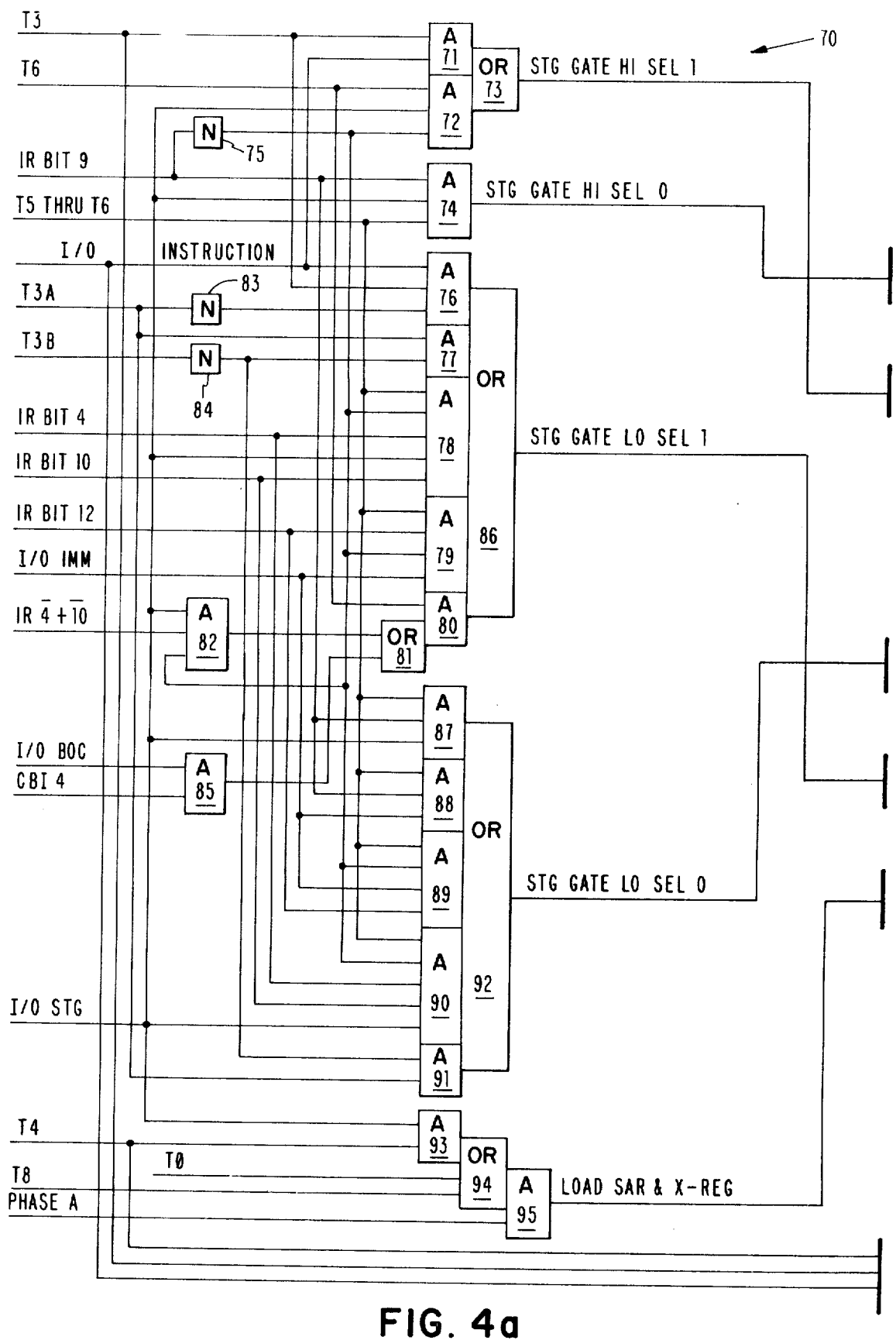
FIG. 4 is a block diagram illustrating the arrangement of FIGS. 4a, 4b and 4c.
Figure 4B:
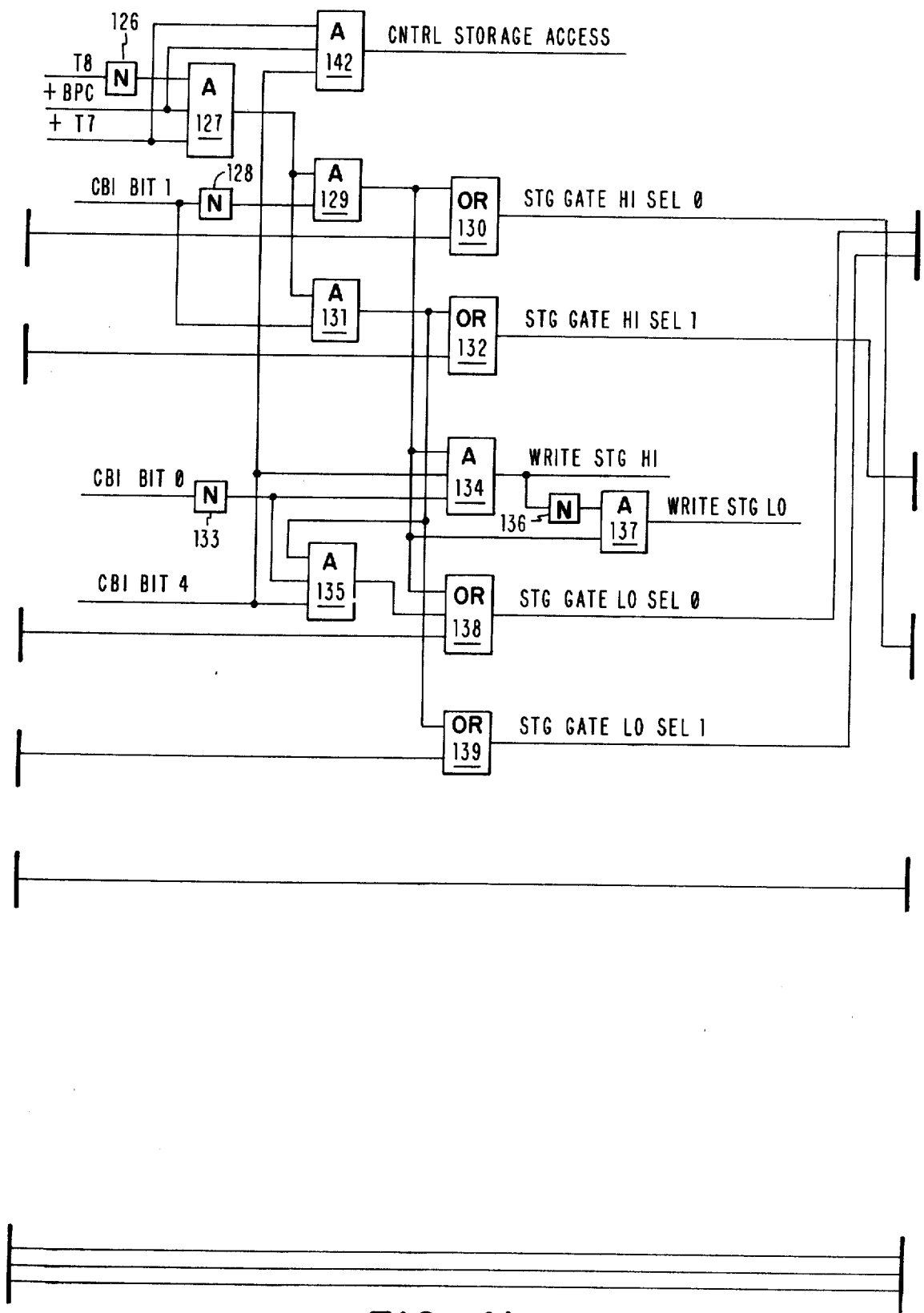
Figure 5A:
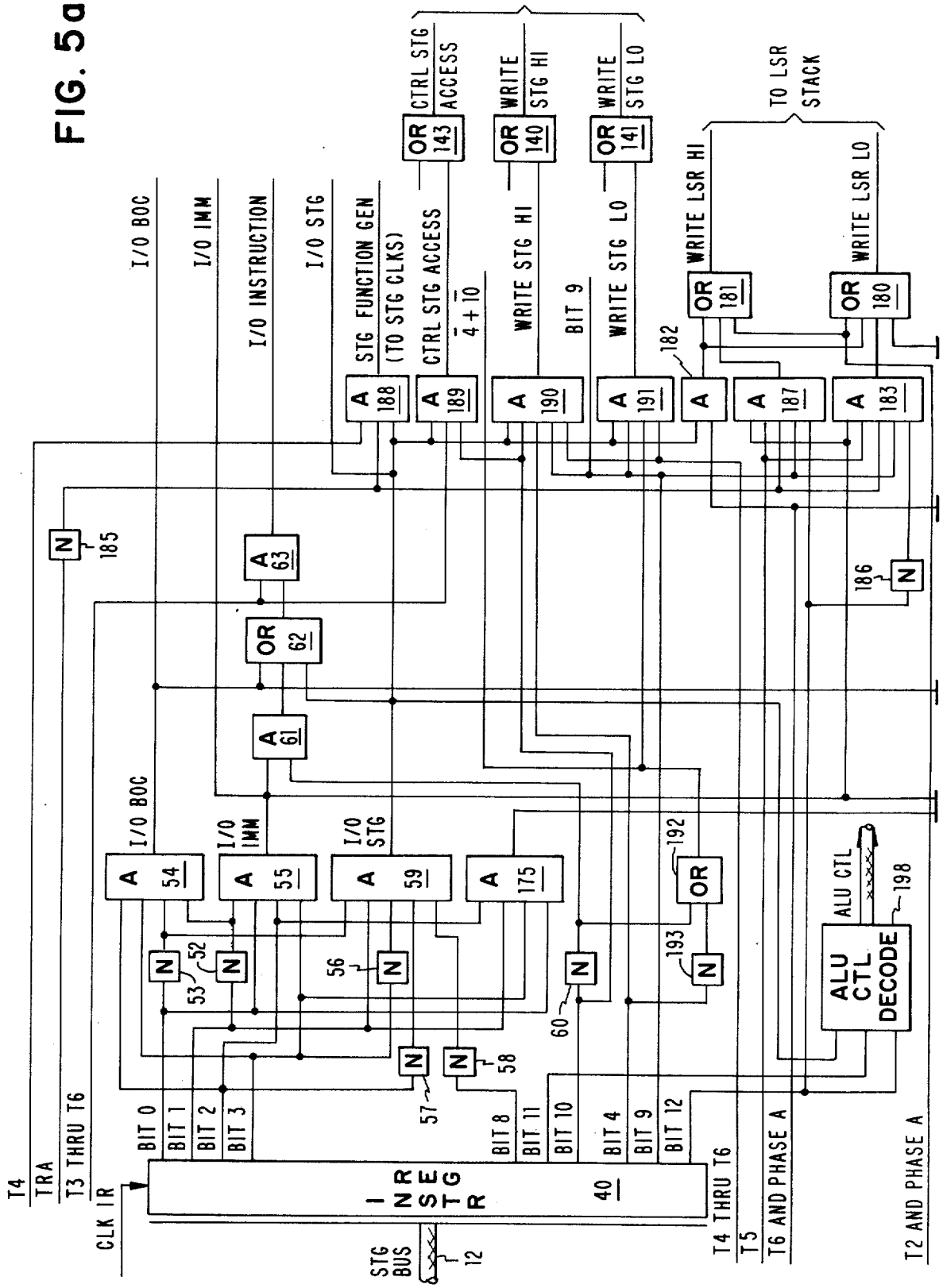
Figure 6:
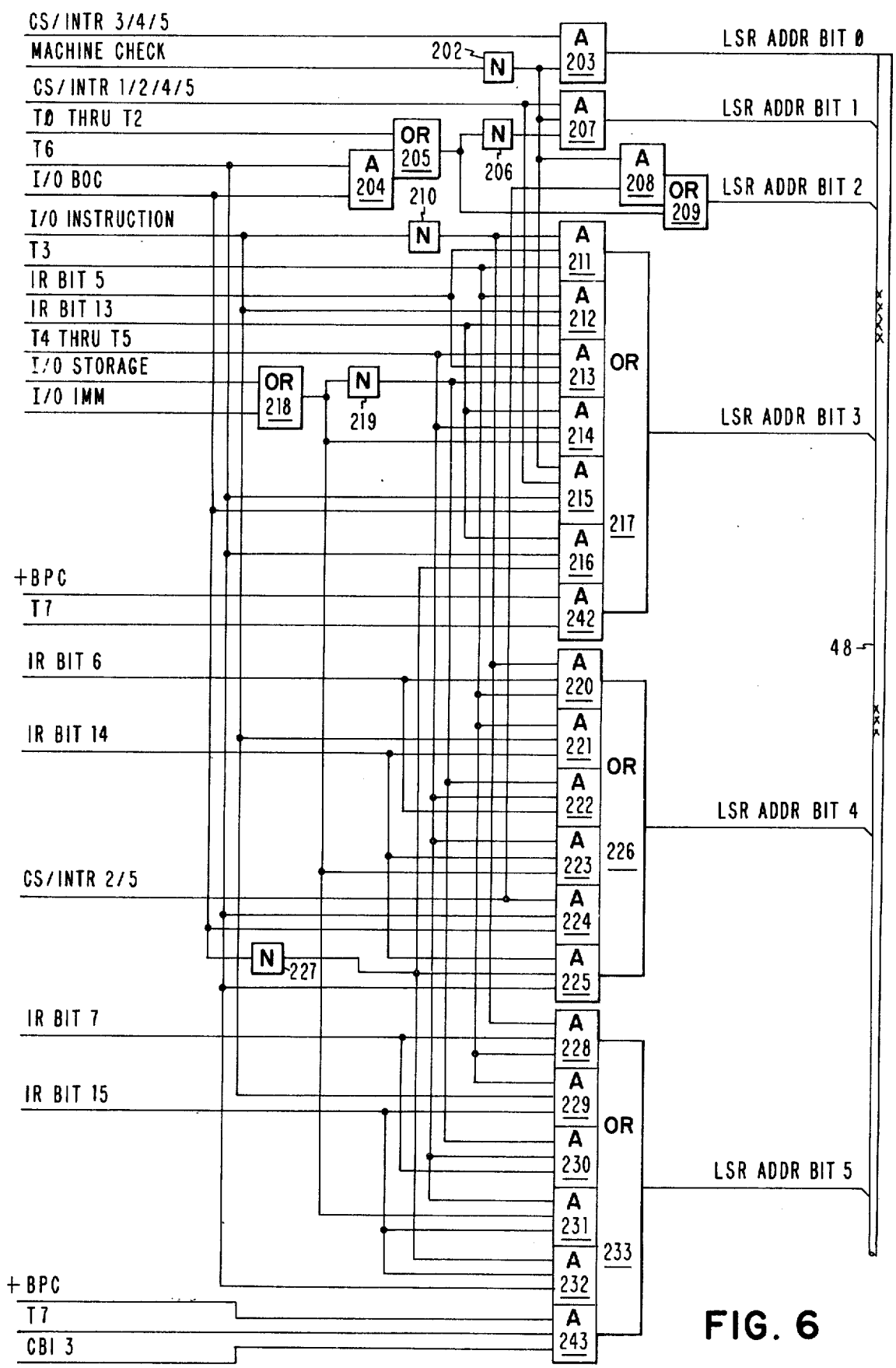
Figure 7A:
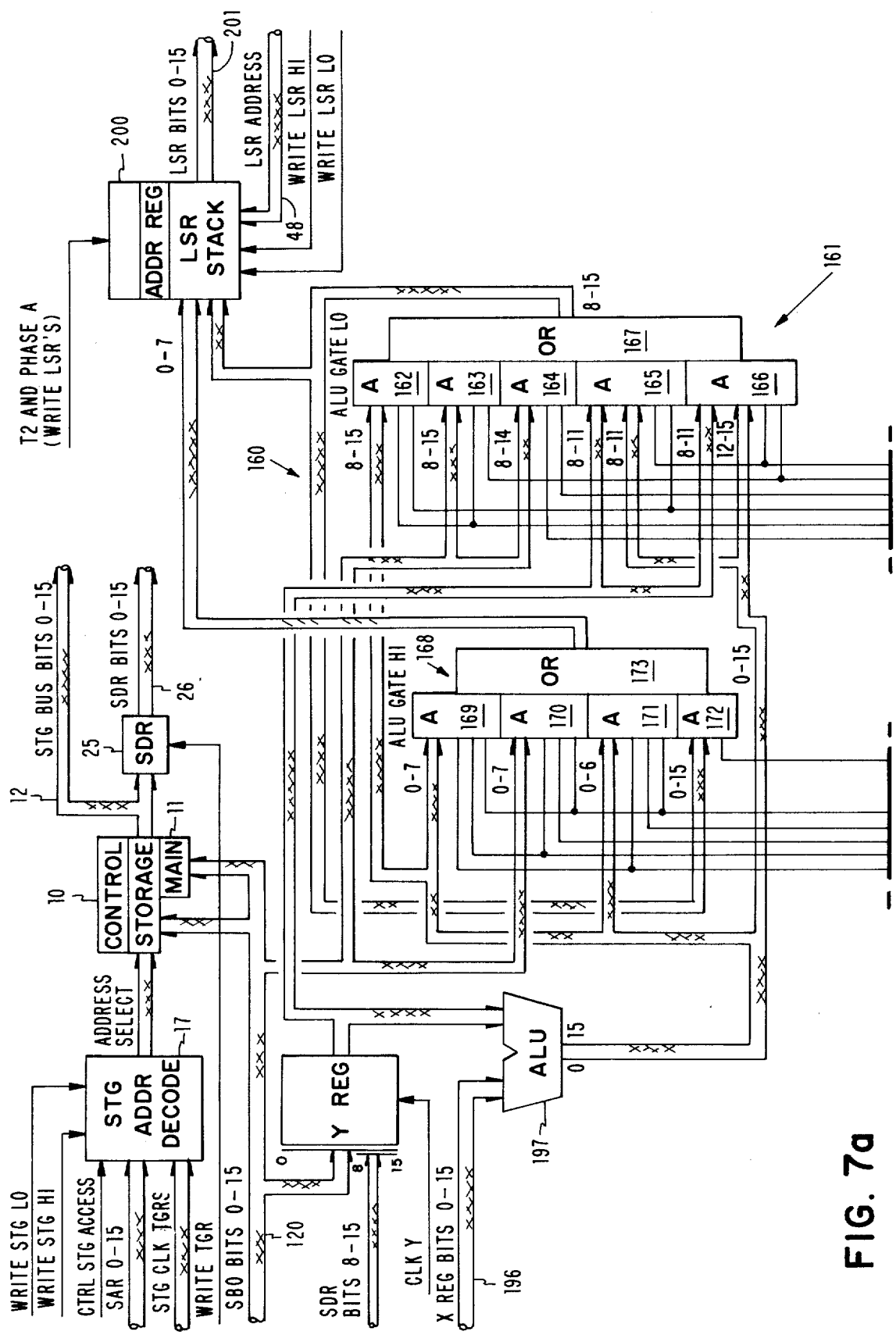
Figure 7B:
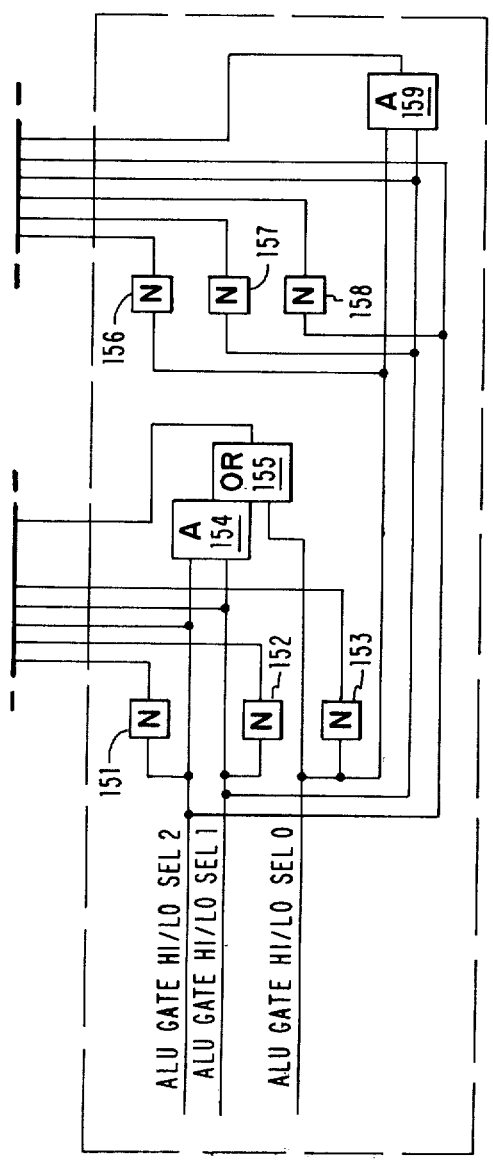
Figure 8:
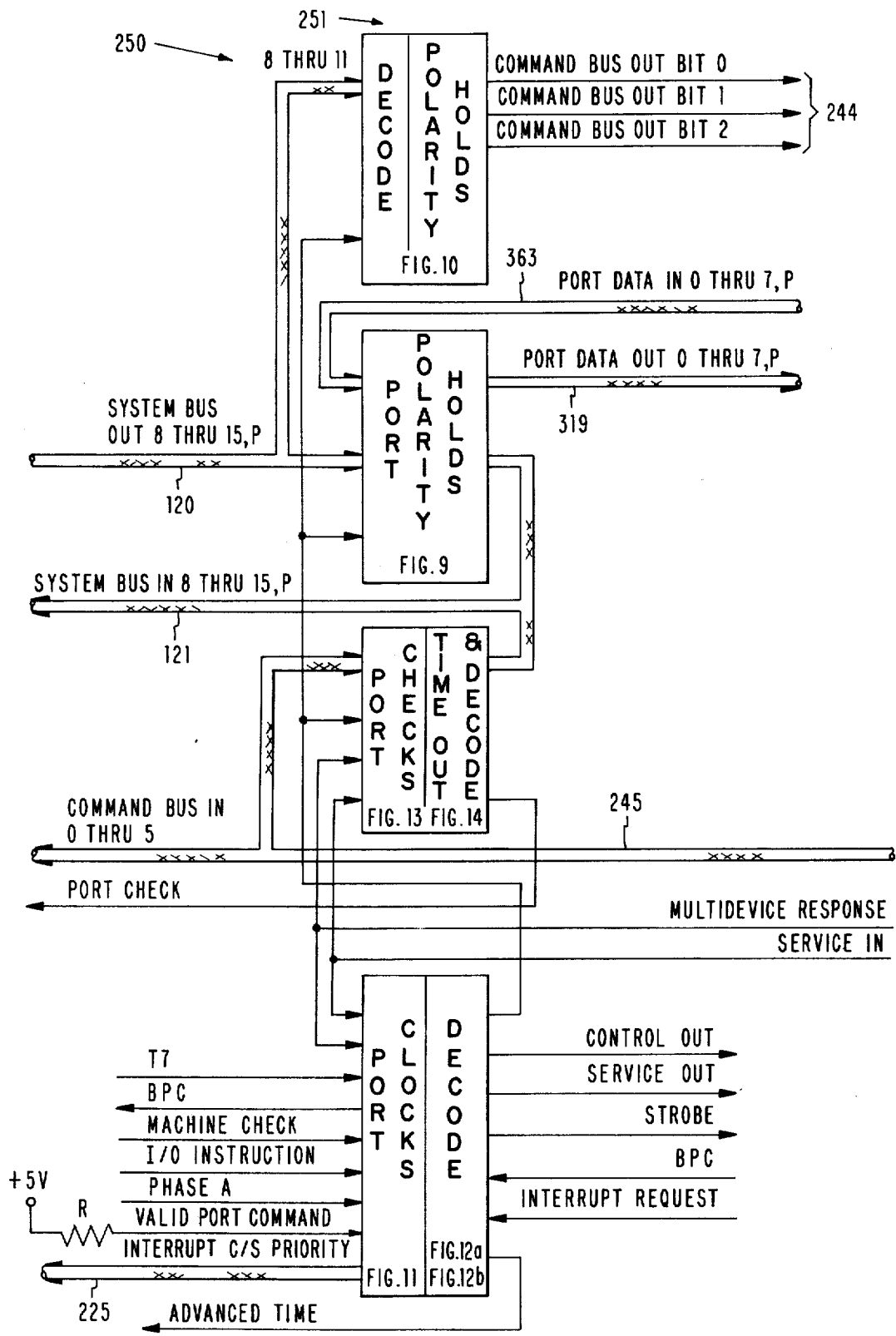
Figure 9:
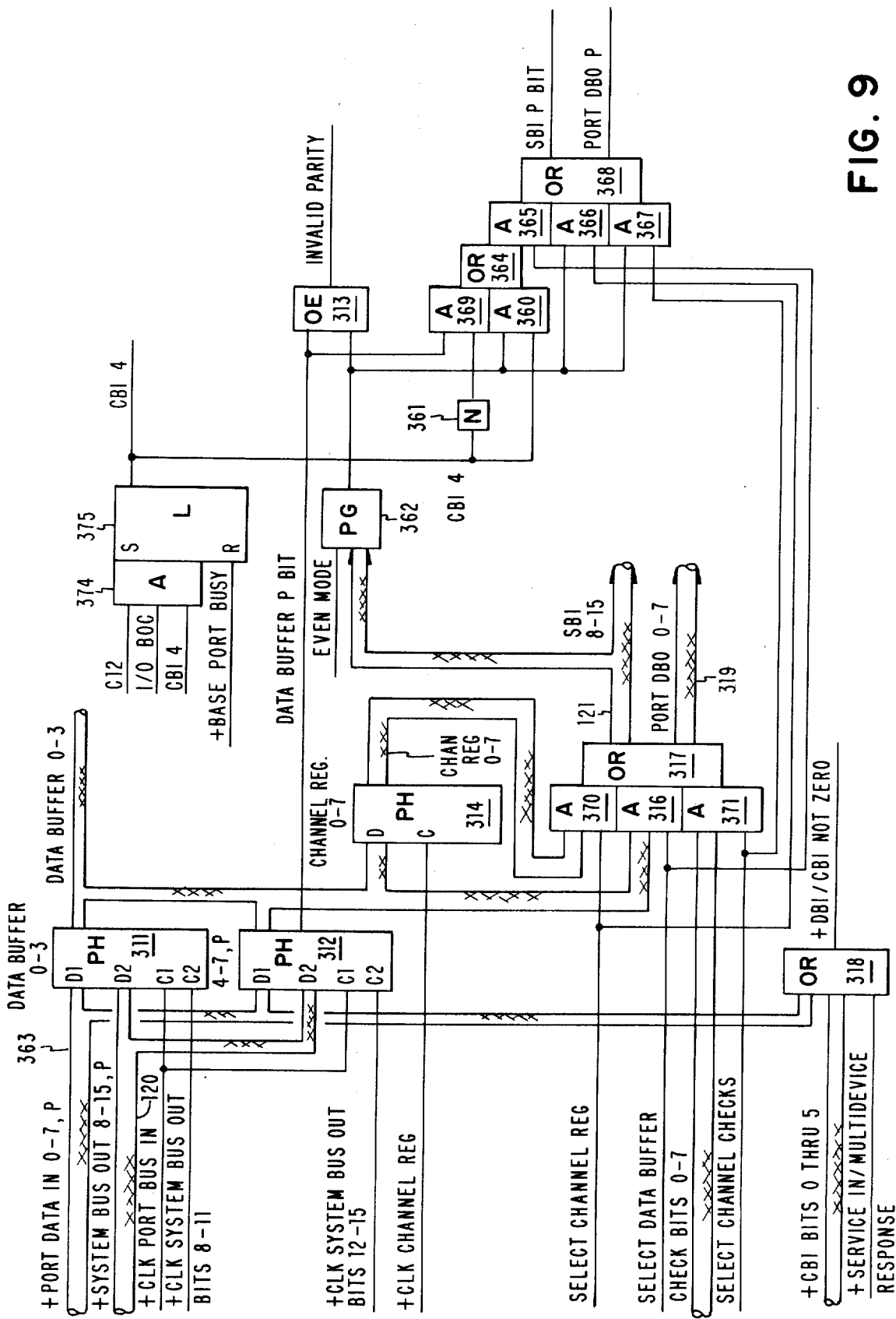
Figure 10:
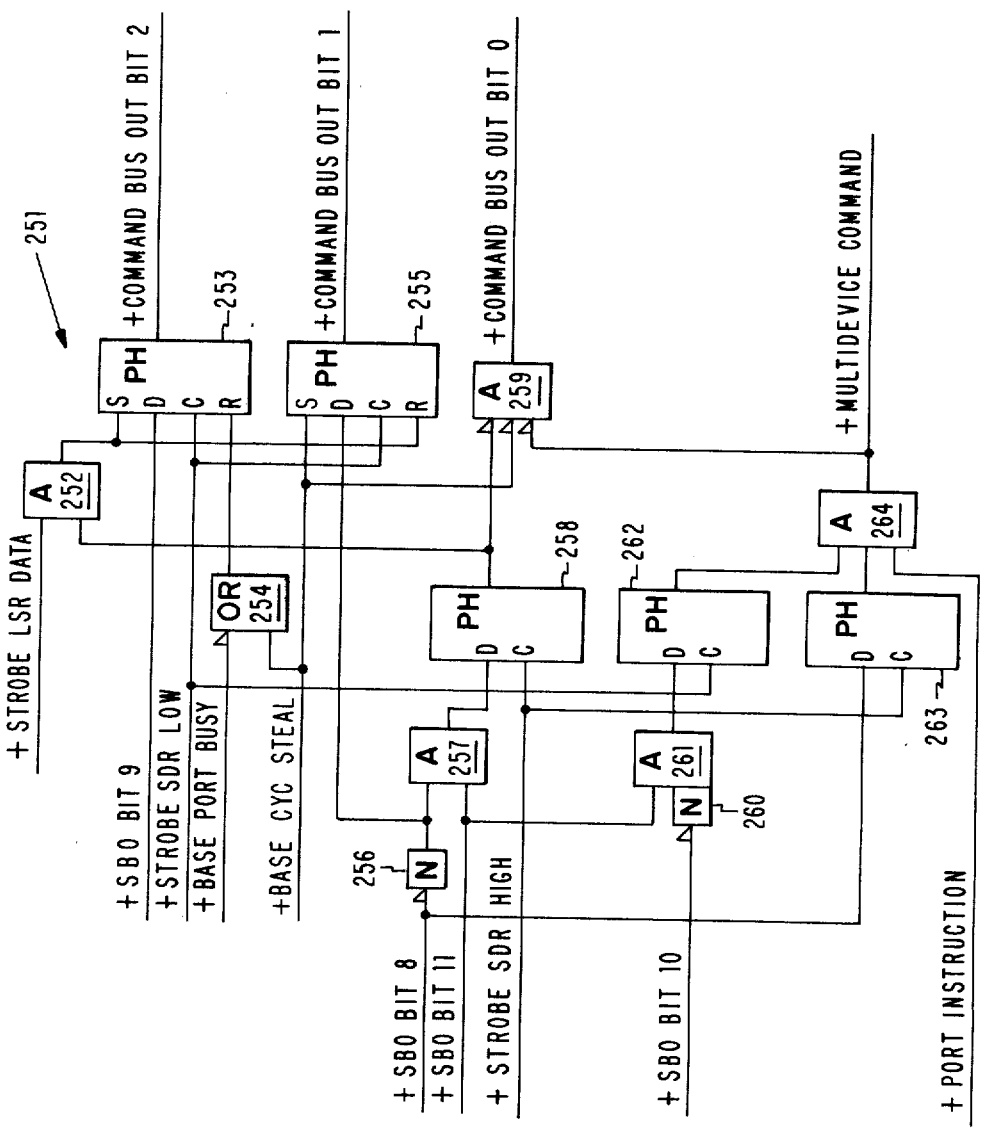
Figure 11:
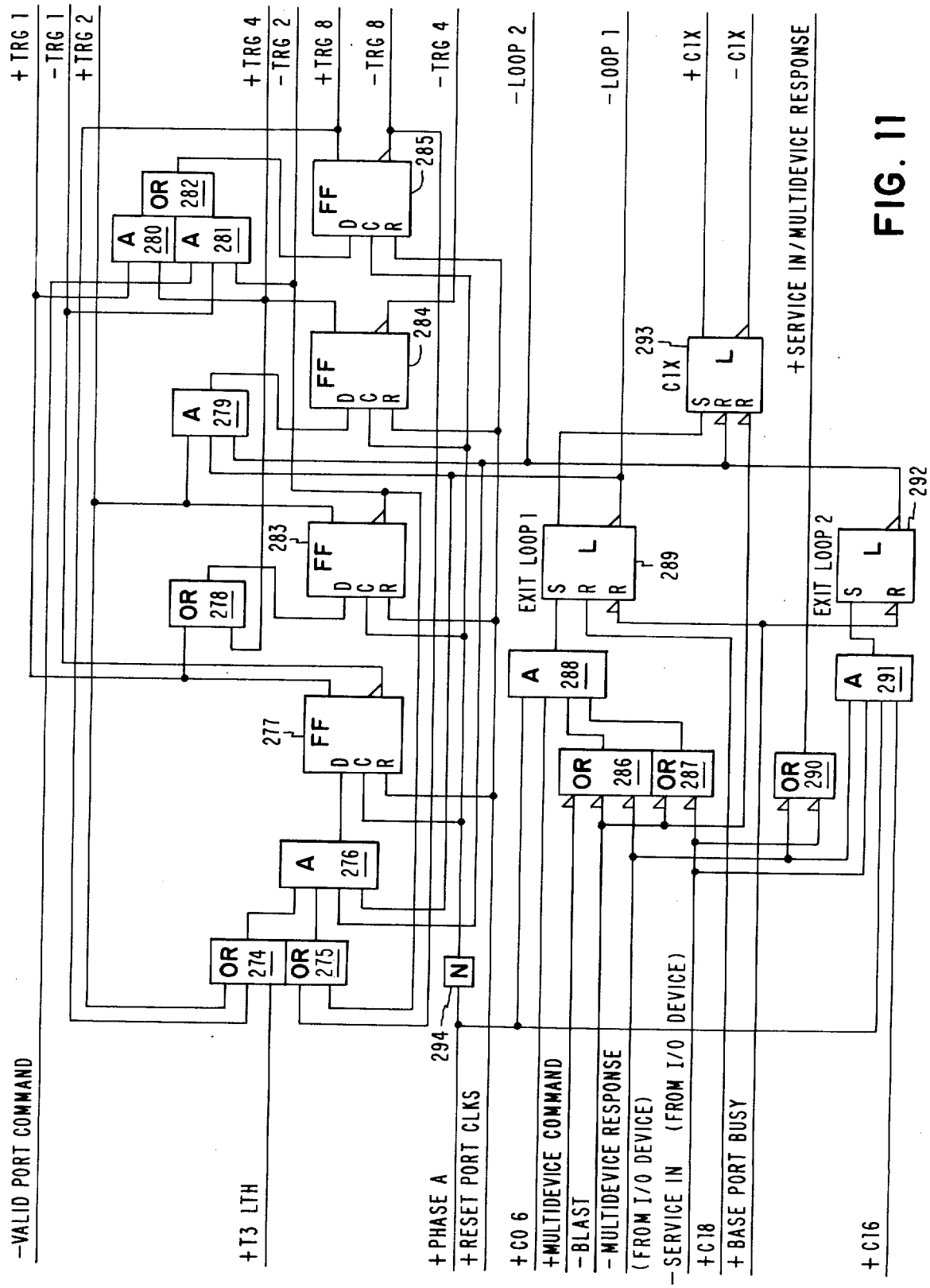
Figure 12A:
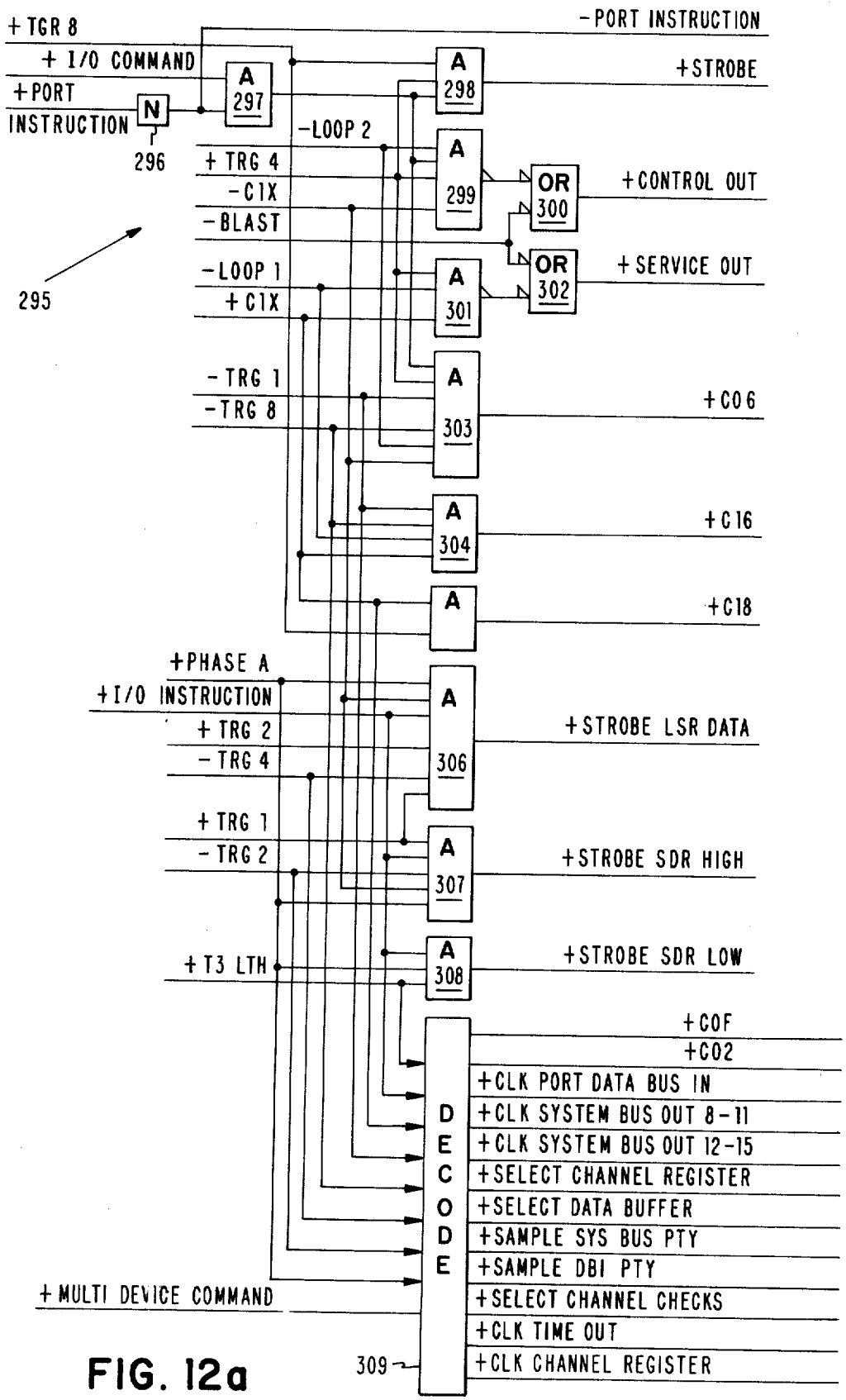
Figure 12B:
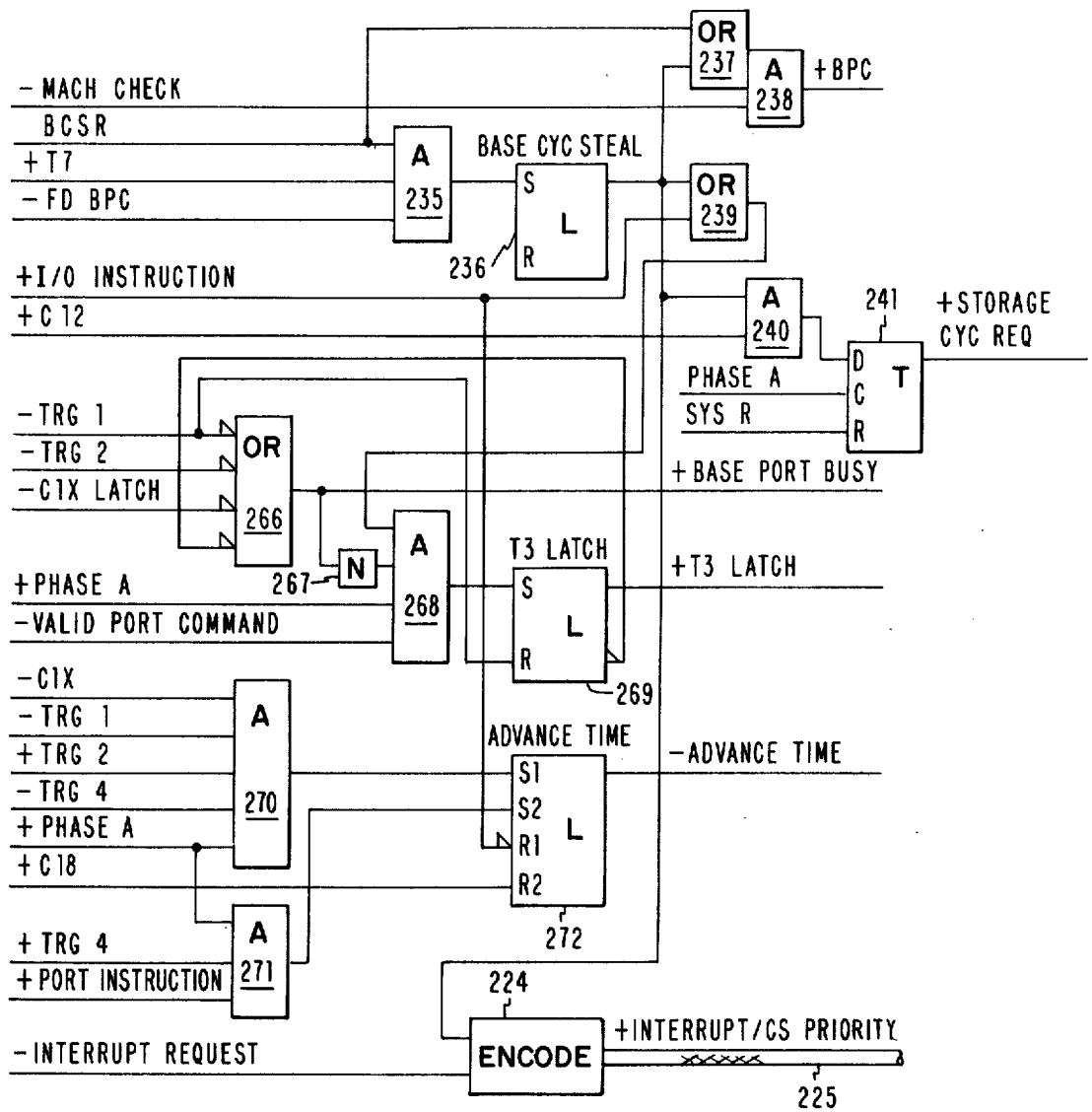
Figure 13:
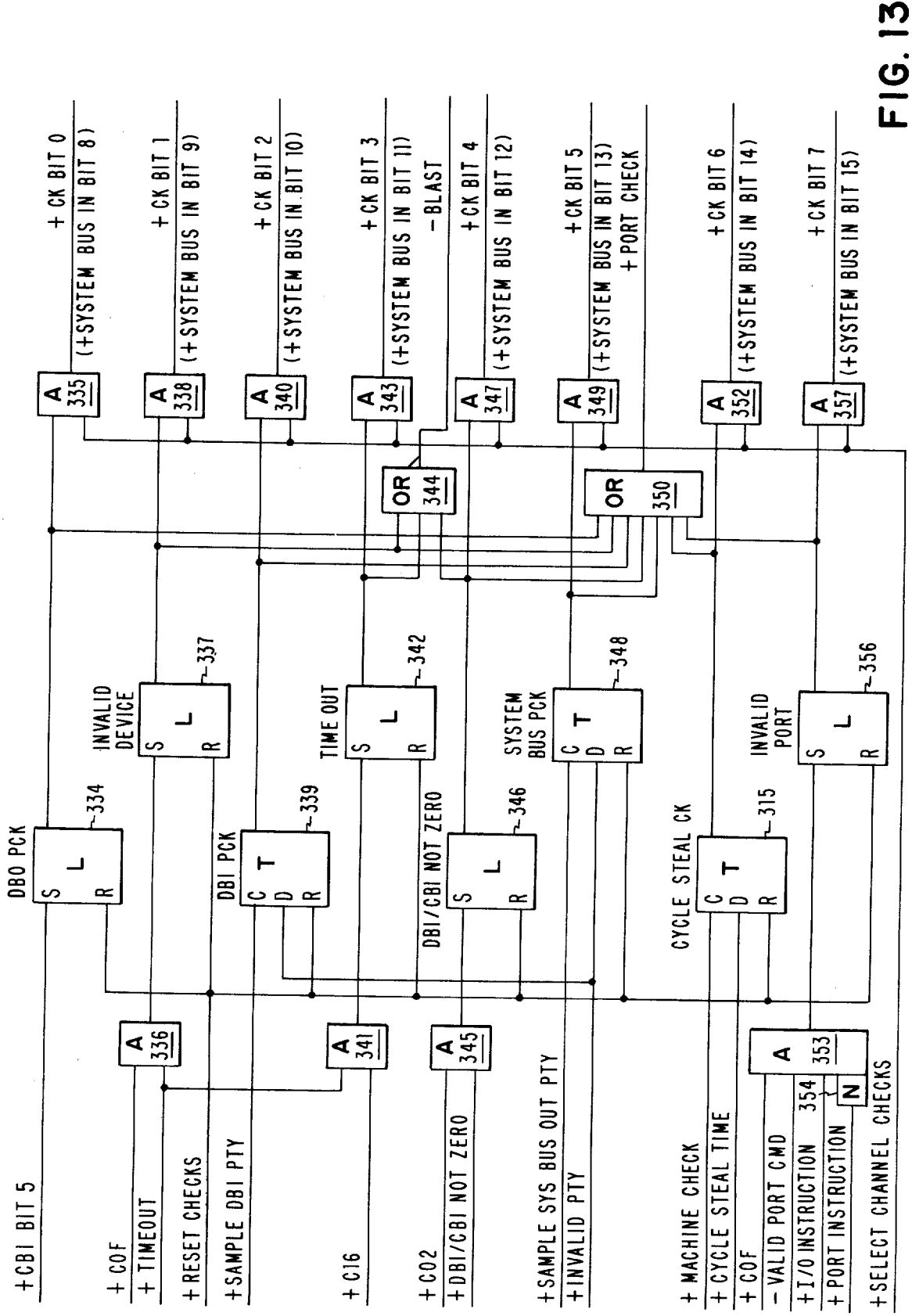
Figure 14:
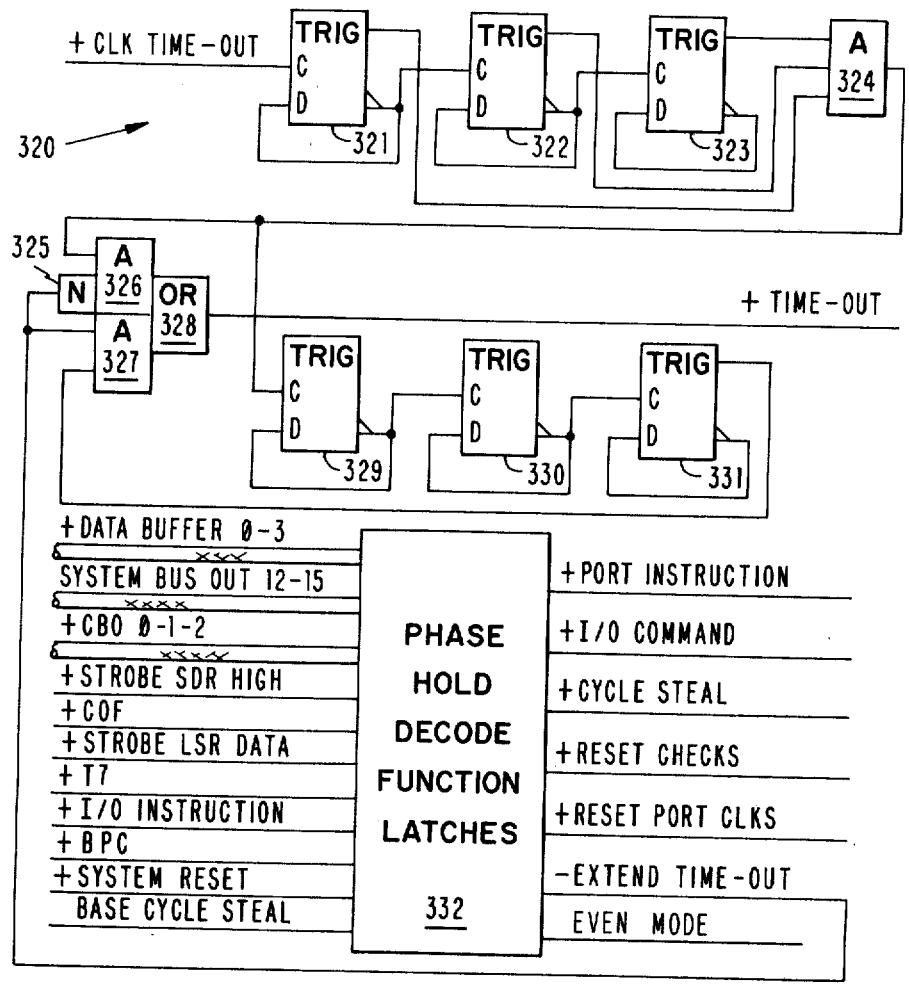
Figure 15:
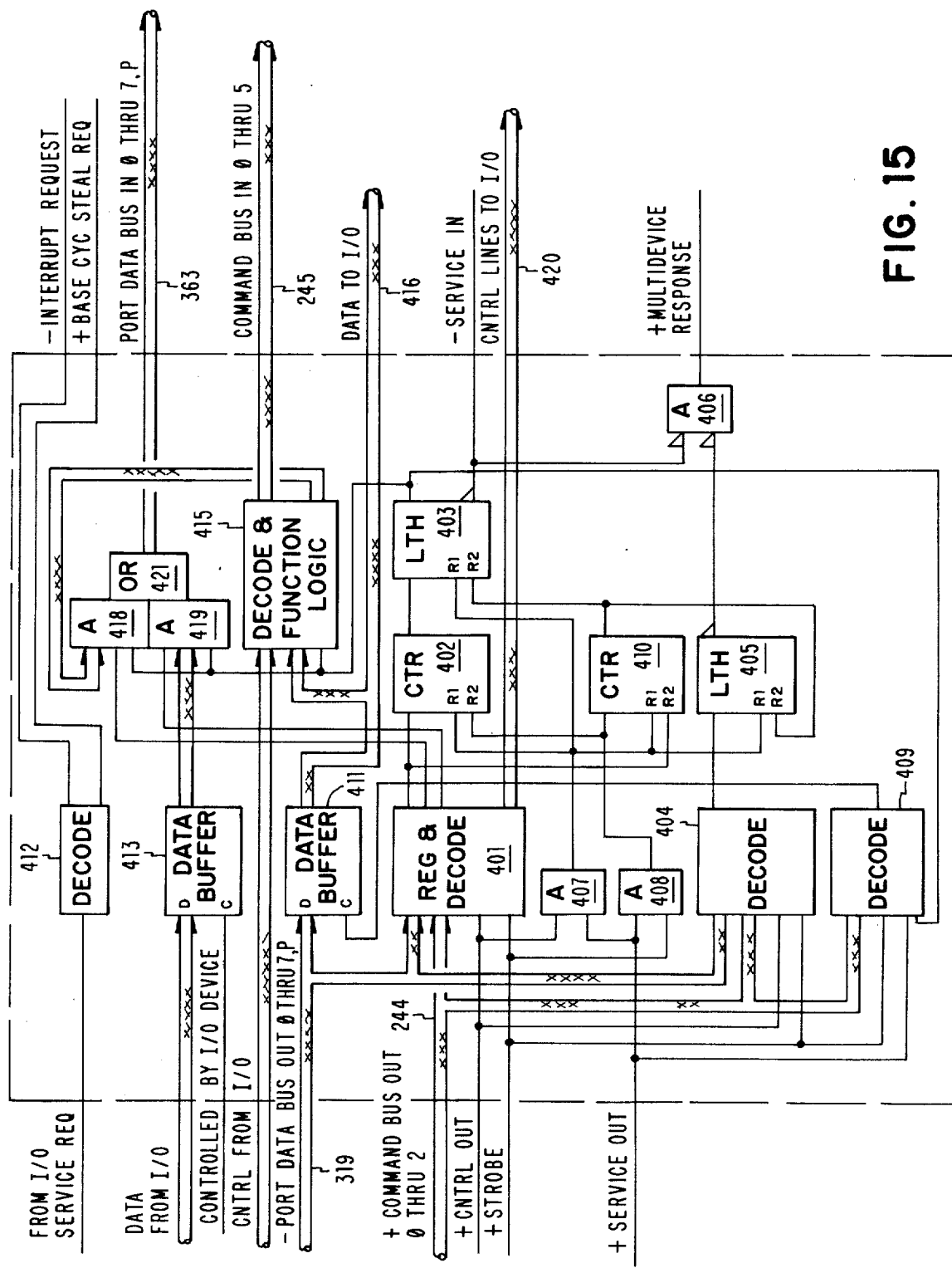
Figure 17:
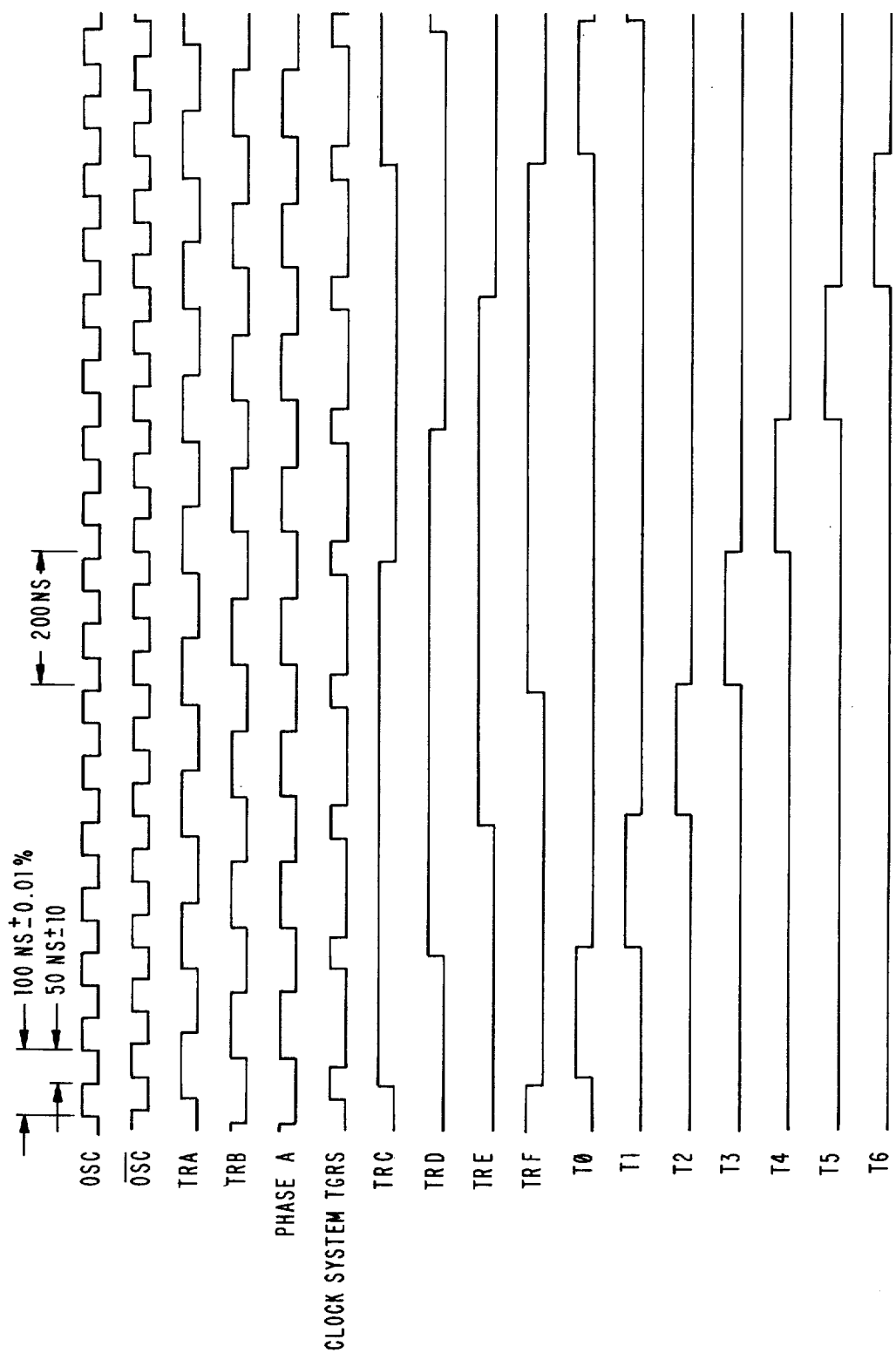
Figure 18:
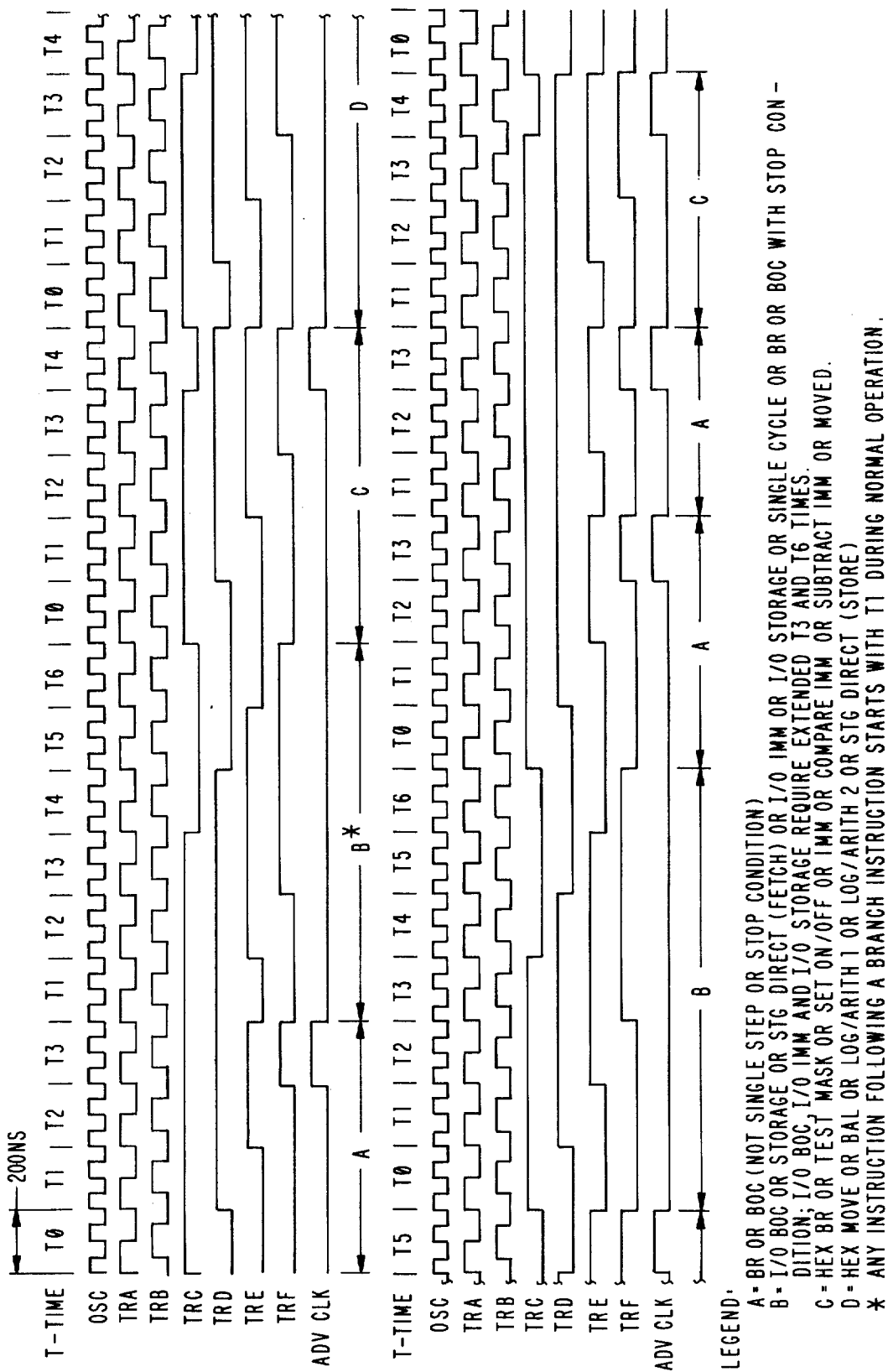
Figure 19:
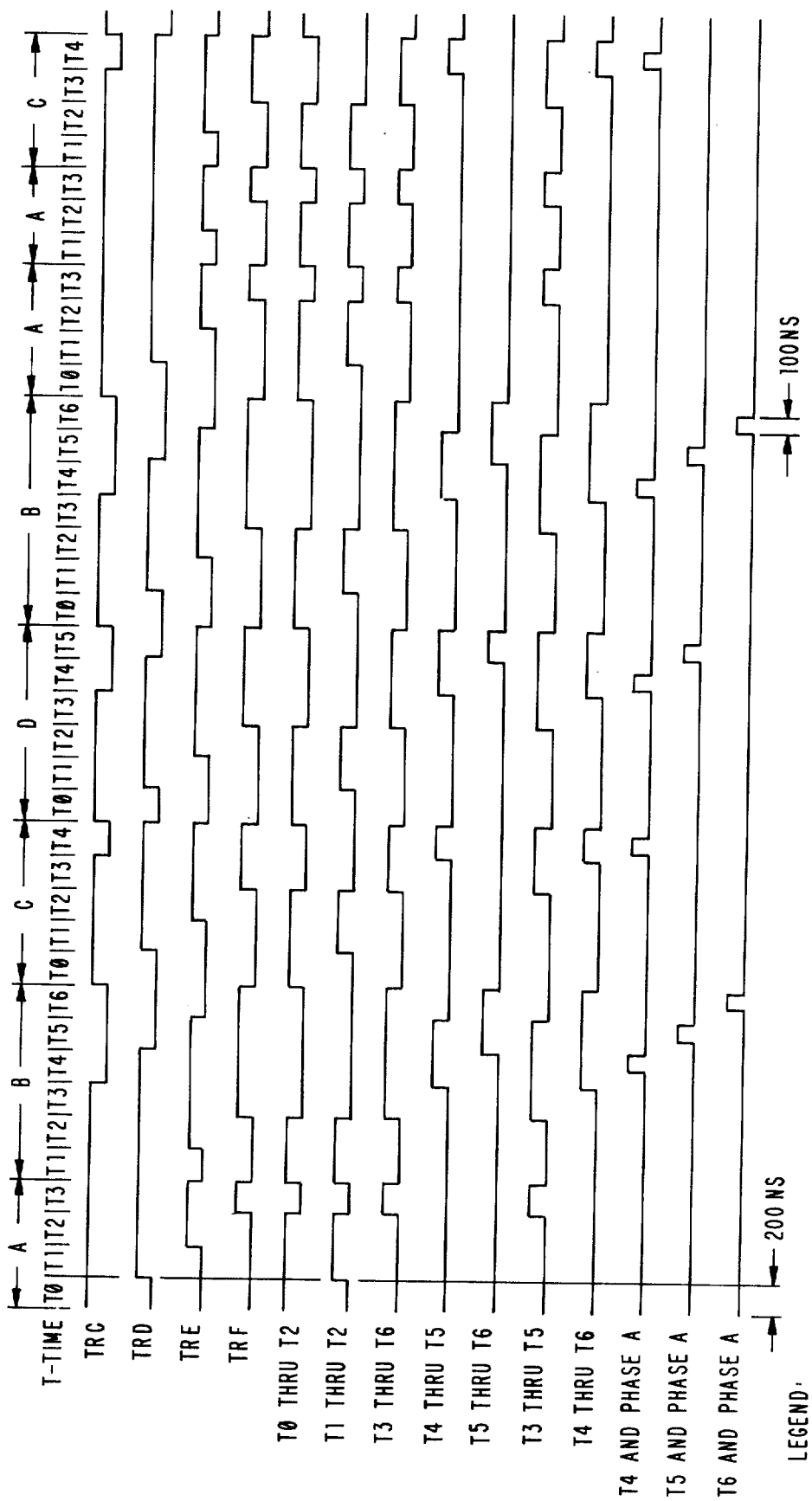
Figure 20:
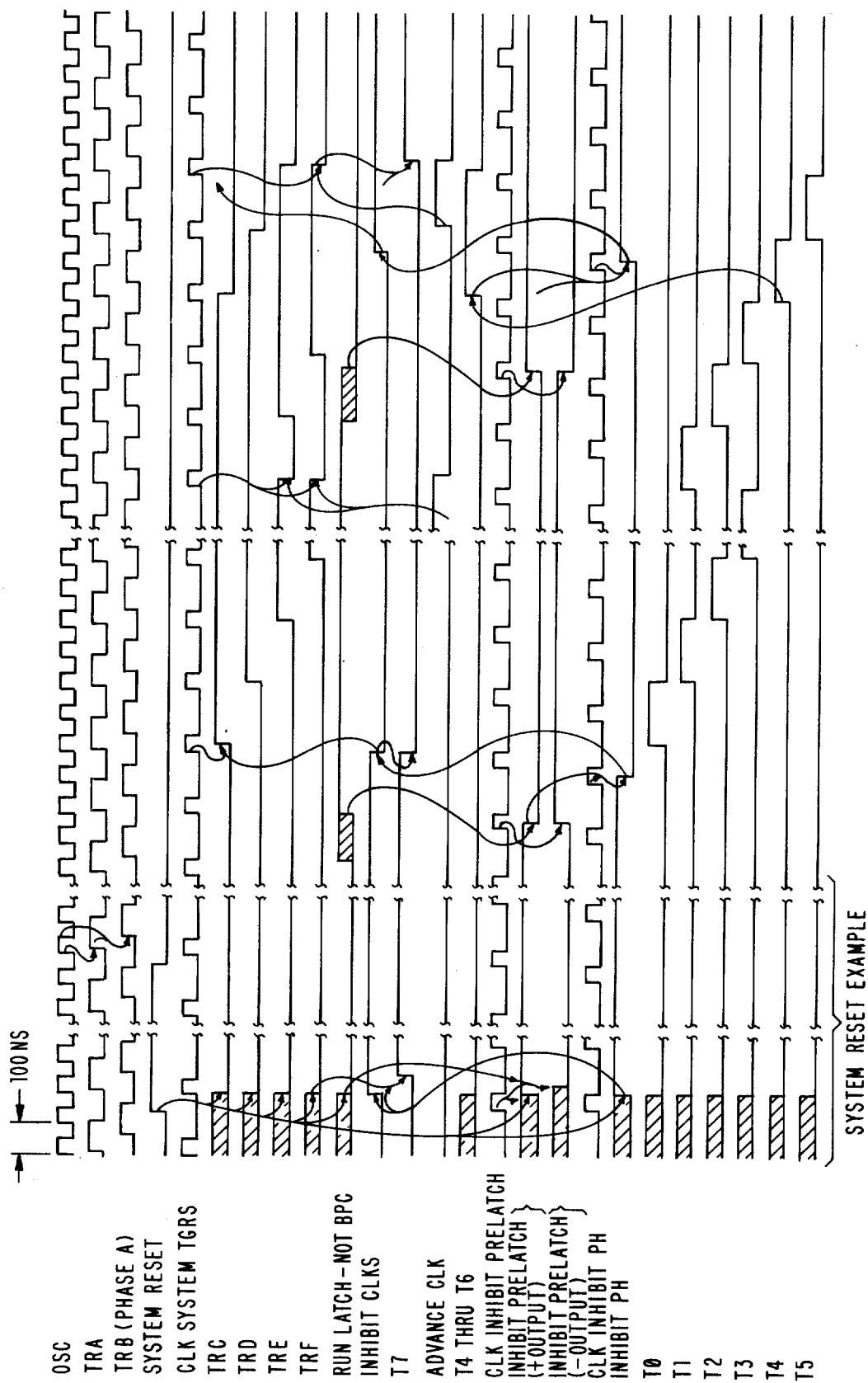
Figure 21:
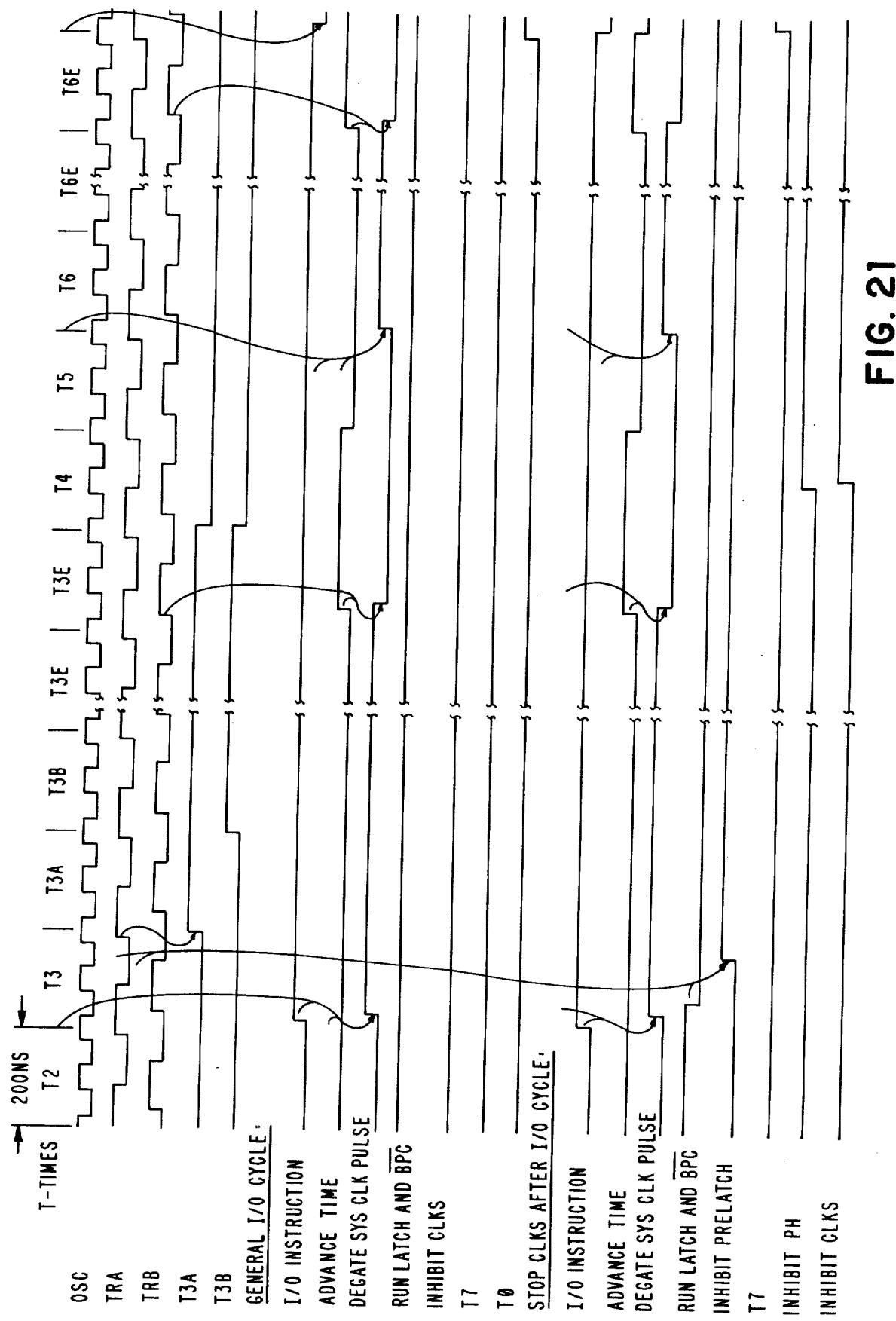
Figure 22:
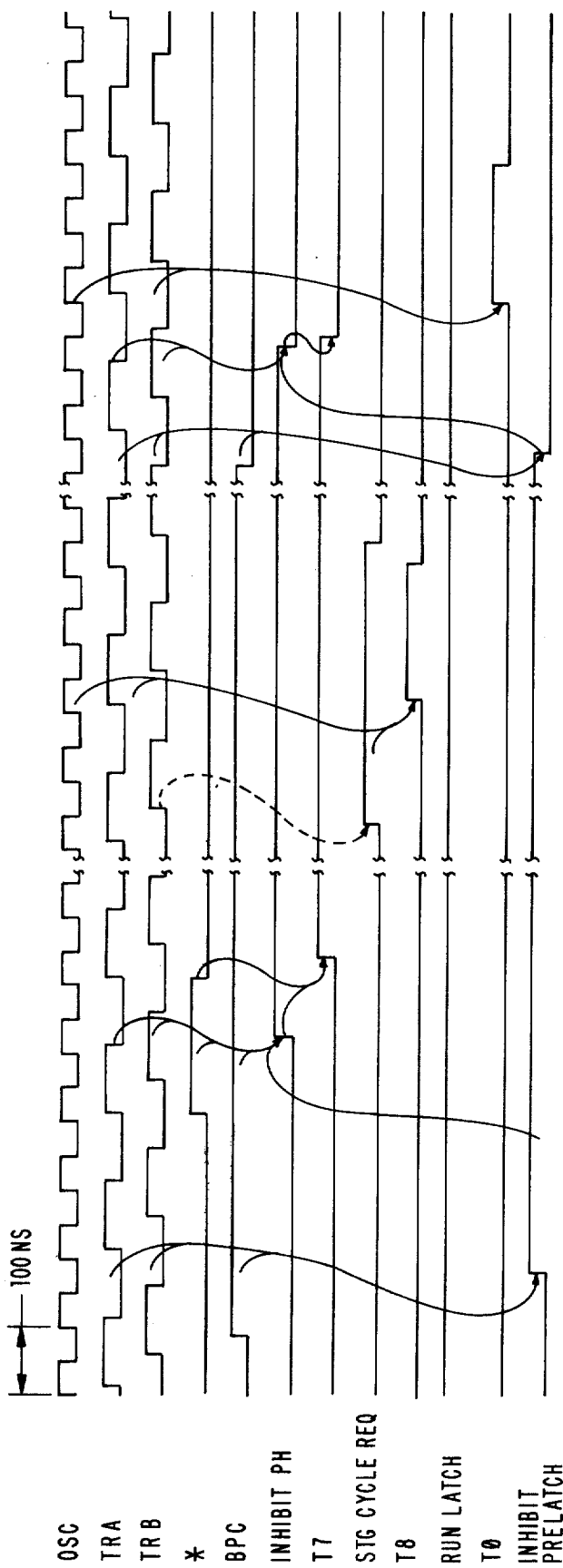
Figure 23:
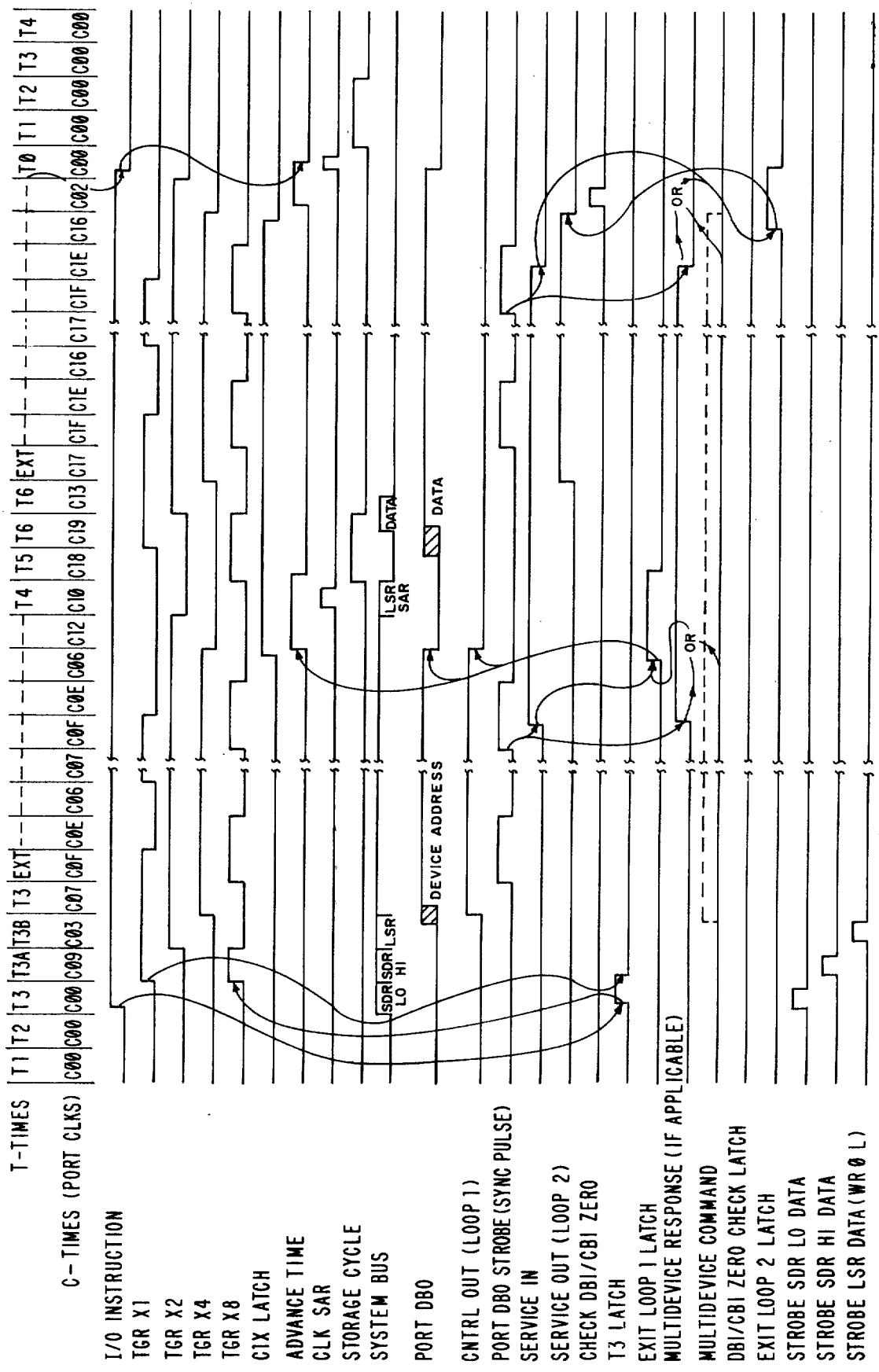
Figure 24:
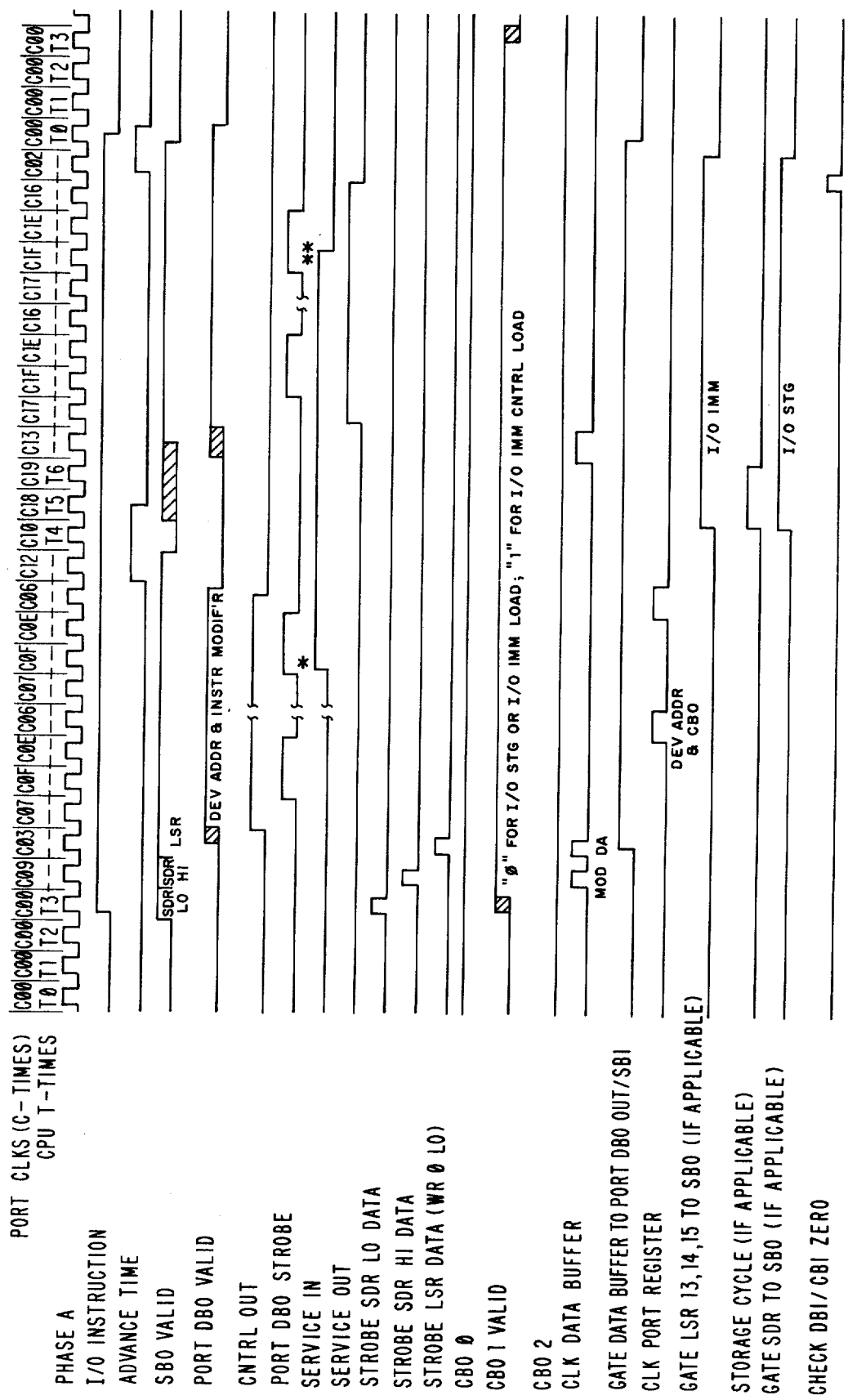
Figure 25:
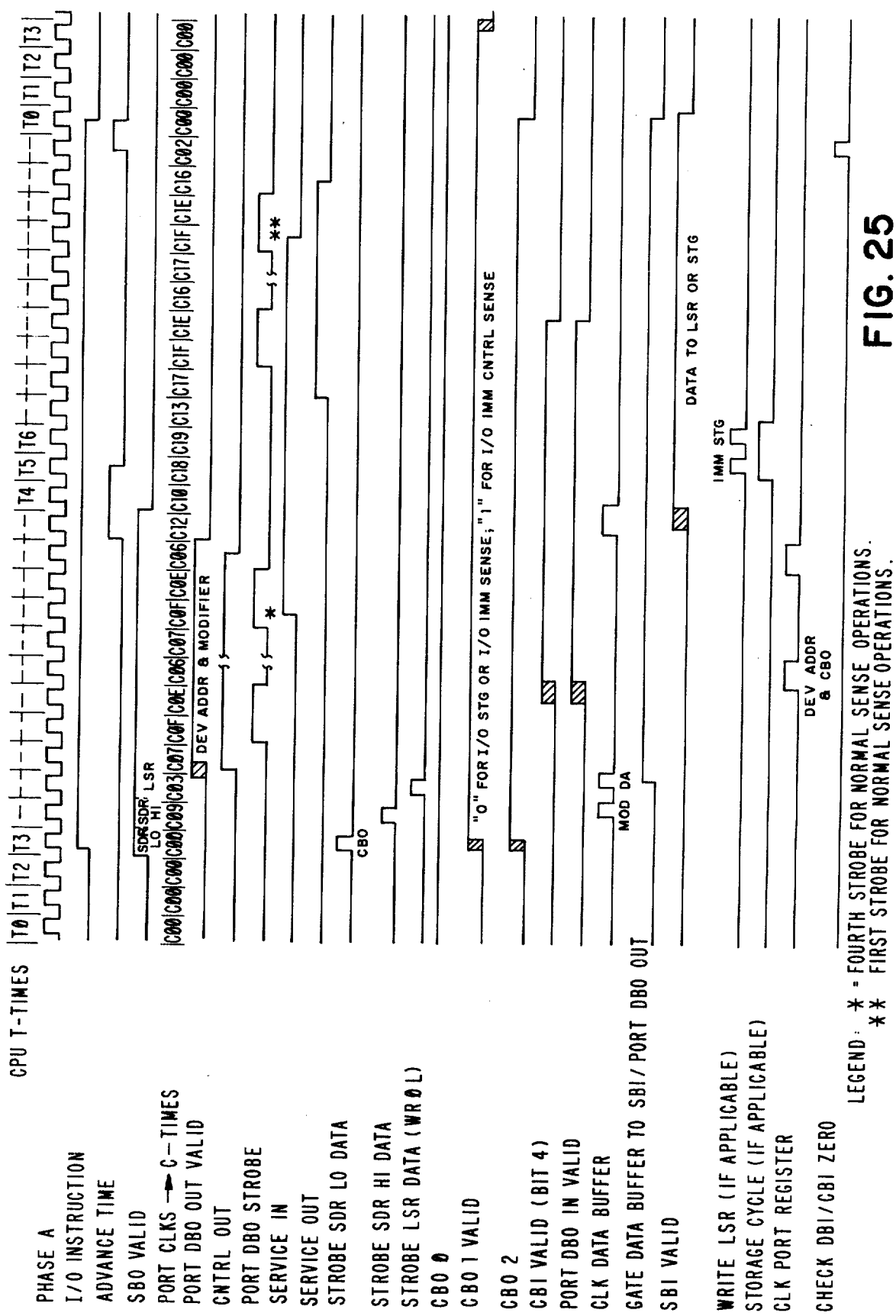
Figure 26:
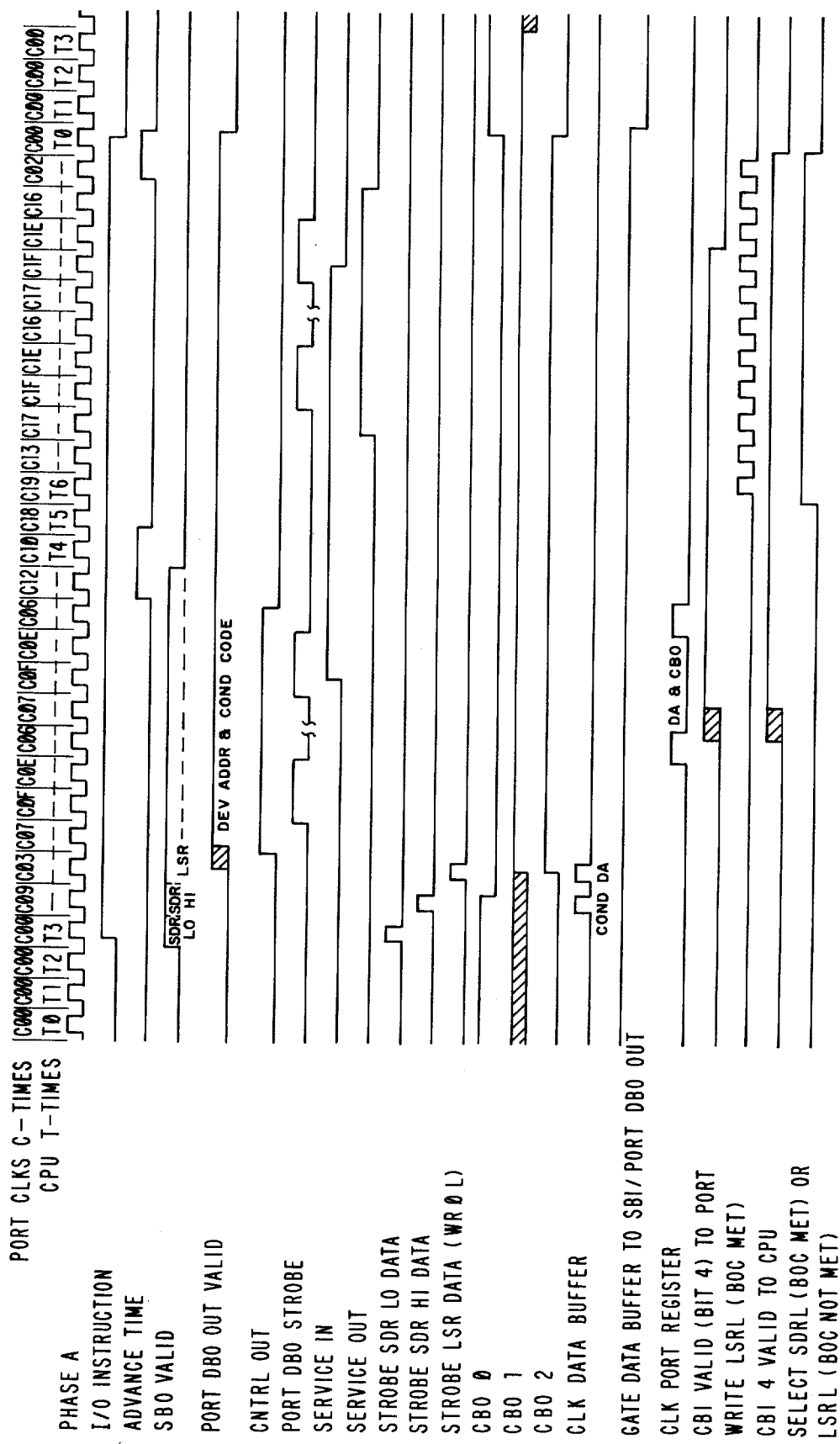
Figure 29:
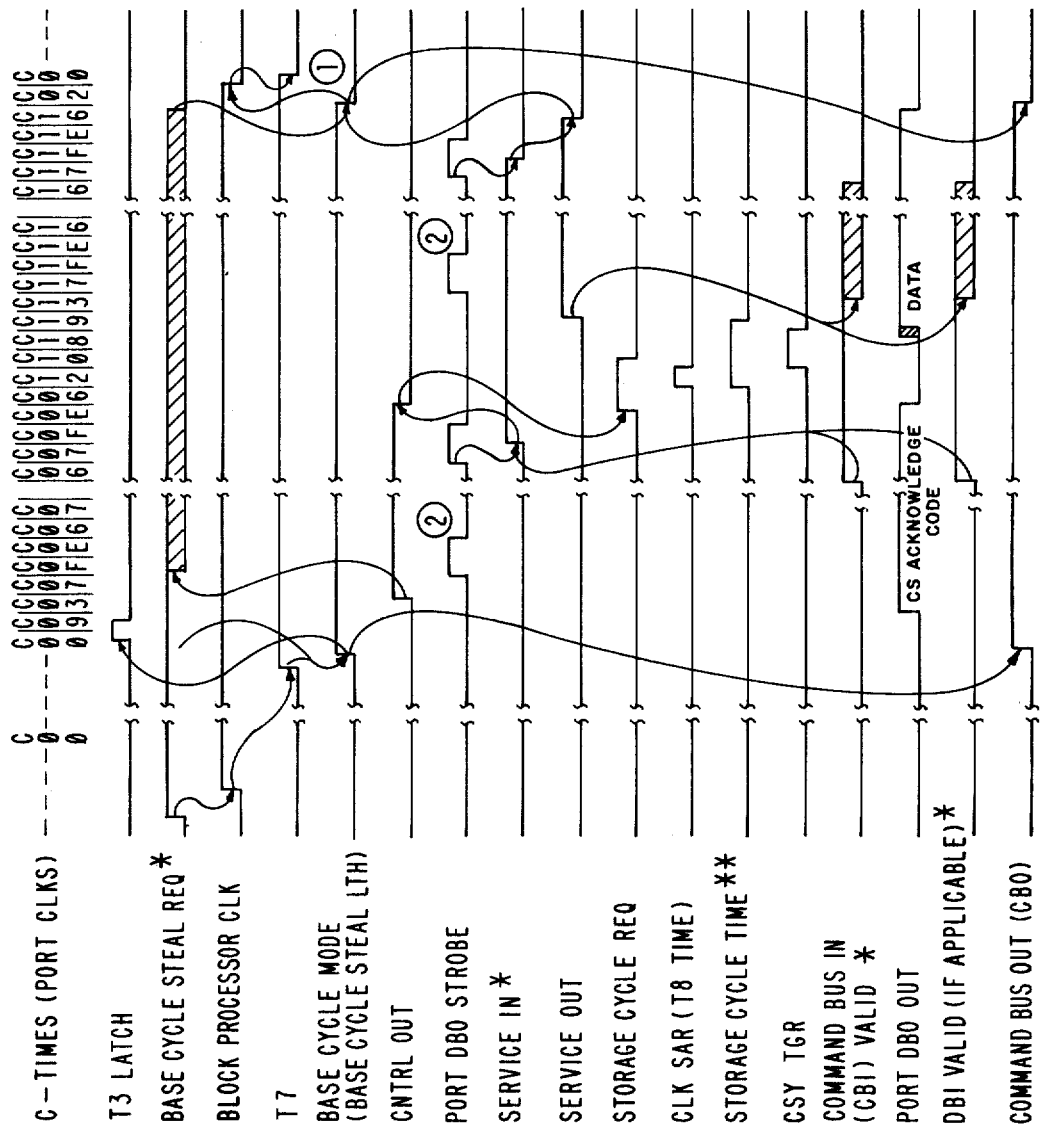
Figures 30, 31:
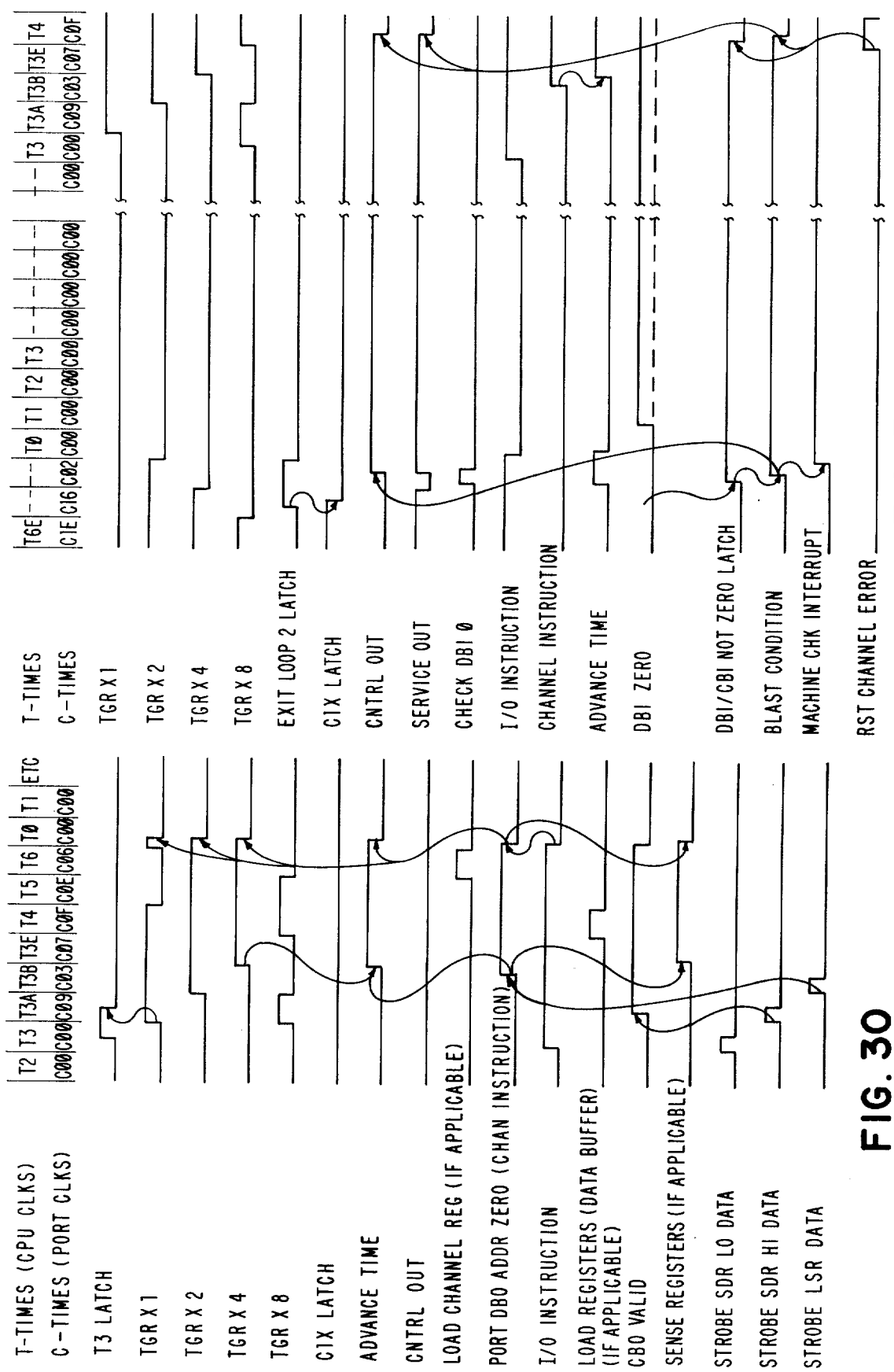

FIGS. 4a, 4b and 4c taken together as in FIG. 4, constitute a schematic logic diagram illustrating storage gate control for I/O instructions and base cycle steal;

FIGS. 5a and 5b, with FIG. 5a disposed above FIG. 5b, taken together are a schematic logic diagram illustrating I/O instruction decode, ALU and ALU gate control logic;

FIG. 6 is a schematic logic diagram illustrating the LSR address generation logic circuitry;

FIGS. 7a and 7b, with FIG. 7a disposed above FIG. 7b, taken together are a schematic logic diagram illustrating the ALU gates for controlling entry of data into local storage registers;

FIG. 8 is a schematic block diagram of the port shown in FIG. 1;

FIG. 9 is a schematic logic diagram of the port data buffers and channel register;

FIG. 10 is a schematic logic diagram of the port logic for forming I/O command bus out signals;

FIG. 11 is a schematic logic diagram of the port clocks;

FIGS. 12a and 12b are schematic logic diagrams of port clocks decode logic for generating control and synchronizing signals;

FIG. 13 is a schematic logic diagram of port check logic;

FIG. 14 is a schematic logic diagram of time out and decode logic;

FIG. 15 is a schematic logic diagram of a typical I/O attachment;

FIG. 16 is a schematic block diagram illustrating the I/O instruction formats;

FIG. 17 is a timing diagram illustrating general CPU clock times;

FIG. 18 is a timing diagram illustrating CPU timings for various types of instructions including I/O instructions;

FIG. 19 is a timing diagram illustrating combinations of CPU clock times for various types of instructions;

FIG. 20 is a timing diagram illustrating CPU clock run control timings;

FIG. 21 is a timing diagram illustrating CPU clock controls for I/O instructions;

FIG. 22 is a timing diagram illustrating CPU clock controls for I/O cycle steal operations;

FIG. 23 is a timing diagram illustrating general I/O instruction timing;

FIG. 24 is a timing diagram illustrating timing for an I/O load instruction for both I/O immediate and I/O storage instructions;

FIG. 25 is a timing diagram illustrating timing for an I/O sense instruction for both I/O immediate and I/O storage instructions;

FIG. 26 is a timing diagram illustrating timing for an I/O branch on condition instruction;

FIG. 27 is a timing diagram illustrating timing for a port I/O sense instruction;

FIG. 28 is a timing diagram illustrating timing for a port I/O load instruction;

FIG. 29 is a timing diagram illustrating timing for a base port cycle steal operation;

FIG. 30 is a timing diagram illustrating port I/O instruction timing;

FIG. 31 is a timing diagram illustrating a blast condition due to DBI/CBI not zero;

FIG. 32 is a timing diagram illustrating a blast condition due to invalid device assigned; and FIG. 33 is a timing diagram illustrating a blast condition due to a time out check.

DESCRIPTION

With reference to the drawings and particularly to FIG. 1, the invention is illustrated by way of example as being incorporated into a stored program computer system which includes control storage 10, main storage 11, central processing unit 15, port 250, I/O attachments 400, 450, 480 and I/O devices 425, 460 and 490. I/O attachment 400, as will be seen later herein, is representative of an I/O attachment servicing an I/O device operating under instruction control or an I/O device operating under base cycle steal control. When I/O attachment 400 is servicing an I/O device operating under I/O instruction control, the I/O device generates an interrupt request. The interrupt request is honored according to an interrupt priority system which does not form part of this invention. The interrupt switches the operation of the computer into a program routine for fetching one or more I/O instructions. The fetched I/O instruction is executed and the operation either involves the fetching of another I/O instruction or the switching into another interrupt routine or the returning to the main program level. Of course, the invention is also applicable in a computer mode of operation where the I/O instruction is fetched as a consequence of occurring sequentially in the instruction stream. Thus, I/O attachment 400 can be multiplexed with the operation of I/O attachment 480 which also can service an I/O device operating under either I/O instruction or base cycle steal control. I/O attachments can be placed on the same interrupt priority level because the present invention includes a multi-device command for determining which I/O device attachment is requesting the interrupt.

Base cycle steal control differs from I/O instruction control in that no instruction is involved for the data transfer; rather the operation of the CPU and storage is dedicated to the I/O device granted the cycle steal (usually there is a cycle steal priority system) after execution of the current or the next occurring instruction, depending upon when the cycle steal request occurs, has been completed. A base cycle steal operation, however, requires the same synchronizing and de-synchronizing control logic of the present invention as required for I/O instruction operation. The I/O instructions are used, however, to initialize the I/O attachment prior to the actual cycle steal. The cycle steal is then taken to effect the data transfer.

The burst mode device attachment 450 operates in a cycle steal mode, but does not require the synchronizing and de-synchronizing control logic of the present invention. It operates in a dedicated mode where all available CPU and storage cycles are dedicated to the I/O attachment 450 or the attached I/O device 460. I/O device 460 is of the type having high data transfer rate requirements such as a disk storage drive. I/O attachment 450 and I/O device 460 do not form a part of the present invention but are included herein only to provide a greater appreciation of the present invention. They can be of the type shown and described in commonly assigned copending patent application Ser. No. 488,349 for "Cycle Interleaving During Burst Mode Operation".

In this particular example, control storage 10 is two bytes wide where each byte consists of eight data bits plus a parity bit. Control storage 10 contains the instructions which are fetched and executed by CPU 15. Main storage 11 is one byte wide and it contains the data to be operated upon by the CPU and data to be used by the I/O devices. Instructions are fetched from control storage 10 and I/O instructions will be either fetched as they occur sequentially in the instruction stream or as they are encountered in an interrupt routine.

Figure 2:
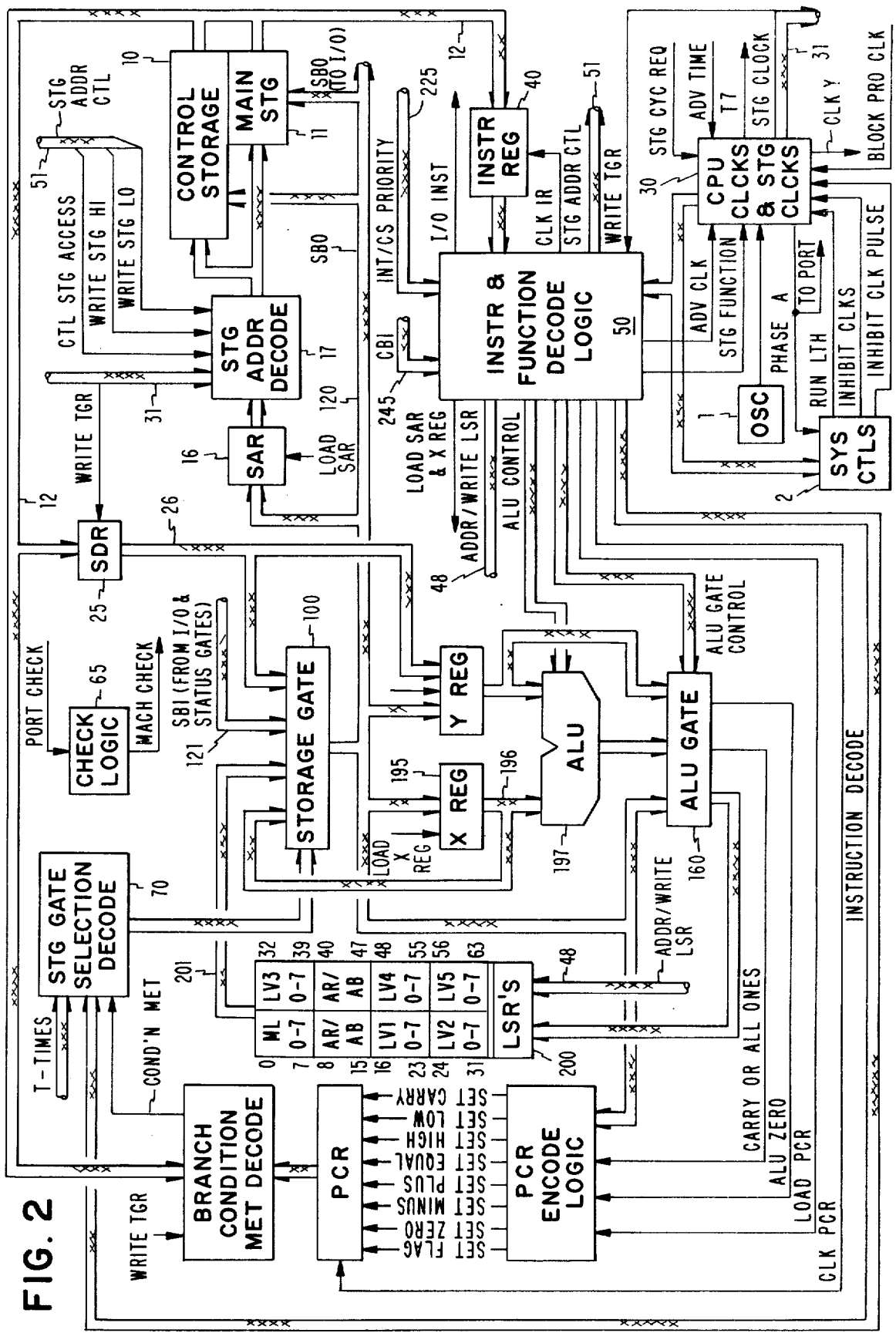
FIG. 2 is a block diagram of the central processing unit of FIG. 1.

Control storage 10 and main storage 11 are addressed by a sixteen bit address entered into storage address register 16, FIG. 2. The storage address is decoded by storage address decode logic 17 which received storage clock times from CPU and storage clocks 30 over bus 31 and storage address control lines from instruction and function decode logic 50 over bus 51. The storage address control lines, STG ADR CTL, include a line for a control storage access signal CTL STG ACCESS, a line for a write storage high signal, WR STG HI, and a line for a write storage low signal, WR STG LO. Control storage 10 has both a high and a low byte whereas main storage is considered to have a low byte only. These terms are relative and could be interchanged without affecting the scope of the invention; however, they are terms well known in the computer art.

Instructions are fetched at a predetermined time within the instruction cycle which includes both instruction fetch and execution portions as illustrated in FIGS. 18 and 19. Except for instructions following a branch or branch-on-condition instruction, instructions are fetched starting at T0 time. System controls represented by block 2 provide a run latch signal RUN LTH which is fed to Inhibit and Advance clock logic 34 of CPU clock 30. The Run LTH signal causes inhibit latches in logic 34 to be reset and thereby de-activates an INHIBIT CLKS signal to System Clock Triggers and Control Logic 35 to enable the clock triggers to sequence. The timing is shown in detail in FIG. 20. As FIG. 20 shows, when the RUN LTH signal is deactivated, the System Clock Triggers are stopped in an orderly manner (except for the case of a system reset, wherein the triggers are all forced to a reset state immediately) and remain stopped in a T7 state by the INHIBIT CLKS signal until the RUN LTH signal causes the INHIBIT CLKS signal to be de-activated.

Figure 3:
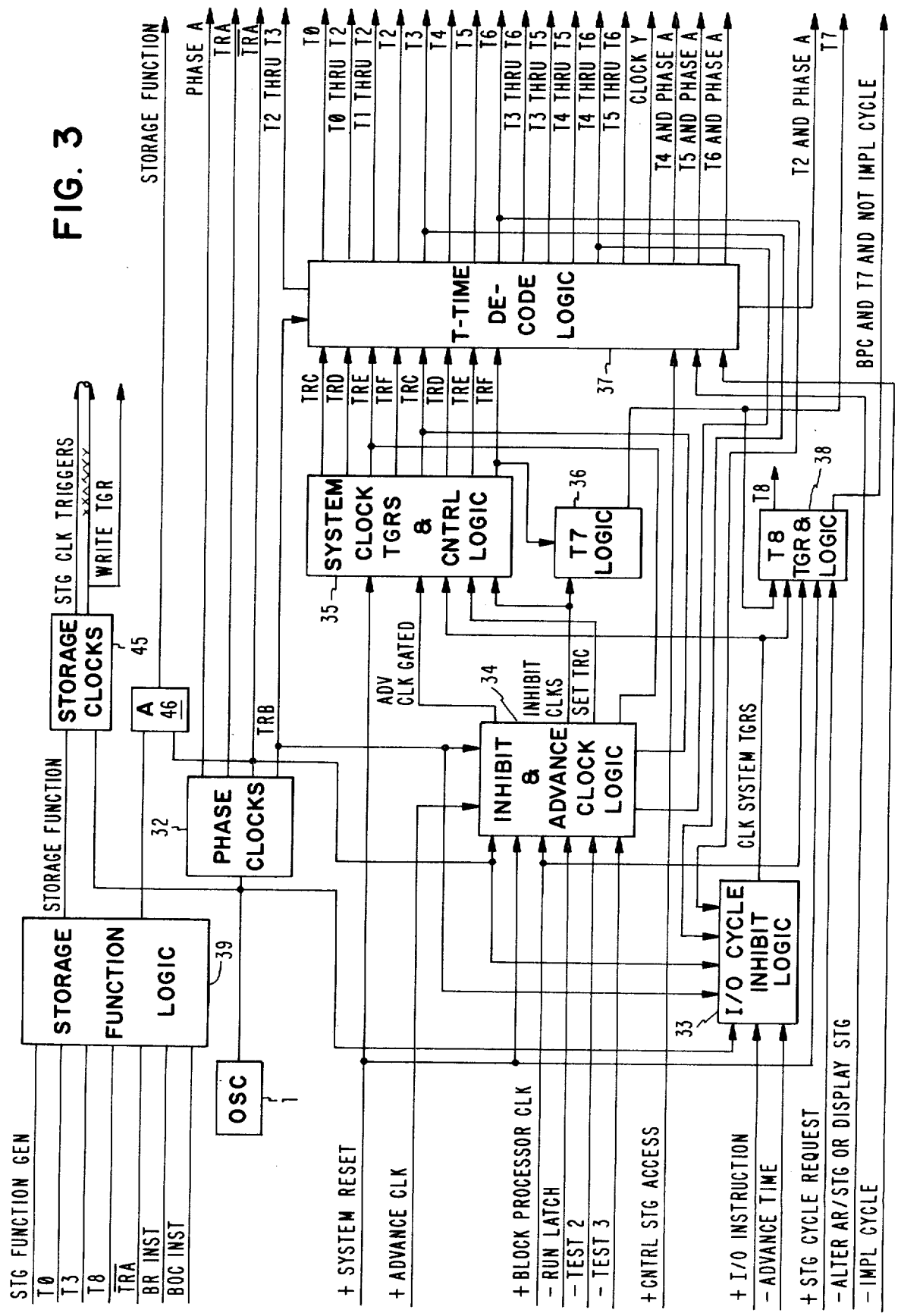
FIG. 3 is a schematic logic diagram of the central processing unit clocks and storage clocks and controls.

The CPU Clocks and Storage Clocks 30 are driven from a free running 100 MHZ oscillator 1 having an output as illustrated in FIG. 17. The signals from oscillator 1 drive free running triggers TRA and TRB in phase clocks 32. The output from trigger TRA is the data input for trigger TRB. A phase clock signal Phase A is formed from the signals TRA and TRB. The System Clock Triggers 35 (TRC, TRD, TRE, TRI) are clocked at 200 nanosecond intervals. The outputs of these triggers are decoded by T-Time Decode Logic 37 to generate T times T0-T6 plus combinations of T times as indicated in FIGS. 3 and 19. The fetch cycle ends at the end of T2 time and the instruction execution cycle begins at T3 time. The end of the instruction execution cycle depends upon the particular type of instruction being executed. The timing for fetching and executing an I/O instruction is shown in detail in FIG. 23. In this particular example, there are three types of I/O instructions. The formats for the I/O immediate, I/O storage and I/O branch-on-condition instructions are shown in FIG. 16. It is seen that each instruction is two bytes long and consists of 16 bits.

The instructions upon being fetched from control storage 10 are entered into instruction register 40 and storage data register 25 simultaneously via storage bus 12. The instruction in register 40 is decoded by instruction and function decode logic 50. Logic 50, of course, has to decode all types of instructions; however, only that portion of logic 50 for decoding I/O instructions is shown. Each I/O instruction as seen in FIG. 16 has an op code encoded by bits 0-3 inclusive. The op code is indicative of the type of instruction and the operation to be performed. Bits 4-7 inclusive of the I/O instruction are called modifier bits and in general are I/O attachment dependent. Bits 8-15 inclusive are utilized by the CPU 15 and the port 250 to perform predefined tasks that are specific for each tyfpe of I/O instruction. It should be noted that in this example, only one port is shown; however, there can be multiple ports where each port is separately addressable.

It is seen in FIG. 2 that the instruction and function decode logic 50 provides signals to the storage gate selection decode logic 70 which in turn provides signals for controlling storage gate 100. Storage gate 100 controls the passage of data from storage data register 25 via bus 26 to system bus out (SBO) 120 and system bus out feeds port 250. Thus storage gate 100 controls the flow of data and control information to port 250. Storage gate 100 also receives data from local storage registers (LSR's) 200 via bus 201. Consequently, data and control information can be sent to the port 250 from two different sources. It should be noted that bus 120 as it leaves storage gate 100 is two bytes wide; however, it is only one byte wide (bits 8-15) as it goes to port 250.

That portion of the instruction and function decode logic 50 for decoding I/O instructions is shown in FIGS. 5a and 5b. The I/O branch-on-condition instruction has an op code of 0011 and this op code upon residing in instruction register 40 is decoded by inverters 52 and 53 and AND circuit 54. The I/O immediate instruction has an op code of 1011 and it is decoded by inverter 52 and AND circuit 55. The I/O storage instruction has an op code of 0100 and it is decoded by inverters 56, 57 and 58 and AND circuit 59.

An I/O instruction signal is also used by the storage gate selection decode logic 70, FIG. 4a, and this signal is present only when there is an I/O instruction being executed to effect a port or an I/O device operation. The I/O immediate instruction can be executed internally within the CPU and when this occurs, the I/O instruction signal will not be present. The determination of whether the I/O immediate instruction is for the port or an I/O device or for the CPU, depends upon the state of bit 10 in instruction register 40, FIGS. 2 and 5a. If bit 10 is 1, then the I/O immediate instruction is for the CPU and conversely if it is 0, it is an I/O instruction for the port or an I/O device. Accordingly, the I/O instruction signal is decoded by inverter 60, AND circuit 61, OR circuit 62 and AND circuit 63, FIG. 5a. The I/O BOC, I/O IMM, I/O STG and I/O instruction signals are fed to storage gate selection decode logic 70, FIG. 2, where that portion of the storage gate selection decode logic for I/O instruction is shown in detail in FIGS. 4a, 4b and 4c.

To appreciate the operation of the storage gates 100, it should be noted that three successive bytes are sent to the port during execution of an I/O instruction. In FIG. 23, it is seen that the execution of an I/O instruction starts at T3 time. The first byte of data placed on SYSTEM BUS OUT 120 is the low byte taken from storage data regisyter (SDR) 25. The port 250 thus receives the low byte of the I/O instruction first. The second byte sent to the port 250 is the high byte of the instruction and is taken from the high byte of SDR 25. This byte of data is sent to the port during T3A time. Then at T3B time a byte of data from the low byte portion of the first LSR of the LSR's for a particular interrupt level is sent to the port. The timing of CPU Clocks for I/O instructions is shown in FIG. 21.

Storage gate 100, as seen in FIG. 4c, includes storage gate low 101 and storage gate high 107. The first byte of data sent to the port is gated by AND circuit 103 via OR circuit 106 to SYSTEM BUS OUT 120. AND circuit 103 receives bits 8-15 from SDR 25 via bus 26 and is controlled by the output of OR circuit 139, FIG. 4b, and the output of inverter 113. OR circuit 139 is fed by OR circuit 86, FIG. 4a. OR circuit 86 provides a STG gate LO SEL 1 signal and is fed by AND circuits 76-80 inclusive. AND circuit 76 is in control at this time and it receives a T3 timing signal, the I/O instruction signal and a-T3A signal from inverter 83. The T3 timing signal comes from CPU and storage clocks 30, FIGS. 2 and 3, which will be described in detail later herein.

Inverter 113 which also controls AND circuit 103 is fed by the output of OR circuit 92 which develops a STG GATE LO SEL 0 signal. Of course, in order for AND circuit 103 to pass the SDR bits 8–15, there should not be a signal from OR circuit 92 because inverter 113 would then inhibit AND circuit 103. OR circuit 92 feeds inverter 113 via OR circuit 138. OR circuit 92 is fed by AND circuits 87–91 inclusive and none of these AND circuits is conditioned at this time because of the absence of a T5 THRU T6 signal and the absence of a T3A signal.

The next byte of data placed on SYSTEM BUS OUT 120 is at T3A time. This byte of data is the high byte from SDR 25 and is passed by AND circuit 109 via OR circuit 112 to AND circuit 105 and from AND circuit 105 to OR circuit 106 to SYSTEM BUS OUT 120. AND circuit 109 is fed by the high byte or bits 0–7 of SDR 25 via bus 26. It is conditioned by a STG GATE HI SEL 1 signal from the output of OR circuit 73 via OR circuit 132 and by the output of inverter 116. OR circuit 73 is fed by AND circuits 71 and 72; however, AND circuit 72 is not conditioned at this time. AND circuit 71, however, is conditioned because of the presence of a T3 timing signal and the I/O instruction signal. Inverter 116 is fed by the output of AND circuit 74 via OR circuit 130; however, this AND circuit will not have an output at this time because it requires a T5 thru T6 timing signal. Thus, inverter 116 will provide a conditioning signal for AND circuit 109.

It is seen in this particular instance that bits 0–7 from SDR 25 are passed by AND circuit 109 to AND circuit 105 via OR circuit 112. AND circuit 105 is controlled by outputs from OR circuits 86 and 92 via OR circuits 139 and 138 respectively. In this instance, AND circuit 77 is active because of the T3A signal and the not T3B signal from inverter 84. Accordingly, OR circuit 86 passes a STG GATE LO SEL 1 signal via OR circuit 139 for conditioning AND circuit 105. AND circuit 91 of the AND circuits feeding OR circuit 92 is active at this time because of the presence of the T3A signal and the absence of the T3B signal and it provides the STG GATE LO SEL 0 signal via OR circuits 92 and 138 for conditioning AND circuit 105. Thus, AND circuit 105 is active at this time to pass bits 0–7 from SDR 25 to bus 120, bits 8–15 for applying these bits to port 250.

The T3A timing signal comes from trigger 98, FIG. 4c, which has its data input connected to AND circuit 96. AND circuit 96 receives and I/O instruction signal and a T3 timing signal. The clock input of trigger 98 is connected to receive a trigger A (TRA) signal which is a timing signal from CPU and storage clock 30. OR circuit 97 which receives both a T4 and a T7 timing signal is connected to reset inputs of triggers 98 and 99. The set output of trigger 98 is a T3A signal and is applied to the data terminal of trigger 99. Trigger 99 is clocked by the TRA signal and is also reset under control of OR circuit 97. The output of trigger 99 is a T3B signal which is used in the gating control of the storage gates for transferring a byte of data from one of the LSR's 200 to port 250.

The LSR's 200 as seen in FIG. 2 consist of 64 16 bit registers. These registers are organized in groups with eight registers to a group. The main program level and the machine check level which are mutually exclusive levels share registers 0–7 inclusive. Registers 8–15 inclusive are address (AR) and address back up (AB) registers used by the main level, the machine check level and the interrupt levels 1 and 2. Interrupt level 1 uses registers 16–23 inclusive as work registers and interrupt level 2 uses registers 24–31 inclusive. Registers 32–39 inclusive are used as work registers for interrupt level 3. Registers 40–47 inclusive are address (AR) and address back up (AB) registers for interrupt levels 3, 4 and 5. Interrupt level 4 uses registers 48–55 inclusive and interrupt level 5 uses registers 56–63 inclusive.

The LSR's 200 are addressed under control of logic contained in the instruction and function decode logic 50. The address lines for selecting one of the LSR's for reading and for writing form bus 48. The LSR addressing decode logic for I/O instructions is shown in FIG. 6. Six bits are required for selecting one of the LSR's 200. Bit 0 is taken from AND circuit 203 which receives a signal from inverter 202 and a signal indicating cycle steal or interrupt level 3, 4 or 5. Inverter 202 receives a machine check signal from machine check logic 65.

AND circuit 207 provides bit 1 and it receives a cycle steal signal or an interrupt level 1, 2, 4 or 5 signal. It also receives a signal from inverter 202 and a signal from inverter 206. Inverter 206 is fed by OR circuit 205 which is fed by AND circuit 204 and also receives a timing signal T0 THRU T2. AND circuit 204 is fed by a T6 timing signal and the I/O BOC signal.

Bit 2 is taken from OR circuit 209 which is fed by AND circuit 208 and OR circuit 205. AND circuit 208 is fed by inverter 202 and receives a cycle steal or interrupt level 2 or 5 signals.

Bit 3 is taken from OR circuit 217 which is fed by AND circuits 211-216 inclusive and AND circuit 242. AND circuit 211 is fed by inverter 210 which in turn receives the I/O instruction signal. AND circuit 211 also receives bit 5 of instruction register 40 and a T3 timing signal. AND circuit 212 receives the T3 timing signal, the I/O instruction signal and bit 13 of instruction register 40. AND circuit 213 receives bit 5 of instruction register 40, a T4 THRU T5 timing signal and a signal from inverter 219. Inverter 219 is fed by OR circuit 218 which in turn receives the I/O STG and I/O IMM signals. AND circuit 214 receives bit 13 of instruction register 40, the T4 thru T5 timing signal and the output of OR circuit 218.

AND circuit 215 receives an input from inverter 202, a cycle steal or an interrupt level 1, 2, 4 or 5 signal, a T6 timing signal, and an I/O BOC signal. AND circuit 216 receives bit 13 of instruction register 40, a T6 timing signal and the output of inverter 227 which is connected to receive the I/O BOC signal. AND ciruit 242 is fed by a block processor clock, BPC signal and a T7 timing signal.

Bit 4 is taken from the output of OR circuit 226 which has inputs from AND circuits 220–225 inclusive. AND circuit 220 is connected to receive the output of inverter 210, a T3 timing signal, and bit 6 of instruction register 40. AND circuit 221 receives a T3 timing signal, the I/O instruction signal and bit 14 of instruction register 40. AND circuit 222 receives the T4 THRU T5 timing signal, the output of inverter 219 and bit 6 of instruction register 40. AND circuit 223 receives the T4 THRU T5 timing signal, the output of OR circuit 218 and bit 14 of instruction register 40. AND circuit 224 receives the cycle steal or interrupt level 2 or 5 signals, the T6 timing signal and the I/O BOC signal. AND circuit 225 receives the T6 timing signal, the output of inverter 227 and bit 14 of instruction register 40.

Bit 5 is taken from OR circuit 233 which has inputs from AND circuits 228–232 inclusive and AND circuit 243. AND circuit 228 receives the output of inverter 210, the T3 timing signal and bit 7 of instruction register 40. AND circuit 229 receives the T3 timing signal, the I/O instruction signal and bit 15 of instruction register 40. AND circuit 230 receives the T4 THRU T5 timing signal, the output of inverter 219 and bit 7 of instruction register 40. AND circuit 231 receives the T4 THRU T5 timing signal, the output of OR circuit 218 and bit 15 of instruction register 40. AND circuit 232 receives the output of inverter 227, the T6 timing signal and bit 15 of instruction register 40. AND circuit 243 receives the BPC signal, the T7 timing signal and bit 3 of COMMAND BUS IN CBI 24.

From the foregoing, it is seen that LSR address bits 0–5 inclusive will have particular states depending upon the type of I/O instruction being executed, the bit conditions of certain bits in the instruction register 40, the particular time state and cycle steal or the interrupt level. In any event, one byte from the selected LSR and in this particular instance the low byte of the work register for the current interrupt level is passed at T3B time by AND circuit 102 of storage gate low 101 via OR circuit 106 to bits 8–15 of SBO 120. AND circuit 102 will be conditioned at this time because inverters 113 and 114 will not be receiving signals from OR circuits 92 and 86 respectively via OR circuits 139 and 138 respectively. Also, the other inputs to OR circuits 138 and 139 are not active at this time.

This byte of data from the selected LSR, except for multi-device I/O instructions, contains the device address in bits 8–11 inclusive and the port address in bits 12–15 inclusive. Thus, at the end of T3B time of the I/O instruction, the device address and the port address are residing in port 250. If the I/O instruction being executed were for multiple I/O devices, then bits 8–11 inclusive of the LSR byte are modifier dependent bits and bits 12–15 inclusive are port address bits. The modifier dependent bits 8–11 inclusive are useable to perform specific commands for multiple I/O devices attached to the addressed I/O attachment.

The first byte of data sent to port 250 over system bus out 120 is examined by decode logic 251 FIGS. 8 and 10, which includes polarity holds 253, 255 and 262 each having their clock input connected to receive a STROBE SDR LOW signal. The STROBE SDR LOW signal comes from port clock decode logic, FIG. 12a. The data input of polarity hold 253 is connected to bit 9 of system bus out; however, the data input of polarity hold 255 is connected to the output of inverter 256 which in turn is connected to bit 8 of system bus out. The data input of polarity hold 262 is connected to the output of AND circuit 261. AND circuit 261 has an input from inverter 260 and an input from bit 11 of system bus out. Inverter 260 is connected to bit 10 of system bus out 120.

The outputs of polarity holds 253 and 255 provide command bus out bits 2 and 1 respectively of COMMAND BUS OUT (CBO) 244. COMMAND BUS OUT bit 0 is taken from AND circuit 259 which has inputs connected to polarity hold 258 and AND circuit 264 and to receive a +BASE CYC STEAL signal. Polarity hold 258 is clocked by a STROBE SDR HIGH signal coming from AND circuit 307 of the clock decode for the port clock, FIG. 12a. The data input of polarity hold 258 is connected to AND circuit 257. AND circuit 257 has an input connected to inverter 256 and an input connected to bit 11 of system bus out. Inverter 256 has its input connected to bit 8 of system bus out. AND circuit 264 has an input connected to polarity hold 262 and an input connected to polarity hold 263. Polarity hold 263 is clocked by the STROBE SDR HIGH signal. AND circuit 264 also has an input for receiving a PORT INSTRUCTION signal.

AND circuit 252 is also capable of setting polarity hold 253 and resetting polarity hold 255. AND circuit 252 is connected to receive the output of polarity hold 258 and the STROBE LSR DATA signal from port clock decode. Polarity hold 255 is also settable by the +BASE PORT CYC STEAL signal. This signal and the +BASE PORT BUSY signal are also applied to OR circuit 254 to reset polarity hold 253.

From the foregoing it is seen that the COMMAND BUS OUT bits 0, 1 and 2 can change depending upon the bit conditions of system bus out at the various indicated strobe times. The function of the CBO bits 0–2 depends upon the particular I/O instruction being executed. It is also seen that the output of AND circuit 264 provides a multi-device command signal. This multi-device command signal is used by the port clock decode circuitry of FIG. 12a. The COMMAND BUS OUT bits 0, 1 and 2 are applied to the I/O attachments connected to the port. A typical I/O attachment is shown in FIG. 15.

Of course, as indicated, the timing signals are necessary for developing the COMMAND BUS OUT bits. The port clock is activated during execution of an I/O instruction. The I/O instruction signal from AND circuit 63, FIG. 5a, is applied via OR circuit 239 to AND circuit 268 of port control logic, FIG. 12b, together with a phase A signal from CPU and storage clocks 30, a valid port command signal which comes from a voltage source and a signal from inverter 267. The output of AND circuit 268 is connected to the set input of latch 269. Latch 269 when set provides a +T3 latch signal which is used to condition the port clock triggers for being sequenced as phase A signals are applied to the clock inputs of the port triggers. The reset output of latch 269 is fed into OR circuit 266 which provides a +BASE PORT BUSY signal to inverter 267.

The T3 latch signal is applied to OR circuit 274, FIG. 11, and its output feeds AND circuit 276. The output of AND circuit 276 is applied to the data input of trigger 277. The clock input of trigger 277 is connected to the output of inverter 294 which receives the phase A signal. Trigger 277 is the first trigger of the port clock and its high output conditions trigger 283 for being set via OR circuit 278. The low output of trigger 277 is applied to AND circuit 281 which also receives the low output of trigger 283 and a not valid port command signal. Trigger 283 is clocked by the phase A signal and its high output is passed to AND circuit 279 which has its output connected to the data input of trigger 284. AND circuit 279 also receives not loop 1 and not loop 2 signals from latches 289 and 292 respectively. Thus, after trigger 283 has been clocked on, trigger 284 is clocked on by the next phase A signal. The high output of trigger 284 is used for conditioning trigger 285 via AND circuit 280 and OR circuit 282. AND circuit 280 also has an input from the high output of trigger 277. Thus with triggers 277 and 284 clocked on, trigger 285 is clocked on with the next phase A pulse.

AND circuit 308 of the port clock decode logic 295, FIG. 12a, develops the STROBE SDR LOW signal from the I/O instruction signal, the phase A signal and the T3 latch signal. The STROBE SDR HIGH signal is taken from AND circuit 307 which receives the high output of trigger 277, the phase A signal, the low output of trigger 283, the I/O instruction signal and the low output of CIX latch 293. Latch 293 which is part of the port clock is not set until latch 289 is set and thus AND circuit 307 is conditioned to pass the STROBE SDR HIGH signal at phase A time with trigger 277 clocked on. The STROBE LSR DATA signal is taken from AND circuit 306 which receives the phase A signal, the low output of latch 293, the I/O instruction signal, the high output of trigger 283, the high output of trigger 277, and the low output of trigger 284. Thus, the STROBE LSR DATA signal is generated at phase A time with triggers 277 and 283 clocked on and latch 293 set.

During the time that the high byte from the storage data register (SDR) 25 is on system bus out 120, bits 8–15, decode logic 309 generates a clock SYSTEM BUS OUT bits 12–15 signal which is applied to a clock input of polarity hold 312 for storing bits 12–15 from SYSTEM BUS OUT 120. Decode circuit 309 then provides a CLOCK SYSTEM BUS OUT bits 8–11 signal which is applied to a clock input of polarity hold 311 for storing bits 8–11 from system bus out 120. The CLOCK SYSTEM BUS OUT bits 8–11 signal is generated during the time that data from the selected LSR of LSR's 200 is on SYSTEM BUS OUT 120. Thus polarity hold 311 contains the device address data and polarity hold 312 contains modifier data. The data held in polarity holds 311 and 312 is fed to the I/O attachment via AND circuit 316 and OR circuit 317 over PORT DATA BUS OUT 319. It should be recognized that polarity holds 311 and 312 and AND circuit 316 are shown as single elements whereas in reality there is one element for each data bit. AND circuit 316 is conditioned by a SELECT DATA BUFFER signal which is generated by decode logic 309. The PORT DATA BUS OUT 319 feeds the I/O attachments.

A control signal is then generated by the port which is sent to the I/O attachments to cause them to look at PORT DATA BUS OUT 319 for determining which I/O device attached is being addressed. This control signal is Control Out from OR circuit 300 of the clock decode logic 295, FIG. 12a. OR circuit 300 is fed by the output of AND circuit 299 and a —BLAST signal. AND circuit 299 receives the output of AND circuit 297, the low output of latch 292, the high output of trigger 284 and the low output of latch 293, FIG. 11. AND circuit 297 is fed by the output of inverter 296 which receives a +PORT INSTRUCTION signal and is also fed by an +I/O COMMAND signal. The CONTROL OUT signal is sent to the I/O attachments to signal them to interrogate simultaneously COMMAND BUS OUT 244 for the command and PORT DATA BUS OUT 319 for the address. A +STROBE pulse is sent by the port 250 to the I/O attachments as a clocking signal. The +STROBE pulse comes from AND circuit 298 which receives the high output of trigger 285, the output of AND circuit 297 and the high output of trigger 284. The +STROBE pulse enables the I/O attachments to determine the length of time that the CONTROL OUT signal has been present and permits the I/O attachments to set up interval timing conditions.

A typical I/O attachment in FIG. 15 includes register and decode circuit 401 which receives COMMAND BUS OUT bits 0–2 inclusive on bus 244 and the PORT DATA BUS OUT bits 0–7 plus parity on bus 319. Register and decode 401 also receives the +CONTROL OUT signal and the +STROBE signal. The decode portion of 401 functions to decode the address on PORT DATA BUS OUT 319 and the I/O command on COMMAND BUS OUT 244. There are other lines coming from decode 401 which are used to gate AND circuits 418 and 419 which feed OR circuit 421 which in turn feeds PORT DATA BUS IN 363. Register and decode 401 also provide control lines (read, write, print, etc.) forming bus 420 to the attached I/O device.

One output from register and decode 401 is used to advance counter 402. Counter 402 is thus advanced for every +STROBE pulse sent by the port 250 to the I/O attachments during CONTROL OUT. If the I/O command is of the type which requires the I/O attachment to perform some function or to provide a byte of data to the CPU, the I/O attachment performs a function or readies the byte of data for transmission to the CPU by the time counter 402 reaches a predetermined value. If the I/O command is of the type where the I/O attachment is to receive a byte of data from the CPU, the I/O attachment sets up the necessary conditions for receiving the byte of data prior to the counter 402 reaching a predetermined value. In any event, when counter 402 reaches the predetermined value or values, latch 403 is set and the low output of latch 403 provides a —SERVICE IN signal to port 250.

Multi-device I/O commands are detected by decode 404 which receives the PORT DATA BUS OUT bits 0–7, P, the COMMAND BUS OUT bits 0–2, the +CONTROL OUT signal and the +STROBE signal. Decode 404 under proper conditions sets latch 405 to generate a MULTI-DEVICE RESPONSE signal when latch 403 provides the —SERVICE IN signal to AND circuit 406. The MULTI-DEVICE RESPONSE signal is set to port 250. Port 250 responds to these signals by generating a SERVICE OUT signal which is taken from OR circuit 302 of clock decode 295, FIG. 12a. OR circuit 302 is fed by the —BLAST signal and output of AND circuit 301. AND circuit 301 receives the high output of trigger 284, the low output of latch 289, and the high output of latch 293, FIG. 11.

The SERVICE OUT signal is used by the I/O attachment as another synchronizing signal or for de-synchronization. If the I/O command is of the type for transferring a byte of data from the CPU to the I/O attachment, it is used to indicate that the byte of data is available on PORT DBO 319 for clocking the byte of data into a data buffer 411. It is also used to enable the I/O attachment to drop the SERVICE IN signal. Thus the SERVICE OUT signal is applied to AND circuits 407 and 408 and to decode logic 409, FIG. 15. AND circuit 407 also receives the +CONTROL OUT signal whereby if +CONTROL OUT is simultaneously present with +SERVICE OUT AND circuit 407 resets counter 402, latch 403, latch 405 and a counter 410. AND circuit 408 receives the +STROBE signal whereby during +SERVICE OUT, the output of AND circuit 408 is used to advance counter 410 and reset counter 402. Counter 410 functions to provide the necessary time for de-synchronization and upon reaching a predetermined value it resets latch 403 to drop —SERVICE IN and resets latch 405 to drop the +MULTI-DEVICE RESPONSE signal.

Decode 409 receives the command bus out bits 0–2 inclusive on bus 244 and the +STROBE signal so that if the I/O command is for transferring a byte of data from the CPU to the I/O attachment, the byte of data placed upon PORT DATA BUS OUT 319 is entered into data buffer 411 under control of decode 409 which provides the clocking signal to data buffer 411. The byte of data in buffer 411 is then available on bus 416 to the I/O device connected to the I/O attachement.

If the I/O command is for transferring a byte of data from the I/O device to the CPU, the byte of data is entered into buffer 413 and passed via AND circuit 419 and OR circuit 420 to PORT DATA BUS IN 363. Status data can also be sent to the CPU via AND circuit 418 and OR circuit 420 to PORT DATA BUS IN 363.

The port clock during execution of the I/O instruction advances from the C00 state which is the reset state to C09 and from C09 to C03 and from C03 to C07, FIG. 23. The +CONTROL OUT signal switches to an up level at the start of C07 time and the port clock remains in a loop by repeating C07, C0F, C0E and C06 while generating +CONTROL OUT and waiting for one of three events to occur. Either the I/O attachment responds to +CONTROL OUT by activating −SERVICE IN or if a multi-device command by activating −SERVICE IN and then a multi-device response, or a time out condition occurs. A time out counter 320 FIG. 14, establishes the duration of the time out which can vary according to the type of I/O device being addressed.

In this example, there are two different time out durations. There is a first time out duration and an extended time out duration. The extended time out duration is selected by an I/O instruction which causes an extended time out latch in port 250 to be set. This extended time out latch is part of the phase hold decode function latches 332. Extended time out is selected by CBO bits 0–2 inclusive, SBO bits 12–15 inclusive and clocking signals including STROBE SDR HIGH, STROBE LSR DATA and port clock signal +COF. Time out counter 320 is advanced by a +CLOCK TIME OUT signal from decode 309, FIG. 12a, which occurs at either C06 time or C16 time of port clock. The +CLOCK TIME OUT signal is applied to trigger 321 and its high output is fed to AND circuit 324. The low output of trigger 321 is applied to its data input and to the clock input of trigger 322 which has its high output connected to AND circuit 324. The low output of trigger 322 is applied to its data input and to the clock input of trigger 323. The high output of trigger 323 is fed into the AND circuit 324. The low output of trigger 323 is fed data input. The output of AND circuit 324 is indicative of the first time out duration and it is fed to AND circuit 326 which is conditioned by the output of inverter 325. Inverter 325 receives the extended time out signal from phase hold decode and function latches 332. Thus during the absence of an extended time out signal, inverter 325 conditions AND circuit 326 to pass the signal from AND circuit 324 to OR circuit 328 from which the +TIME OUT signal is taken. If the phase hold decode and function latches 332 provide an −EXTENDED TIME OUT signal, AND circuit 327 is conditioned to pass the high output of trigger 331 as the +TIME OUT signal via OR circuit 328. The output of AND circuit 324 is also connected to clock trigger 329 for starting the extended time out duration. The low output of trigger 329 is connected to clock trigger 330 and its low output is connected to clock trigger 331.

The +TIME OUT signal is applied to AND circuits 336 and 341 of the port check logic, FIG. 13. AND circuit 336 is conditioned by a +C0F signal from the port clock and AND circuit 341 is conditioned by a +C16 signal from the port clock. The output of AND circuit 336 is connected to set an invalid device latch 337 whose output feeds AND circuit 338 and OR circuits 344 and 350. AND circuit 338 is conditioned by a +SELECT CHANNEL CHECKS signal and its output is CHECK BIT 1 which is applied to bit 9 of SYSTEM BUS IN 121. The output of OR circuit 344 is a −BLAST signal which is applied to OR circuit 286 of the port clock, FIG. 11. The output of OR circuit 350 is a +PORT CHECK signal.

The output of AND circuit 341 is connected to set time out latch 342. The output of time out latch 342 feeds AND circuit 343 and OR circuit 344. Thus the output of time out latch 342 will also generate a −BLAST signal from OR circuit 344. AND circuit 343 is conditioned by the +SELECT CHANNEL CHECKS signal and its output is check bit 3 which is applied to SYSTEM BUS IN bit 11.

The −BLAST signal is also applied to OR circuit 287 of the port clocks, FIG. 11, and the outputs of OR circuits 286 and 287 are fed into AND circuit 288 which also receives a phase A signal and a C06 signal. The C06 signal comes from AND circuit 303 of the clock decode logic 295, FIG. 12a. The output of AND circuit 288 is applied to set exit loop one latch 289, FIG. 11. The set output of latch 289 is applied to the set input of C1X latch 293. The reset output of latch 289 is connected as inputs to AND circuits 276 and 279 which control the data inputs of triggers 277 and 284 respectively. Thus the port clock exits loop one upon the occurrence of the time out condition. The port clock then advances through C02 time and into C00 time or the reset state. If the I/O attachment is responding to a multi-device command, the attachment responds by activating −SERVICE IN and then raising multi-device response after the I/O attachment has responded with its assigned interrupt response bit on PORT DATA BUS IN. Latches 289 and 292 are reset when the +BASE PORT BUSY drops.

If the I/O attachment generates the −SERVICE IN signal prior to the time out occurring, OR circuit 287 will provide an input to AND circuit 288 for setting exit loop one latch 289. OR circuit 286 also provides a signal to AND circuit 288 if the MULTI-DEVICE COMMAND signal is absent. The port clock then advances through C12, C10, C18, C19 and C13 times. Of course, the +STROBE signal from AND circuit 298, FIG. 12a, which is used by the I/O attachment for generating SERVICE IN is repetitively generated while the port clock is cycling in loop 1.

The port generates an −ADVANCE TIME signal starting at C12 time. The −ADVANCE TIME signal is taken from advance time latch 272 which is set under control of AND circuits 270 and 271 and reset by a C18 signal and by the absence of the I/O INSTRUCTION signal. AND circuit 270 receives a phase A signal, a −C1X signal, a −TRG 1 signal, a +TRG 2 signal, and a −TRG 4 signal. AND circuit 271 receives the phase A signal, +PORT INSTRUCTION signal and the +TRG 4 signal. Thus, the −ADVANCE TIME signal starts at C12 time and terminates during C18 time. The −ADVANCE TIME signal is sent from the port to the I/O CYCLE INHIBIT LOGIC 33, FIG. 3, of CPU clocks and storage clocks 30. Logic 33 provides a CLOCK SYSTEM TGRS signal to system clock triggers and control logic 35. The outputs from system clock triggers and control logic 35 are applied to T time decode logic 37. The CPU and storage clocks 30 include oscillator 1 which is a free running oscillator for supplying pulses to phase clocks 32, I/O cycle inhibit logic 33 and storage clock 45. Phase clock 32 generates the phase A signal and trigger signals +TRA, −TRA and TRB. The −TRA signal is applied to I/O CYCLE INHIBIT LOGIC 33 and to INHIBIT AND ADVANCE CLOCK LOGIC 34. The −TRA signal is also applied to AND circuit 46 for developing the STORAGE FUNCTION signal. AND circuit 46 is conditioned by a signal from storage function logic 39 which also provides a signal to storage clock 45.

The INHIBIT AND ADVANCE CLOCK LOGIC 34 which consists of conventional logic circuitry provides ADV CLK GATED, INHIBIT CLKS and SET TRC signals to SYSTEM CLOCK TRIGGERS and CONTROL LOGIC 35. It also provides the INHIBIT CLKS signal to trigger T7 logic 36. The ADVANCE CLK GATED, the INHIBIT CLKS and the SET TRC signals are used for controlling the sequencing of the clock triggers and control logic 35.

Phase clock 32 consists of triggers A and B while system clock triggers 35 include triggers C, D, E and F. The states of triggers C, D, E and F are applied to T time decode logic 37 which provides a plurality of T times as shown.

Instructions except for instructions occurring after execution of a branch or a branch-on-condition instruction, are fetched starting at T0 time. The instruction fetch time continues through T2 time and instruction execution takes place starting at T3 time. During execution of an I/O instruction, the system clock triggers 35 are held in a state whereby T time decode logic 37 continuously provides a T3 signal until an ADVANCE TIME signal is generated by the port. When the port generates the ADVANCE TIME signal, the system clock triggers and control logic 35 switch whereby T time decode logic 37 sequentially provides T4, T5 and T6 signals and then continues to provide a T6 signal until I/O CYCLE INHIBIT LOGIC 33 again receives an ADVANCE TIME signal.

Data is transferred between the CPU and port during C12 through C13 times. The port clock sequences in a second loop as it advances from C13 time when the loop consists of C17, C1F, C1E and C16 times. The SERVICE OUT signal is generated by the port as the port clock is sequencing through the second loop. The SERVICE OUT signal is taken from OR circuit 302, FIG. 12a, which is fed by AND circuit 301. AND circuit 301 receives the −LOOP 1 signal from latch 289, the +C1X signal from latch 293 and the high output of trigger 284. The SERVICE OUT signal is applied to the I/O attachment as previously indicated. The SERVICE OUT signal is a synchronizing signal for the I/O attachments when data is being transferred thereto from the CPU and functions as a de-synchronizing signal for the I/O attachments when data is transferred therefrom to the CPU.

The I/O attachment either responds to the SERVICE OUT signal by deactivating the SERVICE IN signal or a time out occurs. Decode 309 provides the +CLK TIME OUT signal during every C16 time of the loop, to the clock input of trigger 321 of time out counter 320, FIG. 14. Time out counter 320 advances in the manner previously indicated. If the time out occurs, the −BLAST signal is generated as previously indicated. The −BLAST signal is also applied to OR circuis 300 and 302, FIG. 12a, to generate simultaneously the CONTROL OUT and SERVICE OUT signals. These signals are applied to the AND circuit 407 in the I/O attachment, FIG. 15, to reset latch 403 and thereby drop the SERVICE IN signal. This forced dropping of the SERVICE IN signal is used by AND circuit 291, FIG. 11, to set exit loop 2 latch 292. AND circuit 291 also receives the −MULTI-DEVICE RESPONSE signal, the phase A signal and the C16 signal. The C16 signal comes from AND circuit 304 of the port clock decode logic 295, FIG. 12a. The set output of latch 292 is applied to the reset input of latch 293, FIG. 11. The reset output of latch 292 is applied to AND circuits 276 and 279 which control the data inputs of triggers 277 and 284 respectively.

If the −SERVICE IN signal is deactivated by the I/O attachment before the time out condition occurs, loop 2 is exited and the port clock sequences from C16 time to C02 and then passes to the C00 state. During C02 time, the port tests PORT DATA BUS IN 363, SERVICE IN, and COMMAND BUS IN 245 to make certain that these lines have been deactivated. The C02 signal is applied to AND circuit 345, FIG. 13, which receives inputs indicating DBI or CBI NOT ZERO. The output of AND circuit 345 is applied to the set input of latch 346. The set output of latch 346 feeds OR circuit 344, AND circuit 347 and OR circuit 350. The −BLAST signal is taken from OR circuit 344 as previously indicated, and a check bit four signal is taken from AND circuit 347. The check bit four signal is applied to bit 12 of SYSTEM BUS IN 121. The output of OR circuit 350 is a +PORT CHECK signal.

The advance time latch 272 which has been reset at C18 time is again set during C02 time. The −ADVANCE TIME signal is applied to I/O CYCLE INHIBIT LOGIC 33, FIG. 3, whereby the CLK SYSTEM TRGS signal is again generated for advancing the system clock triggers and control logic 35 to cause the T time decode logic 37 to deactive T6 and activate T0. The T time decode logic 37 also deactivates the T3 through T6 signal so as to decondition AND circuit 63, FIG. 5a, and thereby deactivate the I/O INSTRUCTION signal. This causes the advance time latch 272, FIG. 12b, to be reset via OR circuit 239. The SERVICE OUT signal was deactivated and the exit loop 2 latch 292 was set. The execution of the I/O instruction is complete, the port enters a reset state to await the next I/O instruction or base cycle steal operation and the CPU is switched into the instruction fetch cycle for fetching the next sequential instruction.

If the operation is a base cycle steal operation, the I/O attachment, FIG. 15, generates a +BASE CYC STEAL REQ signal from decode 412. The +BASE CYC STEAL REQ signal generates a +BPC signal via OR circuit 237 and AND circuit 238, FIG. 12b. The block processor clock signal +BPC is applied to INHIBIT AND ADVANCE CLOCK LOGIC 34 and T8 TGR AND LOGIC 38. The INHIBIT AND ADVANCE CLOCK LOGIC 34 generates an INHIBIT CLKS signal which causes the system clock triggers and control logic 35 to stop after they have completed a cycle; however, depending upon when the block processor clock signal occurs, it may be necessary for the system clock triggers 35 to take one more cycle. The INHIBIT CLKS signal also turns on T7 trigger 36.

The +T7 signal from trigger 36 is sent to the port to indicate that the CPU is ready to perform a cycle steal operation. The +T7 signal is applied to AND circuit 235, FIG. 12b, which also receives the +BASE CYC STEAL REQ signal and a —FD BPC block processor clock signal. The fixed disk is the burst mode I/O device 460 and it has priority over any base cycle steal I/O device. The output of AND circuit 235 sets base cycle steal latch 236. The set output of latch 236 is applied via OR circuit 239 to AND circuit 268 so as to set the T3 latch 269 and thereby start the port clock.

With the port clock running, AND circuit 240 is conditioned at C12 time when the base cycle steal latch 236 is set. AND circuit 240 provides an output for the data input of trigger 241 which is clocked by the phase A signal. The output of trigger 241 is a +STORAGE CYC REQ signal which is applied to T8 trigger and logic 38, FIG. 3. The +T8 signal is applied to storage function logic 39 which provides an output for starting the storage clocks 45 and an output to AND circuit 46 for generating a storage function signal upon the occurrence of a minus TRA signal from phase clock 32.

The base cycle steal latch signal from latch 236 is also applied to PHASE HOLD DECODE FUNCTION LATCHES 332, FIG. 14, which in response to this signal generate the +I/O COMMAND signal which is used by AND circuit 297, FIG. 12a, for providing an input to AND circuit 299 to generate the +CONTROL OUT signal via OR circuit 300. The output of AND circuit 297 is also used by AND circuit 298 to generate the +STROBE signal.

The I/O attachment, FIG. 15, uses the +CONTROL OUT and +STROBE signals in the same manner as for the execution of an I/O instruction. The I/O attachment either generates a —SERVICE IN signal or a time out occurs in the same manner as when executing an I/O instruction. Hence, the port clock functions in the same manner as when executing an I/O instruction and a +SERVICE OUT signal is generated via AND circuit 301 and OR circuit 302. The I/O attachment must respond to the SERVICE OUT signal in the same manner as when executing an I/O instruction and if it does not respond prior to the time out, latch 403 is reset via AND circuit 407 to drop —SERVICE IN.

The T8 trigger and logic 38 facilitates setting up the necessary address for fetching or storing data from/into main or control storage. At the completion of the cycle steal sequence, the block processor clock signal +BPC is deactivated. This results in resetting the T7 trigger and logic 36. The INHIBIT AND ADVANCE CLCK logic 34 also starts the system clock triggers and control logic 35 whereby T time decode logic 37 generates a T0 signal for fetching the next instruction.

The data transfer to or from the CPU 15 during a cycle steal operation is initiated by the storage cycle request signal +STORAGE CYC REQ. The storage address is contained in the base cycle steal local storage register which in this particular example is one of the LVL5 LSR's 60 or 61, FIG. 2. The appropriate local storage register is selected by means of AND circuits 203, 207 and OR circuits 209, 217, 226 and 223, FIG. 6. AND circuits 203 and 207 will be satisfied at this time whereby LSR address bits 0 and 1 are both 1's. Also, AND circuit 208 is satisfied at this time and therefore OR circuit 209 provides an output whereby LSR address bit 2 is a 1. LSR address bit 3 is also a 1 at this time because the block processor clock signal +BPC and the T7 signal are simultaneously present at AND circuit 242. None of the AND circuits 220–225 feeding OR circuit 226 is satisfied at this time and therefore LSR address bit 4 is a 0. The state of LSR address bit 5 depends upon the state of COMMAND BUS IN CBI bit 3. If COMMAND BUS IN CBI bit 3 is a 1, AND circuit 243 is satisfied because of the simultaneous presence of a block processor clock signal +BPC and the T7 signal and the LSR address bit 5 will be a 1. If CBI 3 is zero, the LSR address bit 5 is zero. Thus, it is seen that either LSR 60 or 61 will be selected.

The address in the selected LSR is transferred into SAR 16 via AND circuits 102 and 108, FIG. 4c. AND circuit 102 is conditioned by inverters 113 and 114 and AND circuit 108 is conditioned by inverters 115 and 116. AND circuit 102 passes LSR bits 8–15 while AND circuit 108 passes LSR bits 0–7. These bits are entered into SAR 16 under control of a load SAR and X register signal from AND circuit 95. AND circuit 95 is receiving a signal at this time from OR circuit 94 which receives the T8 signal.

With the storage address in SAR 16, a storage operation takes place. The type of storage operation is dependent upon the COMMAND BUS IN bits. The COMMAND BUS IN bits from the I/O attachment feed the instruction and function decode logic 50. COMMAND BUS IN bit 1 is used to specify the type of storage operation. COMMAND BUS IN bit 1 is a one if a read operation is to take place, otherwise a write operation takes place. COMMAND BUS IN bit 4 during a cycle steal operation specifies whether the storage involved is control storage 10 or main storage 11. The COMMAND BUS IN bit 0 is used to determine if the address in the selected LSR is to be incremented. If COMMAND BUS IN bit 0 is 1, then the address is to be incremented. COMMAND BUS IN bit 5 indicates whether or not there has been a data transfer error.

Data to be transferred into storage from the I/O device is entered into data buffer 413 in the I/O attachment, FIG. 15. The output of data buffer 413 is applied to AND circuit 414 which is conditioned by the set output of latch 403. The output of AND circuit 414 forms the PORT DATA IN BUS 363. The PORT DATA BUS IN 363 feeds polarity hold circuits 311 and 312, FIG. 9, which are clocked at this time by the +CLK PORT BUS IN signal. The outputs of polarity holds 311 and 312 are applied to AND circuit 316 which passes the data via OR circuit 317 to SYSTEM BUS IN 121. OR circuit 317 includes feed through blocks which are connected to SYSTEM BUS IN 121. SYSTEM BUS in 121 feeds AND circuits 104 and 110 of storage gate low 101 and storage gate high 107 respectively. AND circuit 104 is conditioned at this time by the output of OR circuit 138, FIG. 4b.

OR circuit 138 in addition to being fed by the output of OR circuit 92 has inputs from AND circuits 129 and 135. AND circuit 129 is fed by AND circuit 127 and inverter 128. AND circuit 127 receives a T8 signal via inverter 126, a block processor clock signal +BPC and a +T7 signal. Inverter 128 receives a CBI bit 1 signal. Since the T8 signal is present only for 200 nanoseconds, i.e., the time during which the address was clocked into SAR 6, inverter 126 is conditioning AND circuit 127. Thus, AND circuit 127, in view of the presence of the block processor clock signal +BPC and the +T7 signal, passes a signal to AND circuit 129. CBI bit 1 is a zero at this time and thus AND circuit 129 provides an output to OR circuit 138 to condition AND circuit 104. AND circuit 104 passes the bits on SYSTEM BUS IN to storage via SYSTEM BUS OUT 120. When COMMAND BUS IN bit 1 is a 0, and if CBI bit 4 is a 0, the data is entered into main storage 11. When COMMAND BUS IN bit 1 is a 0 and COMMAND BUS IN bit 4 is a 1, the data is entered into control storage 10. Under these conditions, AND circuit 135 provides an output to OR circuit 138 for conditioning AND circuit 104. COMMAND BUS IN bit 0 is 0 whereby inverter 133 conditions AND circuit 135. AND circuit 135 also receives an input from AND circuit 131. AND circuit 131 is fed by the output of AND circuit 127, which, as previously indicated, will be satisfied at this time. AND circuit 131 also receives the CBI bit 1.

When data is transferred to control storage 10, the high byte of data is transferred first from the I/O device. The high byte of data is applied over SYSTEM BUS IN 121 to AND circuit 110, FIG. 4c. AND circuit 110 is conditioned by the STG GATE HI SEL 0 signal and by the output of inverter 115 which receives the STG GATE HI SEL 1 signal. The STG GATE HI SEL 0 signal is received via OR circuit 130 from AND circuit 129. AND circuit 129 is active when CBI bit 1 is absent and the inputs to AND circuit 127 are satisfied to enable the writing of data into main storage 11. However, when writing into main storage 11, AND circuit 137 has to be conditioned to provide a WRITE STG LO signal. AND circuit 137 will not be conditioned at this time because AND circuit 134 is conditioned and thus provides a signal to inverter 136 for deconditioning AND circuit 137. The STG GATE HI SEL 1 signal which is applied to inverter 115 is taken via OR circuit 132 from AND circuit 131. AND circuit 131 is not conditioned at this time because CBI bit 1 is a zero; thus inverter 115 will be providing an output for conditioning AND circuit 110.

The low byte is then entered into control storage via AND circuit 104 in a manner similar to that for entering a byte of data into main storage 11. Under these circumstances, AND circuit 137 is conditioned to provide a WRITE STG LO signal. The writing into control storage in this instance is under control of AND circuit 142 which receives the block processor clock signal +BPC, the +T7 signal and the CBI bit 4 signal. AND circuit 142 feeds OR circuit 143, FIG. 5a, for selecting control storage. The WRITE STG HI signal and the WRITE STG LO signal are passed by OR circuits 140 and 141 respectively to storage address decode logic 17.

During a cycle steal operation, data can also be transferred from control or main storage to the I/O device. In this instance, the address for the location from which data is to be retrieved is entered into SAR 16 from the selected LSR of LSR's 200. The LSR is selected in the manner previously indicated. If data is being retrieved or fetched from control store, then two bytes of data are entered into SDR 25. If data is being fetched from main storage 11, one byte of data is entered into SDR 25. The data in SDR 25 is then transferred a byte at a time to SYSTEM BUS OUT 120 via the storage gates 101 and 107. If the low byte of data in SDR 25 is to be sent to the I/O device, it is transferred via AND circuit 103 and OR circuit 106 to SYSTEM BUS OUT 120. AND circuit 103 is conditioned by the ST GATE LO SEL 1 signal and the output of inverter 113. Inverter 113 receives the STG GATE LO SEL 0 signal. The STG GATE LO SEL 1 signal will be present via OR circuit 139 from AND circuit 131. AND circuit 131 is active at this time because CBI bit 1 will be a one and AND circuit 127 will be providing an output. The STG GATE LO SEL 0 signal will not be available at this time because AND circuits 129 and 135 are not active. AND circuit 129 is not active because CBI bit 1 is present and thus inverter 128 deconditions AND circuit 129. AND circuit 135 will be deconditioned at this time if the data in SDR 25 came from main storage because CBI bit 4 will be a zero. If the data in SDR 25 is from control storage 10, AND circuit 135 will be either active or inactive depending upon the condition of CBI bit 0. If an increment function is being performed, CBI bit 0 is a one and inverter 133 deactivates AND circuit 135. Thus inverter 113 will be active to condition AND circuit 103. If an increment function is not being performed, the low byte from SDR 25 will not be passed by ANd circuit 103, rather the high byte of data in SDR 25 is passed by AND circuit 109 via OR circuit 112 to AND circuit 105 which is conditioned by the STG GATE LO SEL 0 and the STG GATE LO SEL 1 signals. When transferring data from control storage 10 to the I/O device, two successive storage cycles are taken, if two bytes of data are to be transferred to the I/O device. The two successive cycles are taken, even though when accessing control storage two bytes of data are entered into SDR 25 with a single storage access, because additional logic would be required for timing purposes if only a single storage access were made.

The I/O immediate instruction is used for transmitting data to and from local storage registers 200 in the CPU to and from the I/O devices. When data is transferred from a selected LSR to an I/O device, the instruction is an I/O immediate load instruction whereas when data is transferred from the I/O device to a selected LSR, the instruction is called an I/O immediate sense instruction. When executing the I/O immediate load instruction, the low byte of the instruction which is contained in the SDR register 25 is transferred to the port 250 in the manner previously indicated. The low byte consists of bits 8–15 inclusive. Bits 8–11 are called function bits where bit 8 is used to indicate the type of data involved, i.e., it indicates whether the data is for control purposes or for informational purposes. Bit 9 indicates the direction of data transfer, i.e., it indicates whether the operation is a load or sense operation. Bit 10, which is always zero for an I/O instruction, indicates whether the operation is internal or external to the CPU 15. Bit 11 is used to indicate whether or not the I/O instruction is a multi-device command. Bit 12 specifies either the high or low byte of the local storage register (LSR) selected by bits 13–15 inclusive.

The second byte of data transferred is the high byte of the SDR register 25. The high byte includes bits 0–7 inclusive where bits 0–3 inclusive contain the op code and bits 4–7 inclusive are modifier bits. The modifer bits 4–7 inclusive are sent by the port 25 to the I/O attachment during CONTROL OUT and it is up to the I/O attachment as to what use it makes of the modifier bits. Thus, assuming an I/O immediate load instruction is being executed, the LSR's 200 are addressed for a data transfer during T4 and T5 times. LSR address bits 0, 1 and 2 are defined by the particular interrupt level. LSR address bits 3, 4 and 5 come from bits 13–15 of the instruction and bit 12 of the instruction indicates which byte, i.e., high or low in the selected LSR is to be transferred.

The selected byte is passed by the storage gates 100 to SYSTEM BUS OUT 120. The byte of data enters port 250 and specifically is clocked into polarity holds 311 and 312, FIG. 9. The byte of data is then read from polarity holds 311 and 312 to PORT DATA BUS OUT 319 via AND circuit 316 and OR circuit 317. The data is then clocked into data buffer 411, FIG. 15, during SERVICE OUT time under control of the +STROBE pulse and thus becomes available to the I/O device attachment and the I/O device attached thereto.

Had the instruction been an I/O immediate sense instruction, a byte of data is entered into data buffer 413 from the I/O device. The I/O device controls the clocking of the data into data buffer 413. The byte of data in buffer 413 is gated to PORT DATA BUS IN 363 via AND circuit 414 under control of the −SERVICE IN signal. The PORT DATA BUS IN bus carries the information to polarity holds 311 and 312 and the data is clocked therein by the +CLK PORT BUS IN signal. The data is then transferred to SYSTEM BUS IN 121 via AND circuit 316 and OR circuit 317.

SYSTEM BUS IN 121 transfers the byte of data to storage gate 100 and specifically to AND circuits 104 and 110, FIG. 4c. AND circuit 104 is gated by STG GATE LO SEL 0 and the output of inverter 114 which receives the STG GATE LO SEL 1 signal. The STG GATE LO SEL 0 signal comes from OR circuit 92, FIG. 4a, via OR circuit 138, FIG. 4b. AND circuits 88 and 89 which feed OR circuit 92 are conditioned at this time by the I/O IMM signal. The controlling time signal for these AND circuits is the T5 THRU T6 signal. The active AND circuit, i.e., AND circuit 88 or 89 depends upon the condition of the bits in the instruction register 40.

The STG GATE LO SEL 1 signal is taken from OR circuit 86. AND circuit 79 which feeds OR circuit 86 is conditioned at this time by the I/O IMM signal. AND circuit 79 is also conditioned by the T5 THRU T6 timing signal and has an input from inverter 75 which receives the bit 9 from instruction register 40. Since bit 9 is a 1 for an I/O immediate sense instruction, AND circuit 79 is inhibited by inverter 75 whereby the STG GATE LO SEL 1 signal is in a zero condition and inverter 114 thus conditions AND circuit 104. AND circuit 110 is not conditioned at this time because the STG GATE HI SEL 1 signal from OR circuit 73 will be in a zero condition in that the I/O IMM signal is not used for conditioning either AND circuit 71 or AND circuit 72.

The byte of data thus passes via AND circuit 104 and OR circuit 106 to SYSTEM BUS OUT 120 which carries the byte of data to the ALU gates 160, FIGS. 2 and 7a. ALU gates 160 consist of ALU gate low 161 and ALU gate high 168. ALU gate low 161 includes OR circuit 167 which is fed by AND circuits 162–166 inclusive. ALU gate high includes OR circuit 173 which is fed by AND circuits 169–172 inclusive. SYSTEM BUS OUT 120 is split so that bits 8–15 thereof are applied to AND circuit 163 and bits 0–7 thereof are applied to AND circuit 170. AND circuit 163 is conditioned by an ALU GATE HI/LO SEL 2 signal and the output of an inverter 157 which is fed by an ALU GATE HI/LO SEL 1 signal. The ALU GATE HI/LO SEL 1 signal comes from AND circuit 174 which is fed by AND circuit 175 and by a timing signal T3 THRU T5. AND gate 175 is connected to bits 0, 1, 2 and 3 of instruction register 40. The ALU GATE HI/LO SEL 2 signal is taken from OR circuit 176 which is fed by AND circuits 177 and 178. AND circuit 177 is fed by the I/O BOC signal from AND circuit 54 and a T6 timing signal. Thus, AND circuit 177 is not active at T6 time because the instruction being executed is an I/O immediate sense instruction.

AND circuit 178 is fed by the I/O IMM signal from AND circuit 55 and by the T3 THRU T5 timing signal. Thus, AND circuit 178 is active at this time to pass a signal via OR circuit 176 for conditioning AND circuit 163. AND circuit 174 is not providing an ALU GATE HI/LO SEL 1 signal at this time because the op code of an I/O immediate sense instruction is 1011 and thus the conditions of AND circuit 175 are not satisfied. Therefore AND circuit 163 is conditioned to pass the byte of data to the selected LSR register of LSR's 200.

The byte of data will either be written into the high or low portion of the selected LSR. The writing of the byte of data into the selected LSR is controlled by either a WRITE LSR LO signal or a WRITE LSR HI signal. If the byte of data were to be entered into the high portion of the selected LSR, it would transfer from ALU gate low 161 to ALU gate high 168 and specifically to AND circuit 172 thereof and from AND circuit 172 via OR circuit 173 to the selected LSR.

AND circuit 172 is conditioned by an ALU GATE HI/LO SEL 0 signal via OR circuit 155. The ALU GATE HI/LO select 0 signal comes from AND circuit 179 which is conditioned by an I/O IMM signal from AND circuit 55 and a T3 THRU T5 timing signal. The WRITE LSR LO and WRITE LSR HI signals are taken from OR circuits 180 and 181 respectively. OR circuit 180 is fed by AND circuits 182, 183 and 184.

Only AND circuit 183 has a possibility of being active at this time because AND circuit 182 is conditioned by an I/O STG signal from AND circuit 59 and AND circuit 184 is conditioned by an I/O BOC signal from AND circuit 54. AND circuit 183 is conditioned by an I/O IMM signal from AND circuit 55 which will be present because of the fact that an I/O immediate instruction is being executed. AND circuit 183 also receives a T5 timing signal, a −TRA signal from inverter 185, bit 9 from instruction register 40 and not bit 12 from inverter 186. Bit 9 of an I/O immediate sense instruction is a 1 and when the byte of data transferred from the I/O device is to be written in the low portion of the selected LSR, bit 12 is a zero. Therefore the conditions of AND circuit 183 will be met and the byte of data will be written into the low portion of the LSR.

The WRITE LSR HI signal is taken from OR circuit 181 which is fed by AND circuits 182 and 187. AND circuit 182 would not be active at this time because it is conditioned by an I/O STG signal from AND circuit 59. AND circuit 187 has inputs identical to inputs of AND circuit 183 except that it receives bit 12 from instruction register 40 rather than not bit 12 from inverter 186. Thus if bit 12 is a 1, a transferred byte of data will be written into the high portion of the selected LSR. Although a byte of data is applied to AND circuit 170 of ALU gate high 168, that path is not used for an I/O immediate sense instruction or for any other I/O instruction. That path is used for instructions which are not pertinent to the present invention.

The I/O storage instruction is used for transferring data to or from main or control storage to or from an I/O device. The op code of an I/O storage instruction is 0100 and is contained in the bits 0–3 of the instruction. Bits 4–7 of the instruction are modifier bits which are device dependent. These bits are transferred to the I/O device during CONTROL OUT. Bit 8 is 0. Bit 9 identifies the direction of data of transfer. If bit 9 is 0, data is read from storage and transferred to the I/O device whereas if bit 9 is 1 data is transferred from the I/O device and written into storage. Bit 10 identifies whether main or control storage is involved in the data transfer operation. If bit 10 is zero, main storage is selected whereas if bit 10 is one, control storage is selected. It should be noted that even though bit 4 is device dependent, it is used to signify whether the high or low byte of control storage is involved in the data transfer operation. Bits 11 and 12 are used to control the updating of the storage address. The storage address will be either incremented by 1 or 0 or decremented by 1 or 0. Bits 13 to 15 are used to select one of eight 16 bit LSR's 200 to be used as the source of the address for the data transfer. The address in the selected LSR is updated per bits 11 and 12 and then written back into that LSR. During the execution of the I/O storage instruction, the instruction is sent out to the port in the manner as previously indicated for all I/O instructions. The storage address is retrieved from the selected LSR at T4 time. LSR address bit 0, 1 and 2 are determined by the particular interrupt level. LSR address bit 3 is taken from OR circuit 217, FIG. 6, fed by AND circuit 214 which receives the I/O storage signal from OR circuit 218. LSR address bit 4 is taken from OR circuit 226 which receives a signal from AND circuit 223. AND circuit 223 receives the I/O storage signal via OR circuit 218. LSR address bit 5 is taken from OR circuit 233 and it receives a signal from AND circuit 231 which receives the storage signal via OR circuit 218.

The address from the selected LSR is entered into SAR 16 via OR circuits 106 and 112, FIG. 4c, which are fed by AND circuits 102 and 108 respectively. SAR 16 is clocked during T4 time by a signal from AND circuit 95, FIG. 4a, which is fed by OR circuit 94. OR circuit 94 is fed by AND circuit 93. AND circuit 93 receives the T4 timing signal and the I/O storage signal. The address from the selected LSR is simultaneously entered into X register 195. When the address is to be updated, it is taken from the X register 195. The updating will be described later herein.

The I/O storage signal from AND circuit 59, FIG. 5a, is used to generate a STG FUNCTION GEN signal from AND circuit 188. AND circuit 188 is fed by the T4 timing signal and the −TRA signal from inverter 185. The storage function generate signal feeds the storage function logic 39 whereby the storage clock 45 is started and a storage function signal is passed by AND circuit 46.

If the I/O storage instruction is a sense instruction, the byte of data is transferred from the I/O device to the CPU and it transfers in the same manner as indicated for the I/O immediate sense instruction. Similarly, if the byte of data is being transferred from storage to the I/O device, it transfers in the same manner as indicated for the I/O immediate load instruction. The WRITE STG HI and WRITE STG LO signals are taken from OR circuits 140 and 141 which are also used for the base cycle steal operation; however, these OR circuits are also fed by AND circuits 190 and 191 respectively, which are active during the execution of the I/O storage instruction in that they receive the I/O STG signal from AND circuit 59. AND circuit 190 also receives bit 4, bit 9 and bit 10 from instruction register 40 and a T4 THRU T6 timing signal.

AND circuit 191 has the same inputs as AND circuit 190 except for the bit 4 and bit 10 inputs. Instead, AND circuit 191 receives an input from OR circuit 192. OR circuit 192 has an input from inverter 60 which receives the bit 10 input and is also fed by inverter 193 which receives the bit 4 input. It is thus seen that storage high is written if bits 4, 9 and 10 of instruction register 40 are ones. If not, storage low is written. Of course, main storage 11 is always written with a WRITE STG LO signal.

In order to write into control storage 10, a control storage access signal CTRL STG ACCESS is required from OR circuit 143 which in this instance requires a signal from AND circuit 189. AND circuit 189 is conditioned by the I/O STG signal from AND circuit 59 and it also receives a T4 THRU T6 timing signal and a bit 10 signal from instruction register 40. When data is read from either main or control storage, there is an absence of the WRITE STG LO and WRITE STG HI signals.

The storage address in SAR 16 is incremented or decremented during T6 time. When the address from the selected LSR was entered into SAR 16, it was also entered into X register 195, FIG. 4c. The output of X register 195 is applied to arithmetic and logic unit (ALU) 197 via X REG bus 196, FIG. 7a. Whether or not the address is incremented or decremented is determined by bits 11 and 12 in the instruction register 40. These bits are decoded by ALU control decode logic 198, FIG. 5a, and the output thereof is applied to control ALU 197. The incremented, decremented or passed through address is then returned to the selected LSR via ALU gates 161 and 168, FIG. 7a. Specifically, AND circuits 162 and 169 are conditioned to pass bits 8–15 and 0–7 respectively via OR circuits 167 and 173 respectively to the high and low portions of the selected LSR of LSR's 200. Inverters 157 and 158 are conditioning AND circuit 162 and inverters 151, 152 and 153 are conditioning AND circuit 169. The WRITE LSR LO and WRITE LSR HI signals are simultaneously present from OR circuits 180 and 181, FIG. 5a, because AND circuit 182 is active at this time. AND circuit 182 is receiving the I/O storage signal from AND circuit 59 and a timing signal T6 and phase A from CPU clock 30.

When a byte of data is transferred from an I/O device into storage during execution of an I/O storage instruction, the I/O device controls CBI bit 4 so as to signal the port as to whether parity is to be generated or whether parity is being transmitted with the data byte. If CBI bit 4 is a 1, parity is to be generated by the port and if bit 4 is 0, parity is being transmitted with the data byte. The CBI bit 4 is latched so as to be available to the CPU over a period of time. AND circuit 374 receives CBI bit 4 and is gated by the I/O BOC signal and the C12 timing signal to set latch 375. Latch 375 provides the CBI 4 bit latched signal and is reset by the +BASE PORT BUSY signal. The I/O device encodes CBI bit 5 to signal the port that a parity error has occurred during the transfer of data from storage to the I/O attachment. If CBI bit 5 is a 1, then a parity error occurred during the data transfer. The CBI bits 0–5 inclusive come from decode and function logic 415, FIG. 15. Basically the I/O device determines the condition of CBI bit 4 and the condition of CBI bit 5 is determined by the data coming from buffer 411.

The CBI bit 4 is applied to AND circuit 360 and to inverter 361, FIG. 9. AND circuit 360 feeds OR circuit 364 and also receives an input from parity generate circuit 362. Parity generate circuit 362 is connected to receive data from SYSTEM BUS IN 121.

Parity generate circuit 362 can generate either even or odd parity and is operable to generate even parity under control of an EVEN MODE signal, FIG. 14, resulting from execution of a previous I/O instruction for port 250. The output of parity generate circuit 362 also feeds AND circuits 366 and 367 and exclusive OR circuit 313. Exclusive OR circuit functions to compare the parity bit from polarity hold 312 with the generated parity bit and develops an INVALID PARITY signal if a non-comparison occurs.

It is seen that AND circuit 360 is conditioned by CBI 4 to pass the generated parity bit. AND circuit 369, however, is conditioned by the absence of CBI 4 via inverter 361 to pass the parity bit from polarity hold circuit 312. AND circuits 360 and 369 feed OR 364 which in turn feeds AND circuit 365. AND circuit 365 is conditioned by the SELECT DATA BUFFER signal which as previously mentioned also conditions AND circuit 316 to pass the data from polarity holds 311 and 312 to SYSTEM BUS IN 321 or to PORT DATA BUS IN 319. The parity bit passed by AND circuit 365 is applied to OR circuit 368 which passes it to SYSTEM BUS IN 121 whereby a byte of data with parity is fed to the CPU. The parity bit for the PORT DATA BUS OUT 319 is also taken from OR circuit 368.

A parity bit is also taken from OR circuit 368 in two other instances. Channel register polarity hold 314 can pass a byte of data to SYSTEM BUS IN 121 via OR circuit 370. The parity bit for that byte of data is taken from parity generate circuit 362 and passed to AND circuit 366 which is conditioned by the SELECT CHANNEL REG signal. This signal also conditions AND circuit 370. AND circuit 366 then feeds the parity bit to OR circuit 368.

AND circuits 335, 338, 340, 343, 347, 349, 352 and 357, FIG. 13, are represented by AND circuit 371 in FIG. 9. The channel check signals from these AND circuits are then passed to SYSTEM BUS IN 121 via OR circuit 317 and to parity generate circuit 362. The generated parity bit is applied to AND circuit 367 which is gated by the SELECT CHANNEL CHKS signal. The parity bit is then passed by OR circuit 368 to SYSTEM BUS IN 121.

CBI bit 5 is connected to the set input of PORT DBO parity check latch 334, FIG. 13. The set output of latch 334 is fed to AND circuit 335 which is gated by the +SELECT CHANNEL CHECKS signal. AND circuit 335 provides check bit 0 on SYSTEM BUS IN bit 8.

The PORT DATA BUS IN 363 is sampled for parity as previously mentioned by means of the parity check or exclusive OR circuit 313, FIG. 9. Parity check or exclusive OR circuit 313 generates the INVALID PARITY signal when invalid parity exists with respect to the data on PORT DATA BUS IN 363. The INVALID PARITY signal is applied as a data input to trigger 339, FIG. 13. Trigger 339 is clocked by a +SAMPLE PORT DBI PTY signal. The output of trigger 339 is fed into AND circuit 340 and OR circuit 350. AND circuit 340 is gated by the +SELECT CHANNEL CHECKS signal and provides a check bit 2 signal to SYSTEM BUS IN bit 10. Parity check circuit 313 also checks the parity of the data on SYSTEM BUT OUT 120. The invalid parity signal from parity check circuit 313 is applied to the data input of trigger 348. Trigger 348 is clocked by the +SAMPLE SYS BUS OUT PTY signal. The output of trigger 348 is fed into AND circuit 349 which is gated by the +SELECT CHANNEL CHECKS signal. AND circuit 349 provides a check bit 5 signal to SYSTEM BUS IN bit 13.

A DBI/CBI not zero check is made at the end of all I/O instructions, i.e., at C02 time. This check is made by AND circuit 345, FIG. 13. The DBI/CBI NOT ZERO signal applied to AND circuit 345 comes from OR circuit 318, FIG. 9. The output of AND circuit 345 feeds the set input of latch 346 and its output is applied to OR circuits 344 and 350 and to AND circuit 347. OR circuit 344 provides the −BLAST signal and OR circuit 350 provides the +PORT CHECK signal. AND circuit 347 is gated by the +SELECT CHANNEL CHECKS signal and provides a check bit 4 signal to SYSTEM BUS IN bit 12.

The I/O branch-on-condition instruction is used to pass the modifier bits to the I/O device during CONTROL OUT. The I/O device uses the four modifier bits to detect any one of 16 conditions in the I/O device and encodes CBI bit 4 to communicate whether the branch condition has been met. The op code of the I/O branch-on-condition instruction is 0011. The modifier bits are bits 4–7 inclusive of the I/O branch-on-condition instruction. Bits 8–15 inclusive of the I/O branch-on-condition instruction are used for forming the branch to address and these bits are concatenated with the high byte from the address register in the LSR for the current interrupt level if the I/O device indicates that the branch condition is met.

The I/O branch-on-condition instruction is sent to the port in the same manner as previously indicated for transferring I/O instructions to the port. The modifier bits are sent out in the same manner as previously indicated for the execution of I/O instructions. COMMAND BUS IN bit 4 is transferred into the CPU during SERVICE IN. COMMAND BUS IN bit 4 is applied to AND circuit 184, FIG. 5b, which is conditioned by the I/O BOC signal from AND circuit 54 and receives a timing signal T6 AND PHASE A from clock 30. AND circuit 184 provides a WRITE LSR LO signal via OR circuit 184. The address for the LSR must select the address register in the LSR's 200. Hence the I/O BOC signal conditions AND circuit 204, FIG. 6, whereby at T6 time, AND circuit 204 passes a signal via OR circuit 205 to OR circuit 209 to force an LSR address bit 2. AND circuit 204 also provides a signal to inverter 206 via OR circuit 205 whereby AND circuit 207 is inhibited and LSR address bit 1 is forced to a 0. LSR address bit 0 is determined by the interrupt level and the absence of a MACHINE CHECK signal. LSR address bits 3, 4 and 5 are determined by the interrupt level.

The checks made during the execution of the I/O branch-on-condition instruction are the same as the checks made for the other I/O instructions except for the PORT DATA BUS IN parity check due to the lack of any data on PORT DATA BUS IN during execution of the I/O branch-on-condition instruction.

Checks are also made during the base cycle steal operation. If any check occurs during a base cycle steal operation, a MACHINE CHECK signal is generated. This signal is applied to the clock input of trigger 351, FIG. 13, which has its data input connected to receive a +CYCLE STEAL TIME signal from the PHASE HOLD DECODE FUNCTION LATCHES 332, FIG. 14. The output of trigger 315 feeds AND circuit 352 which is gated by the +SELECT CHANNEL CHECKS signal. The output of AND circuit 352 is a check bit 6 signal which feeds bit 14 of SYSTEM BUS IN 121.

Whenever the port address and I/O device address are sent to port 250 and other ports, not shown, during execution of an I/O instruction, a check is made to determine whether any port recognized the port address, and if not, an invalid port latch 356, FIG. 13, is set. The check is made by means of AND circuit 353. When port 250 recognizes its address, PHASE HOLD DECODE FUNCTION LATCHES generates a +PORT INSTRUCTION signal. This signal is inverted by inverter 354 and applied to AND circuit 353. The +VALID PORT CMD signal is present only when a port other than port 250 recognizes its port address. Hence, if no port recognizes its address by COF time, AND circuit 353 sets the invalid port latch 356. The output of the invalid port latch 356 feeds AND circuit 357 which is gated by the +SELECT CHANNEL CHECKS signal from decode 309, FIG. 12a. The output of AND circuit 357 is a check bit 7 signal which feeds bit 15 of SYSTEM BUS IN 121.

What is claimed is:

1. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
   means within said central processing unit for transferring to said port means an I/O instruction retrieved from said storage and address data retrieved from said local storage register means,
   means within said port means responsive to receiving said I/O instruction and said address data for forming a command and I/O attachment address data and simultaneously transmitting to said I/O attachments said formed command and I/O attachment address data together with a synchronizing signal indicating to said I/O attachments that said command and I/O attachment address data should be decoded, and
   response means within said I/O attachments for decoding said I/O attachment address data and responding to said command to provide control signals to I/O devices connected to said I/O attachments and generating a response signal to said port means whereby said port means de-activates said synchronizing signal and generates a response control signal to said central processing unit to cause the same to provide said port means with data for said I/O attachments, said port means upon receiving said data from said central processing unit generates another synchronizing signal to said I/O attachments and sends said data thereto whereby said I/O attachments upon receiving said data de-activates said response signal, said port means upon detecting de-activation of said response signal de-activates said another synchronizing signal and generates another response control signal to said central processing unit to indicate thereto that execution of said I/O instruction is complete.

2. The computer system of claim 1 wherein said data provided by said central processing unit comes from said storage.

3. The computer system of claim 1 wherein said data provided by said central processing unit comes from said local storage register means.

4. The computer system of claim 1 wherein said storage comprises main storage and control storage, said control storage storing said I/O instructions and data, said main storage storing data.

5. The computer system of claim 1 wherein said I/O instructions include an I/O immediate load instruction, said I/O immediate load instruction having one group of bits identifying the operation to be performed, a second group of bits for enabling said I/O attachments to expand said control signals provided to said I/O devices, and a third group of bits for identifying an area in said local storage register means containing said data to be transferred from said central processing unit.

6. The computer system of claim 5 wherein one bit of said one group of bits provide an indication that the operation to be performed is external to said central processing unit.

7. The computer system of claim 1 wherein said I/O instructions include an I/O storage load instruction, said I/O storage load instruction including one group of bits identifying the operation to be performed, a second group of bits for enabling said I/O attachments to expand said control signals provided to said I/O devices, and a third group of bits for identifying the location in said storage containing data to be transferred from said central processing unit.

8. The computer system of claim 7 wherein one bit of said one group of bits provides an indication that the operation to be performed is external to said central processing unit.

9. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
   means within said central processing unit for transferring to said port means an I/O instruction retrieved from said storage and address data retrieved from said local storage register means,
   means within said port means responsive to receiving said I/O instruction and said address data for forming a command and I/O attachment address data and simultaneously transmitting to said I/O attachments said formed command and I/O attachment address data together with a synchronizing signal indicating to said I/O attachments that said command and I/O attachment address data should be decoded,
   response means within said I/O attachments for decoding said I/O attachment address data and responding to said command to provide control signals to I/O devices connected to said I/O attachments, said I/O attachments providing data and a response signal to said port means whereby said port means de-activates said synchronizing signal and transfers said data and a response control signal to said central processing unit, said port means upon de-activating said response control signal generates a de-synchronizing signal to said I/O attachments whereby said I/O attachments upon detecting said de-synchronizing signal de-activates said response signal, said port means upon detecting de-activation of said response signal de-activates said de-synchronizing signal and generates another response control signal to said central processing unit to indicate thereto that execution of said I/O instruction is complete.

10. The computer system of claim 9 wherein said data provided by said I/O attachments is entered into said storage.

11. The computer system of claim 9 wherein said data provided by said I/O attachments is entered into said local storage register means.

12. The computer system of claim 9 wherein said storage comprises main storage and control storage, said control storage storing said I/O instructions and data, said main storage storing data.

13. The computer system of claim 9 wherein said I/O instructions include an I/O immediate sense instruction having one group of bits identifying the operation to be performed, a second group of bits for enabling said I/O attachments to expand said control signals provided to said I/O devices and a third group of bits for identifying an area in said local storage register means where said data provided by said I/O attachments is to be stored.

14. The computer system of claim 13 wherein one bit of said one group of bits provides an indication that the operation to be performed is external to said central processing unit.

15. The computer system of claim 9 wherein said I/O instructions include an I/O storage sense instruction, said I/O storage sense instruction including one group of bits identifying the operation to be performed, a second group of bits for enabling said I/O attachments to expand said control signals provided to said I/O devices, and a third group of bits for identifying the location in said storage where said data provided by said I/O attachments is to be stored.

16. The computer system of claim 15 wherein one bit of said first one group of bits provides an indication that the operation to be performed is external to said central processing unit.

17. The computer system of claim 1 further comprising means in said port means for generating an error condition signal upon failure of said I/O attachments to provide said port means with said response signal.

18. The computer system of claim 9 further comprising means in said port means for generating an error condition signal upon failure of said I/O attachments to provide said port means with said response signal.

19. The computer system of claim 1 further comprising means in said port means for generating an error signal upon said I/O attachment, failing to de-activate said response signal.

20. The computer system of claim 9 further comprising means in said port means for generating an error signal upon said I/O attachments failing to de-activate said response signal.

21. The computer system of claim 19 wherein said port means includes means for forcing said I/O attachments to de-activate said response signal upon generating said error signal.

22. The computer system of claim 20 wherein said port means includes means for forcing said I/O attachments to de-activate said response signal upon generating said error signal.

23. The computer system of claim 1 further comprising means in said I/O attachments for providing said port means with error conditions occurring during the transfer of said I/O attachment address data to said I/O attachments.

24. The computer system of claim 9 further comprising means within said I/O attachments for providing said port means with error conditions occurring during the transfer of said I/O attachment address data to said I/O attachments.

25. The computer system of claim 1 further comprising means within said I/O attachments for providing said port means with error signals indicative of errors occurring during the transfer of said data from said central processing unit via said port.

26. The computer system of claim 9 further comprising means within said port means for providing said I/O attachments with error signals indicative of errors occurring during the transfer of data from said I/O attachments to said central processing unit via said port means.

27. The computer system of claim 19 wherein said means for generating an error signal includes a time out counter.

28. The computer system of claim 27 wherein said time out counter is selectively operative to provide time outs of selective durations whereby the time out duration can be selected according to the type of I/O attachment.

29. The computer system of claim 28 wherein the time outs from said time out counter occur at a time selected under instruction control according to the type of I/O attachment.

30. The computer system of claim 20 wherein said means for generating an error signal includes a time out counter.

31. The computer system of claim 30 wherein said time out counter is selectively operative to provide time outs of selective durations whereby the time out durations can be selected according to the type of I/O attachment.

32. The computer system of claim 30 wherein said time out counter provides time outs occurring at a time selected under instruction control according to the type of I/O attachment.

33. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
means within said central processing unit for transferring to said port means an I/O instruction retrieved from said storage and address data retreived from said local storage register means,
means within said port means responsive to receiving said I/O instruction and said address data for forming a command and I/O attachment address data and simultaneously transmitting to said I/O attachments said formed command and I/O attachment address data together with a synchronizing signal indicating to said I/O attachments that said command and I/O attachment address data should be decoded, and
response means within said I/O attachments for decoding said I/O attachment address data and responding to said command to provide control signals to I/O devices connected to said I/O attachments and generating a response signal to said port means whereby said port means de-activates said synchronizing signal, generates a response control signal to said central processing unit and provides said central processing unit with a branch condition signal, said central processing unit being responsive to said response control signal to form a branch to address if said branch condition signal is of a predetermined state, said port mans generating another synchronizing signal to said I/O attachments whereby said I/O attachments deactivate said response signal, said port means upon detecting de-activation of said response signal de-activates said another synchronizing signal and generates another response control signal to said central processing unit to indicate there to that execution of said I/O instruction is complete.

34. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
  means within said central processing unit for transferring to said port means an I/O instruction retrieved from said storage and address data retrieved from said local storage register means,
  means within said port means responsive to receiving said I/O instruction and said address data for forming a multi-device command and I/O attachment address data, said command including interrupt level data to facilitate a multi-device command, and simultaneously transmitting to said I/O attachments said formed multi-device command and I/O attachment address data together with a synchronizing signal indicating to said I/O attachments that said command and I/O attachment address data should be decoded, and
  response means within said I/O attachments for decoding said I/O attachment address data and said multi-device command to provide control signals to I/O device connected to said I/O attachments and generating response signals to said port means whereby said port means de-activates said synchronizing signal upon receiving said response signals from all I/O attachments responding to said multi-device command, said port means generating a response control signal to said central processing unit to enable the same to set up controls for servicing the multi I/O devices on said interrupt level, said port means generating another synchronizing signal to said I/O attachments whereby said I/O attachments de-activate said response signals, said port means upon detecting de-activation of said response signals de-activates said another synchronizing signal and de-activates said cycle steal request signal received from said connecting I/O device attachment to indicate to said central processing unit that said cycle steal operation is complete.

35. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
  means within said central processing unit for generating predetermined time state signal in response to a cycle steal request generated by one of said I/O devices and transmitted to said central processing unit via the connecting I/O attachment and said port means,
  means within said port means responsive to said time state signal generated by said central processing unit for transmitting to the I/O attachment connected to the I/O device requesting the cycle steal, a synchronizing signal indicating that the cycle steal request has been granted,
  respone means within said I/O attachment connected to the I/O device requesting a cycle steal for generating a response signal to said port means whereby said port means de-activates said synchronizing signal and generates a response control signal to said central processing unit to cause the same to provide said port means with data for said I/O attachment, said port means upon receiving said data from said central processing unit generates another synchronizing signal to the I/O attachment connected to the I/O device requesting the cycle steal and sends said data thereby whereby said responding I/O attachment accepts said data and de-activates said response signal, said port upon detecting de-activation of said response signal de-activates said another synchronizing signal and de-activates said cycle steal request signal received from said connecting I/O device attachment to indicate to said central processing unit that said cycle steal operation is complete.

36. In a computer system having storage for storing instructions including I/O instructions, a central processing unit including means for fetching and decoding instructions, local storage register means for storing address data and control data, port means connected to said central processing unit, I/O attachments connected to said port means and I/O devices connected to said I/O attachments, the improvement comprising:
  means within said central processing unit for generating a time state signal in response to a cycle steal request from one of said I/O devices via the I/O attachment connected to said one I/O device and said port means,
  means within said port means responsive to said time state signal for generating a synchronizing signal indicating to the I/O attachment connected to the I/O device requesting the cycle steal that the cycle steal request has been granted, and
  means within said I/O attachment connected to the I/O device requesting the cycle steal for providing data and a response signal to said port means whereby said port means de-activates said synchronizing signal and transfers said data and a response control signal to said central processing unit, said port means upon de-activating said response control signal generates a de-synchronizing signal to the I/O attachment connected to the I/O device requesting the cycle steal whereby the same upon detecting said de-synchronizing signal de-activates said response signal, said port means upon detecting de-activation of said response signal de-activates said de-synchronizing signal and generates another respone control signal to said central processing unit to indicate thereto that the cycle steal operation is complete.

37. The computer system of claim 1 wherein said central processing unit includes clock means having extendable time states, said clock means remaining in one of said extendable time states in response to retrieving and decoding an I/O instruction to enable said central processing unit to transfer to said port means said retrieved I/O instruction and said retrieved address data.

38. The computer system of claim 37 wherein said clock means remains in another of said extendable time states to enable said data transferred from central processing unit to said port means to transfer to said I/O attachment attached to the I/O device requesting the cycle steal and to enable de-synchronization of said port means and said I/O attachment attached to the I/O device requesting the cycle steal.

39. The computer system of claim 9 wherein said central processing unit includes clock means having extendable time states, said clock means remaining in one of said extendable time states in response to retrieving and decoding an I/O instruction to enable said central processing unit to transfer to said port means said retrieved I/O instruction and said retrieved address data.

40. The computer system of claim 39 wherein said clock means remains in another of said extendable time states to enable said port means and said I/O attachment attached to the I/O device requesting the cycle steal to de-synchronize from each other.

41. The computer system of claim 40 wherein said central processing unit initiates a storage cycle for storing said transferred data in said storage.

42. The computer system of claim 40 wherein said central pocessing unit initiates a storage cycle for storing said transferred data in said local storage register means.

43. In a stored program computer system having an addressable storage for storing data and instructions including I/O intructions, a central processing unit including CPU clocking means for generating time phase clock signals and successive time state signals for instruction fetch and instruction execution, storage addressing means for addressing said storage for retrieval of data or instructions, storage data register means for temporarily storing data or instructions retrieved from storage, instruction register means for temporarily storing instructions retrieved from storage, instruction decoding means responsive to signals from said CPU clocking means and an instruction in said instruction register means to generate gate control signals and register selection and control signals, local storage means for storing address and control data, operand register means, gating means connected to control flow of data to, from and within said central processing unit, said gating means being connected to receive data from sources external to said central processing unit, from said storage data register means, from said operand register means and from said local storage register means, and connected to send data to said storage addressing means, to said local storage register means, to said storage, to said operand register means and external of said central processing unit, port means connected to said central processing unit, I/O attachment means connected to said port means and I/O device means connected to said I/O attachment means, the improvement comprising:

CPU clock control means responsive to said instruction decoding means decoding an I/O instruction for maintaining said CPU clocking means in a predetermined time state, port clock means for generating time state signals and connected to be cycled by said phase signals, port clock control means responsive to said instruction decoding means decoding an I/O instruction to generate a port clock enable signal whereby said port clock means is cycled by said phase signals, means within said central processing unit for applying said gate control signals to said gating means to pass an I/O instruction from said storage data register means and address data from said local storage register means to said port means, command encoding means within said port means for forming command signals in response to predetermined portions of said I/O instruction and providing formed command signals to said I/O attachment means, port clock decode means responsive to time state signals from said port clock means for generating a control out signal to said I/O attachment means to signal the same that command and address data is coming from said port means and strobe signals to be used by said I/O attachment means to develop a response therefrom, and decoding means within said I/O attachment means for decoding said address and command data from said port means and generating control signals for said attached I/O device means and a service in signal to said port clock control means upon completing said decoding whereby said port clock control means causes said port clock means to generate predetermined states to cause said port clock control means to generate an advance time signal to said CPU clock control means to enable said CPU clocking means to advance from said predetermined time state and thereby provide time state signals to facilitate storage of data transferred from the addressed I/O device means via said I/O attachment means and said port means into said storage, said gating means being responsive to said time state signals to pass address data to said storage.

44. In a stored program computer system having an addressable storage for storing data and instructions including I/O instructions, a central processing unit including CPU clocking means for generating time phase clock signals and successive time state signals for instruction fetch and instruction execution, storage addressing means for addressing said storage for retrieval of data or instructions, storage data register means for temporarily storing data or instructions retrieved from storage, instruction register means for temporarily storing instructions retrieved from storage, instruction decoding means responsive to signals from said CPU clocking means and an instruction in said instruction register means to generate gate control signals and register selection and control signals, local storage means for storing address and control data, operand register means, gating means connected to control flow of data to, from and within said central processing unit, said gating means being connected to receive data from sources external to said central processing unit, from said storage data register means, from said operand register means and from said local storage register means, and connected to send data to said storage addressing means, to said local storage register means, to said storage, to said operand register means and external of said central processing unit, port means connected to said central processing unit, I/O attachment means connected to said port means and I/O device means connected to said I/O attachment means, the improvement comprising:

CPU clock control means responsive to said instruction decoding means decoding an I/O instruction for maintaining said CPU clocking means in a predetermined time state, port clock means for generating time state signals and connected to be cycled by said phase signals, port clock control means responsive to said instruction decoding means decoding an I/O instruction to generate a port clock enable signal whereby said port clock means is cycled by said phase signals, means within said central processing unit for applying said gate control signals to said gating means to pass an I/O instruction from said storage data register means and address data from said local storage register means to said port means, command encoding means within said port means for forming command signals in response to predetermined portions of said I/O instruction and providing formed command signals to said I/O attachment means, port clock decode means responsive to time state signals from said port clock means for generating a control out signal to said I/O attachment means to signal the same that command and address data is coming from said port means and strobe signals to be used by said I/O attachment means to develop a response therefrom, and decoding means within said I/O attachment means for decoding said address and command data from said port means and generating control signals for said attached I/O device means and a service in signal to said port clock control means upon completing said decoding whereby said port clock control means causes said port clock means to generate predetermined states to cause said port clock control means to generate an advance time signal to said CPU clock control means to enable said CPU clocking means to advance from said predetermined time state and thereby provide time state signals to facilitate storage of data transferred from the addressed I/O device means via said I/O attachment means and said port means into said local storage register means, said gating means being responsive to said timing signals to pass address data to said local storage register means.

45. In a stored program computer system having an addressable storage for storing data and instructions including I/O instructions, a central processing unit including CPU clocking means for generating time phase clock signals and successive time state signals for instruction fetch and instruction execution, storage addressing means for addressing said storage for retrieval of data or instructions, storage data register means for temporarily storing data or instructions retrieved from storage, instruction register means for temporarily storing instructions retrieved from storage, instruction decoding means responsive to signals from said CPU clocking means and an instruction in said instruction register means to generate gate control signals and register selection and control signals, local storage means for storing address and control data, operand register means, gating means connected to control flow of data to, from and within said central processing unit, said gating means being connected to receive data from sources external to said central processing unit, from said storage data register means, from said operand register means and from said local storage means, and connected to send data to said storage addressing means, to said local storage register means, to said storage, to said operand register means and external of said central processing unit, port means connected to said central processing unit, I/O attachment means connected to said port means and I/O device means connected to said I/O attachment means, the improvement comprising:

CPU clock control means responsive to said instruction decoding means decoding an I/O instruction for maintaining said CPU clocking means in a predetermined time state, port clock means for generating time state signals and connected to be cycled by said phase signals, port clock control means responsive to said instruction decoding means decoding an I/O instruction to generate a port clock enable signal whereby said port clock means is cycled by said phase signals, means within said central processing unit for applying said gate conrol signals to said gating means to pass an I/O instruction from said storage data register means and address data from said local storage register means to said port means, command encoding means within said port means for forming command signals in response to predetermined portions of said I/O instruction and providing formed command signals to said I/O attachment means, port clock decode means responsive to time state signals from said port clock means for generating a conrol out signal to said I/O attachment means to signal the same that command and address data is coming from said port means and strobe signals to be used by said I/O attachment to develop a response therefrom, and decoding means within said I/O attachment means for decoding said address and command data from said port means and generating control signals for said attached I/O device means and a service in signal to said port clock control means upon completing said decoding whereby said port clock control means causes said port clock means to generate predetermined states to cause said port clock control means to generate an advance time signal to said CPU clock conrol means to enable said CPU clocking means to advance from said predetermined time state and thereby provide time state signals to facilitate retrieval of data from said storage and transfer of the retreived date to said I/O device means via said port means and said I/O attachment means, said gating means being responsive to said time state signals to pass address data to facilitate retrieval of data from said storage and transfer of the retrieved data to said I/O device means via said I/O attachment means.

46. In a stored program computer system having an addressable storage for storing data and instructions including I/O instructions, a central processing unit including CPU clocking means for generating time phase clock signals and successive time state signals for instruction fetch and instruction execution, storage addressing means for addressing said storage for retrieval of data or instrucions, storage data register means for temporarily storing data or instructions retrieved from storage, instruction register means for temporarily storing instructions retrieved from storage, instruction decoding means responsive to signals from said CPU clocking means and an instruction in said instruction register means to generate gate control signals and register selection and control signals, local storage means for storing address and control data, operand register means, gating means connected to control flow of data to, from and within central processing unit, said gating means being connected to receive data from sources external to said cenral processing unit, from said storage data register means, from said operand register means and from said local storage register means, and connected to send data to said storage addressing means, to said local storage register means, to said storage, to said operand register means and external of said central processing unit, port means connected to said central processing unit, I/O attachment means connected to said port means and I/O device means connected to said I/O attachment means, the improvement comprising:
- CPU clock control means responsive to said instruction decoding means decoding an I/O instruction for maintaining said CPU clocking means in a predetermined time state,
- port clock means for generating time state signals and connected to be cycled by said phase signals,
- port clock control means responsive to said instruction decoding means decoding an I/O instruction to generate a port clock enable signal whereby said port clock means is cycled by said phase signals,
- means within said central processing unit for applying said gate control signals to said gating means to pass an I/O instruction from said storage data register means and address data from said local storage register means to said port means,
- command encoding means within said port means for forming command signals in response to predetermined portions of said I/O instruction and providing formed command signals to said I/O attachment means,
- port clock decode means responsive to time state signals from said port clock means for generating a control out signal to said I/O attachment means to signal the same that command and address data is coming from said port means and strobe signals to be used by said I/O attachment to develop a response therefrom, and
- decoding means within said I/O attachment means for decoding said address and command data from said port means and generating control signals for said attached I/O device means and a service in signal to said port clock control means upon completing said decoding whereby said port clock control means causes said port clock means to generate predetermined states to cause said port clock control means to generate an advance time signal to said CPU clock control means to enable said CPU clocking means to advance from said predetermined time state and thereby provide time state signals to facilitate retrieval of data from said local storage register means and transfer of the retrieved data to said I/O devices means via said port means and said I/O attachment means,
- said gating means being responsive to said time state signals to pass address data to facilitate retrieval of data from said local storage register means and transfer of the retrieved data to said I/O device means via said I/O attachment means.

47. The stored program computer system of claim 43 further comprising
means responsive to the absence of said advance time signal for causing said CPU clock control means to maintain said CPU clocking means in another predetermined time state, and
logic means responsive to said port clock means, reaching predetermined time states after said service in signal for generating a service out signal to said I/O attachment means to enable the same to de-synchronize from said port means.

48. The stored program computer system of claim 43 wherein one of said I/O instructions is an I/O storage instruction whereby upon being decoded by said instruction decoding means, said gate control means provides signals to said gating means to cause the same to pass data from said local storage register means to said storage addressing means.

49. The stored program computer system of claim 48 where said I/O storage instruction is an I/O sense storage instruction and said instruction decoding means provides signals to cause data from said port means to enter said storage at the location specified by the data in said storage addressing means.

50. The stored program computer system of claim 43 further comprising time out counter means in said port means for generating a time out signal in response to receiving a predetermined number of signals from said port clock decode means and means responsive to said time out signal and a predetermined time state from said port clock means for generating an error signal.

51. The stored program computer system of claim 50 wherein said time out counter means is selectively settable to generate said time out signal upon a selected number of signals being provided by said port clock decode means.

52. The stored program computer system of claim 51 wherein said time out counter means is selectively set under program control.

53. The stored program counter system of claim 43 wherein one of said I/O instruction is an I/O immediate instruction whereby upon being decoded by said instruction decoding means signals are generated to said gate control means to cause the same to operate said gating means whereby data is permitted to pass to said local storage register means.

54. The stored program computer system of claim 45 further comprising
means responsive to the absence of said advance time signal for causing said CPU clock control means to maintain said CPU clocking means in another predetermined time state, and
logic means responsive to said pot clock means reaching predetermined time states after said service in signal for generating a service out signal to said I/O attachment means to enable the same to de-synchronize from said port means.

55. The stored program computer system of claim 45 wherein one of said I/O instructions is an I/O storage instruction whereby upon being decoded by said instruction decoding means, said gate control means provides signals to said gating means to cause the same to pass data from said local storage register means to said storage addressing means.

56. The stored program computer system of claim 55 wherein said I/O storage instruction is an I/O load storage instruction and said instruction decoding means provides signals for causing data to be read from said storage at the location specified by the data in said storage addressing means.

57. The stored program computer system of claim 54 wherein said one of said I/O instructions is an I/O immediate instruction whereby upon being decoded by said instruction decoding means signals are provided to said gate control means to cause said gating means to pass data from said local storage register means.

58. An I/O attachment for attaching I/O devices connected thereto to a computer comprising
   decoding means responsive to a first control signal supplied externally of said I/O attachment for simultaneously decoding I/O attachment address data and commands to provide control signals to said I/O devices connected to said I/O attachment,
   response means coupled to said decoding means for generating a response signal for transmission external to said I/O attachment indicative that said I/O attachment address data and commands have been decoded,
   means coupled to said response means for receiving data supplied externally of said I/O attachment and furnishing the received data to said I/O devices, and
   means coupled to said response means for responding to a second control signal supplied externally of said I/O attachment to de-activate said response signal.

59. An I/O attachment for attaching I/O devices connected thereto to a computer comprising
   decoding means responsive to a first control signal supplied externally of said I/O attachment for simultaneously decoding I/O attachment address data and commands to provide control signals to said I/O devices connected to said I/O attachment as identified by said I/O attachment address data,
   response means coupled to said decoding means for generating a response signal indicative that said I/O attachment and commands address data have been decoded,
   means coupled to said response means for sending data received from said I/O devices to a receiver external to said I/O attachment while said response signal is active, and
   means coupled to said response means for responding to a second control signal supplied externally of said I/O attachment to de-activate said response signal.

60. The computer system of claim 17 wherein said means for generating an error signal includes a time out counter.

61. The computer system of claim 60 wherein said time out counter is selectively operative to provide time outs of selective durations whereby the time out duration can be selected according to the requirements of said I/O attachments.

62. The computer system of claim 60 wherein said time out counter provides time outs occurring at times selected under instruction control according to the requirements of said I/O attachments.

63. The computer system of claim 18 wherein said means for generating an error signal includes a time out counter.

64. The computer system of claim 63 wherein said time out counter is selectively operative to provide time outs of selective durations whereby the time out duration can be selected according to the requirements of said I/O attachments.

65. The computer system of claim 63 wherein said time out counter provides time outs occurring at times selected under instruction control according to the requirements of said I/O attachments.

66. The I/O attachment of claim 58 further comprising:
   means responsive to strobe pulses supplied to said I/O attachment and to said second control signal for generating a time interval signal for delaying de-activation of said response signal and coupled to furnish said time interval signal to said means for responding to said second control signal.

67. The I/O attachment of claim 66 wherein said means for generating a time interval signal includes a counter.

68. The I/O attachment of claim 58 further comprising means responsive to strobe pulses supplied to said I/O attachment for generating a time interval signal for delaying generation of said response signal and coupled to furnish said time interval signal to said response means.

69. The I/O attachment of claim 59 further comprising:
   means responsive to strobe pulses furnished to said I/O attachment and to said second control signal for generating a time interval signal for delaying de-activation of said response signal and coupled to furnish said time interval signal to said means for responding to said second control signal.

70. The I/O attachment of claim 69 wherein said means for generating a time interval signal includes a counter.

71. The I/O attachment of claim 59 further comprising: means responsive to strobe pulses supplied to said I/O attachment for generating a time interval signal for delaying generation of said response signal and coupled to furnish said time interval signal to said response means.

* * * * *

UNITED STATES PATENT OFFICE
CERTIFICATE OF CORRECTION

Patent No. 3,972,023    Dated    July 27, 1976

Inventor(s)    Ronald E. Bodner et al.

It is certified that error appears in the above-identified patent and that said Letters Patent are hereby corrected as shown below:

Column 11, line 46, change "attached" to --attachment--.

Column 28, line 28, after containing insert --said--.

Column 31, line 8, change "mans" to --means--.

Column 31, line 44, change "device" to --devices--.

Column 32, line 16, change "repone" to --response--.

Column 32, line 27, change "thereby" to --thereto--.

Column 33, line 41, change "intructions" to --instructions--.

Column 37, line 14, change "cenral" to --central--.

Column 38, line 59, change "pot" to --port--.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*